(12) United States Patent
Yeh et al.

(10) Patent No.: US 10,890,738 B2
(45) Date of Patent: Jan. 12, 2021

(54) OPTICAL IMAGING LENS ASSEMBLY, IMAGE CAPTURING UNIT AND ELECTRONIC DEVICE

(71) Applicant: LARGAN PRECISION CO., LTD., Taichung (TW)

(72) Inventors: Kuan-Ting Yeh, Taichung (TW); Kuo-Jui Wang, Taichung (TW); Chien-Hsun Wu, Taichung (TW); Wei-Yu Chen, Taichung (TW); Po-Lun Hsu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 100 days.

(21) Appl. No.: 16/151,169

(22) Filed: Oct. 3, 2018

(65) Prior Publication Data
US 2019/0346661 A1 Nov. 14, 2019

(30) Foreign Application Priority Data
May 11, 2018 (TW) .............................. 107116204 A

(51) Int. Cl.
| | | |
|---|---|---|
| *G02B 13/00* | (2006.01) | |
| *G02B 13/18* | (2006.01) | |
| *G02B 13/02* | (2006.01) | |
| *G02B 9/60* | (2006.01) | |

(52) U.S. Cl.
CPC .......... *G02B 13/0045* (2013.01); *G02B 9/60* (2013.01); *G02B 13/02* (2013.01); *G02B 13/18* (2013.01)

(58) Field of Classification Search
CPC .. G02B 13/0045; G02B 9/60; G02B 27/0025; G02B 13/18; H04N 5/2254
USPC .......................................................... 359/714
See application file for complete search history.

(56) References Cited

U.S. PATENT DOCUMENTS

| | | | |
|---|---|---|---|
| 9,001,435 B2 | 4/2015 | Tsai et al. | |
| 9,402,032 B2 | 7/2016 | Dror et al. | |
| 2013/0215524 A1* | 8/2013 | Kwon ................ | G02B 13/0045 359/764 |
| 2014/0293453 A1 | 10/2014 | Ogino et al. | |
| 2015/0331224 A1 | 11/2015 | Shih et al. | |
| 2018/0059376 A1 | 3/2018 | Lin et al. | |
| 2019/0072745 A1 | 3/2019 | Chen et al. | |
| 2019/0243105 A1 | 8/2019 | Yan | |
| 2020/0026038 A1* | 1/2020 | Zhang ...................... | G02B 9/60 |
| 2020/0103629 A1* | 4/2020 | Teraoka ............. | G02B 13/0045 |

FOREIGN PATENT DOCUMENTS

| | | |
|---|---|---|
| CN | 106405796 A | 2/2017 |
| CN | 106646829 A | 5/2017 |
| CN | 107121755 A | 9/2017 |
| CN | 107515455 A | 12/2017 |
| TW | 1619984 B | 4/2018 |

* cited by examiner

*Primary Examiner* — Mohammed A Hasan
(74) *Attorney, Agent, or Firm* — Maschoff Brennan

(57) ABSTRACT

An optical imaging lens assembly includes five lens elements, which are, in order from an object side to an image side: a first lens element, a second lens element, a third lens element, a fourth lens element and a fifth lens element. The first lens element with positive refractive power has an object-side surface being convex in a paraxial region thereof. The third lens element has negative refractive power. The fifth lens element has negative refractive power.

29 Claims, 31 Drawing Sheets

OPTICAL IMAGING LENS ASSEMBLY, IMAGE CAPTURING UNIT AND ELECTRONIC DEVICE

RELATED APPLICATIONS

This application claims priority to Taiwan Application 107116204, filed on May 11, 2018, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality has been one of the indispensable features of an optical system nowadays.

Furthermore, due to the rapid changes in technology, electronic devices equipped with optical systems are developed towards multi-functionality for various applications, and therefore the functionality requirements for the optical systems have been increasing. However, it is difficult for a conventional optical system to obtain a balance among the requirements such as high image quality, low sensitivity, desirable aperture size, miniaturization or required field of view. Accordingly, the present disclosure provides an optical system satisfying the aforementioned requirements.

SUMMARY

According to one aspect of the present disclosure, an optical imaging lens assembly includes five lens elements. The five lens elements are, in order from an object side to an image side, a first lens element, a second lens element, a third lens element, a fourth lens element and a fifth lens element. The first lens element with positive refractive power has an object-side surface being convex in a paraxial region thereof. The third lens element has negative refractive power. The fifth lens element has negative refractive power. When an Abbe number of the second lens element is V2, an Abbe number of the third lens element is V3, an Abbe number of the fourth lens element is V4, a focal length of the second lens element is f2, a focal length of the third lens element is f3, an axial distance between the second lens element and the third lens element is T23, an axial distance between the third lens element and the fourth lens element is T34, an axial distance between the object-side surface of the first lens element and an image-side surface of the fifth lens element is TD, and an axial distance between the image-side surface of the fifth lens element and an image surface is BL, the following conditions are satisfied:

$35 < V2+V3+V4 < 85$;

$|f3/f2| < 2.33$;

$T23/T34 < 2.0$; and $1.25 < TD/BL < 4.80$.

According to another aspect of the present disclosure, an image capturing unit includes the aforementioned optical imaging lens assembly and an image sensor. The image sensor is disposed on the image surface of the optical imaging lens assembly.

According to still another aspect of the present disclosure, an electronic device includes the aforementioned image capturing unit.

According to yet still another aspect of the present disclosure, an optical imaging lens assembly includes five lens elements. The five lens elements are, in order from an object side to an image side, a first lens element, a second lens element, a third lens element, a fourth lens element and a fifth lens element. The first lens element has positive refractive power. The third lens element has negative refractive power. The fifth lens element has negative refractive power. When an Abbe number of the second lens element is V2, an Abbe number of the third lens element is V3, an Abbe number of the fourth lens element is V4, a focal length of the second lens element is f2, a focal length of the third lens element is f3, an axial distance between the second lens element and the third lens element is T23, and an axial distance between the third lens element and the fourth lens element is T34, the following conditions are satisfied:

$35 < V2+V3+V4 < 75$;

$|f3/f2| < 2.0$; and $T23/T34 < 2.0$.

According to yet still another aspect of the present disclosure, an optical imaging lens assembly includes five lens elements. The five lens elements are, in order from an object side to an image side, a first lens element, a second lens element, a third lens element, a fourth lens element and a fifth lens element. The first lens element has positive refractive power. The third lens element has negative refractive power. The fourth lens element with positive refractive power has an object-side surface being convex in a paraxial region thereof. The fifth lens element has negative refractive power. When an Abbe number of the second lens element is V2, an Abbe number of the third lens element is V3, an Abbe number of the fourth lens element is V4, a focal length of the second lens element is f2, a focal length of the third lens element is f3, an axial distance between the second lens element and the third lens element is T23, an axial distance between the third lens element and the fourth lens element is T34, a curvature radius of the object-side surface of the fourth lens element is R7, and a curvature radius of an image-side surface of the fourth lens element is R8, the following conditions are satisfied:

$35 < V2+V3+V4 < 85$;

$|f3/f2| < 2.75$;

$T23/T34 < 4.25$; and $(R7+R8)/(R7-R8) < 0.50$.

BRIEF DESCRIPTION OF THE DRAWINGS

The disclosure can be better understood by reading the following detailed description of the embodiments, with reference made to the accompanying drawings as follows.

The disclosure can be better understood by reading the following detailed description of the embodiments, with reference made to the accompanying drawings as follows.

DETAILED DESCRIPTION

Figure 1:
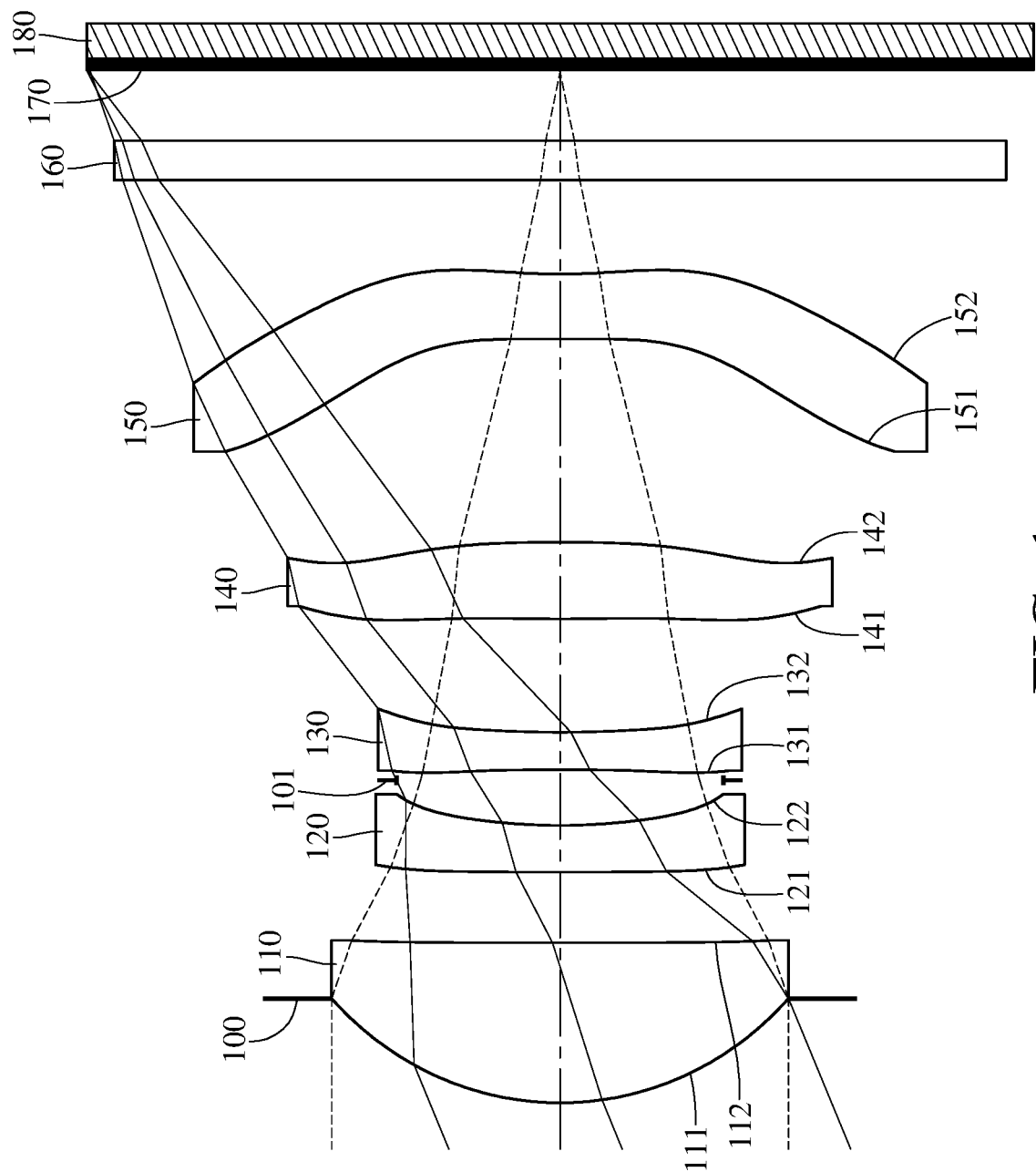
FIG. 1 is a schematic view of an image capturing unit according to the 1st embodiment of the present disclosure.

An optical imaging lens assembly includes five lens elements. The five lens elements are, in order from an object side to an image side, a first lens element, a second lens element, a third lens element, a fourth lens element and a fifth lens element.

The first lens element has positive refractive power; therefore, it is favorable for providing light convergence capability so as to obtain telephoto effect; furthermore, it is favorable for reducing a total track length of the optical imaging lens assembly. The first lens element can have an object-side surface being convex in a paraxial region thereof; therefore, it is favorable for improving light convergence capability of the first lens element so as to meet the requirement of telephoto photography while correcting spherical aberration.

The second lens element can have negative refractive power. Therefore, it is favorable for correcting aberrations generated by the first lens element and correcting chromatic aberration so as to prevent image overlaps due to light rays with different wavelengths focusing at different positions.

The third lens element has negative refractive power. Therefore, adjusting the Petzval sum is favorable for minimizing astigmatism and field curvature.

The fourth lens element can have positive refractive power; therefore, it is favorable for providing sufficient light convergence capability and reducing the total track length so as to achieve compactness. The fourth lens element can have an object-side surface being convex in a paraxial region thereof; therefore, it is favorable for strengthening the positive refractive power so as to improve light convergence and reduce the total length of the optical imaging lens assembly.

The fifth lens element has negative refractive power; therefore, adjusting the Petzval sum is favorable for minimizing astigmatism and field curvature. The fifth lens element can have an object-side surface being concave in a paraxial region thereof; therefore, it is favorable for reducing the back focal length of the optical imaging lens assembly so as to achieve compactness.

When an Abbe number of the second lens element is V2, an Abbe number of the third lens element is V3, and an Abbe number of the fourth lens element is V4, the following condition is satisfied: $35<V2+V3+V4<85$. Therefore, it is favorable for balancing between corrections of chromatic aberration and astigmatism. Besides, it is favorable for reducing the effective radius of each lens element so as to reduce the size of the optical imaging lens assembly to achieve compactness. Preferably, the following condition can be satisfied: $35<V2+V3+V4<75$. More preferably, the following condition can be satisfied: $45<V2+V3+V4<70$. Much more preferably, the following condition can also be satisfied: $50<V2+V3+V4<65$.

When a focal length of the second lens element is f2, and a focal length of the third lens element is f3, the following condition is satisfied: $|f3/f2|<2.75$. Therefore, it is favorable for providing strong refractive power in the middle portion of the optical imaging lens assembly by pairing the third lens element with another lens elements having stronger positive refractive power, so as to strengthen the capability in correcting aberrations in the optical imaging lens assembly. Preferably, the following condition can be satisfied: |f3/f2|<2.33. More preferably, the following condition can be satisfied: |f3/f2|<2.0. Much more preferably, the following condition can be satisfied: |f3/f2|<1.50. Still more preferably, the following condition can be satisfied: |f3/f2|<1.20. Still more preferably, the following condition can be satisfied: |f3/f2|<1.0. Still more preferably, the following condition can also be satisfied: |f3/f2|<0.70.

When an axial distance between the second lens element and the third lens element is T23, and an axial distance between the third lens element and the fourth lens element is T34, the following condition is satisfied: T23/T34<4.25. Therefore, it is favorable for providing sufficient space between adjacent lens elements so as to provide design flexibility for the shape of lens elements, thereby maintaining good image quality for the requirement of compactness. Preferably, the following condition can be satisfied: T23/T34<2.0. More preferably, the following condition can also be satisfied: T23/T34<1.50.

When an axial distance between the object-side surface of the first lens element and an image-side surface of the fifth lens element is TD, and an axial distance between the image-side surface of the fifth lens element and an image surface is BL, the following condition can be satisfied: 1.25<TD/BL<4.80. Therefore, it is favorable for providing sufficient space between the fifth lens element and the image surface while optimizing the space utilization in the optical imaging lens assembly. Preferably, the following condition can be satisfied: 1.60<TD/BL<4.80. More preferably, the following condition can be satisfied: 1.25<TD/BL<4.0. Much more preferably, the following condition can also be satisfied: 1.60<TD/BL<4.0.

When a curvature radius of the object-side surface of the fourth lens element is R7, and a curvature radius of an image-side surface of the fourth lens element is R8, the following condition can be satisfied: (R7+R8)/(R7−R8)<0.50. Therefore, it is favorable for reducing shape variation on the periphery of the fourth lens element so as to prevent scattered light generated due to an overly curved shape of the fourth lens element. Preferably, the following condition can also be satisfied: (R7+R8)/(R7−R8)<−0.55.

According to the present disclosure, either an effective radius of a lens surface of the second lens element or an effective radius of a lens surface of the third lens element can be the smallest among all effective radii of lens surfaces of the five lens elements. Therefore, it is favorable for reducing the size of the optical imaging lens assembly so as to achieve compactness. Preferably, either an effective radius of an image-side surface of the second lens element, an effective radius of an object-side surface of the third lens element, or an effective radius of an image-side surface of the third lens element can be the smallest among all effective radii of the lens surfaces of the five lens elements.

When the focal length of the third lens element is f3, and a focal length of the fourth lens element is f4, the following condition can be satisfied: |f3/f4|<1.0. Therefore, it is favorable for providing sufficient refractive power so as to configure lens elements having stronger positive refractive power with the third lens element for strengthening the capability in correcting aberrations.

When a focal length of the optical imaging lens assembly is f, and a curvature radius of the object-side surface of the first lens element is R1, the following condition can be satisfied: 3.30<f/R1<5.50. Therefore, it is favorable for the first lens element to have sufficient positive refractive power so as to reduce the total length of the optical imaging lens assembly and allow peripheral light to enter the optical imaging lens assembly. Preferably, the following condition can also be satisfied: 3.50<f/R1<5.0.

Figure 31:
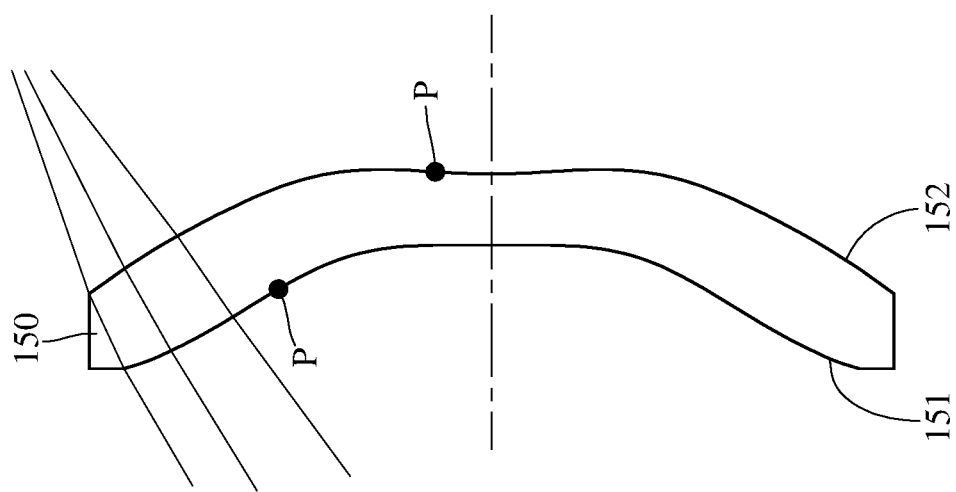
FIG. 31 shows a schematic view of inflection points on a fifth lens element according to the 1st embodiment of the present disclosure.

According to the present disclosure, among all lens surfaces of the five lens element, at least one lens surface of the five lens elements can have at least one inflection point. Therefore, it is favorable for correcting the image periphery so as to enhance image quality. Preferably, among the object-side surfaces and the image-side surfaces of the third lens element and the fifth lens element, at least one lens surface can have at least one inflection point. Please refer to FIG. 31, which shows a schematic view of inflection points P on the fifth lens element according to the 1st embodiment of the present disclosure. The inflection points P on the object-side surface and the image-side surface of the fifth lens element in FIG. 31 are only exemplary. The lens surfaces of the other four lens elements may also have at least one inflection point.

When the focal length of the optical imaging lens assembly is f, and a curvature radius of the image-side surface of the fifth lens element is R10, the following condition can be satisfied: 0≤f/R10<7.0. Therefore, it is favorable for providing sufficient space between the fifth lens element and the image surface for a proper back focal length of the optical imaging lens assembly.

When the number of lens elements having an Abbe number smaller than 30 in the optical imaging lens assembly is V30, the following condition can be satisfied: 3≤V30. Therefore, it is favorable for obtaining a balance between corrections of chromatic aberration and astigmatism.

When the focal length of the optical imaging lens assembly is f, a focal length of the first lens element is f1, the focal length of the second lens element is f2, the focal length of the third lens element is f3, the focal length of the fourth lens element is f4, and a focal length of the fifth lens element is f5, the following conditions can be satisfied: 0.50<|f/f1|; 0.50<|f/f2|; 0.50<|f/f3|; 0.50<|f/f4|; and 0.50<|f/f5|. Therefore, it is favorable for having enough refractive power from each lens element so as to allow the peripheral light converging on the image surface and correct aberrations at the image periphery.

When a minimum value among Abbe numbers of the five lens elements is Vmin, the following condition can be satisfied: Vmin<21. Therefore, it is favorable for effectively correcting chromatic aberration in the optical imaging lens assembly.

When an axial distance between the object-side surface of the first lens element and the image surface is TL, and the focal length of the optical imaging lens assembly is f, the following condition can be satisfied: 0.5<TL/f<1.0. Therefore, it is favorable for obtaining telephoto functionality while satisfying the requirement of a shorter total track length. Preferably, the following condition can also be satisfied: 0.70<TL/f<1.0.

When an f-number of the optical imaging lens assembly is Fno, the following condition can be satisfied: 1.0<Fno<2.70. Therefore, it is favorable for configuring a proper aperture size so that the optical imaging assembly is applicable to photographing in low light conditions and a larger depth of field.

When a sum of central thicknesses of all lens elements of the optical imaging lens assembly is ΣCT, and a sum of axial distances between each of adjacent lens elements of the optical imaging lens assembly is ΣAT, the following condition can be satisfied: ΣCT/ΣAT<1.50. Therefore, a proper axial distance between adjacent lens elements is favorable for the lens element having a suitable shape for maintaining good image quality and compactness.

When a central thickness of the fourth lens element is CT4, and a central thickness of the fifth lens element is CT5, the following condition can be satisfied: 0.75<CT4/CT5. Therefore, it is favorable for obtaining a proper configuration between the central thicknesses of the fourth lens element and the fifth lens element so as to increase the structural strength of the two lens elements.

According to the present disclosure, the aforementioned features and conditions can be utilized in numerous combinations so as to achieve corresponding effects.

According to the present disclosure, the lens elements of the optical imaging lens assembly can be made of either glass or plastic material. When the lens elements are made of glass material, the refractive power distribution of the optical imaging lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows for more control variables for eliminating aberrations thereof, the required number of the lens elements can be reduced, and the total track length of the optical imaging lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, an image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the optical imaging lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens assembly and thereby provides a wider field of view for the same.

According to the present disclosure, the optical imaging lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
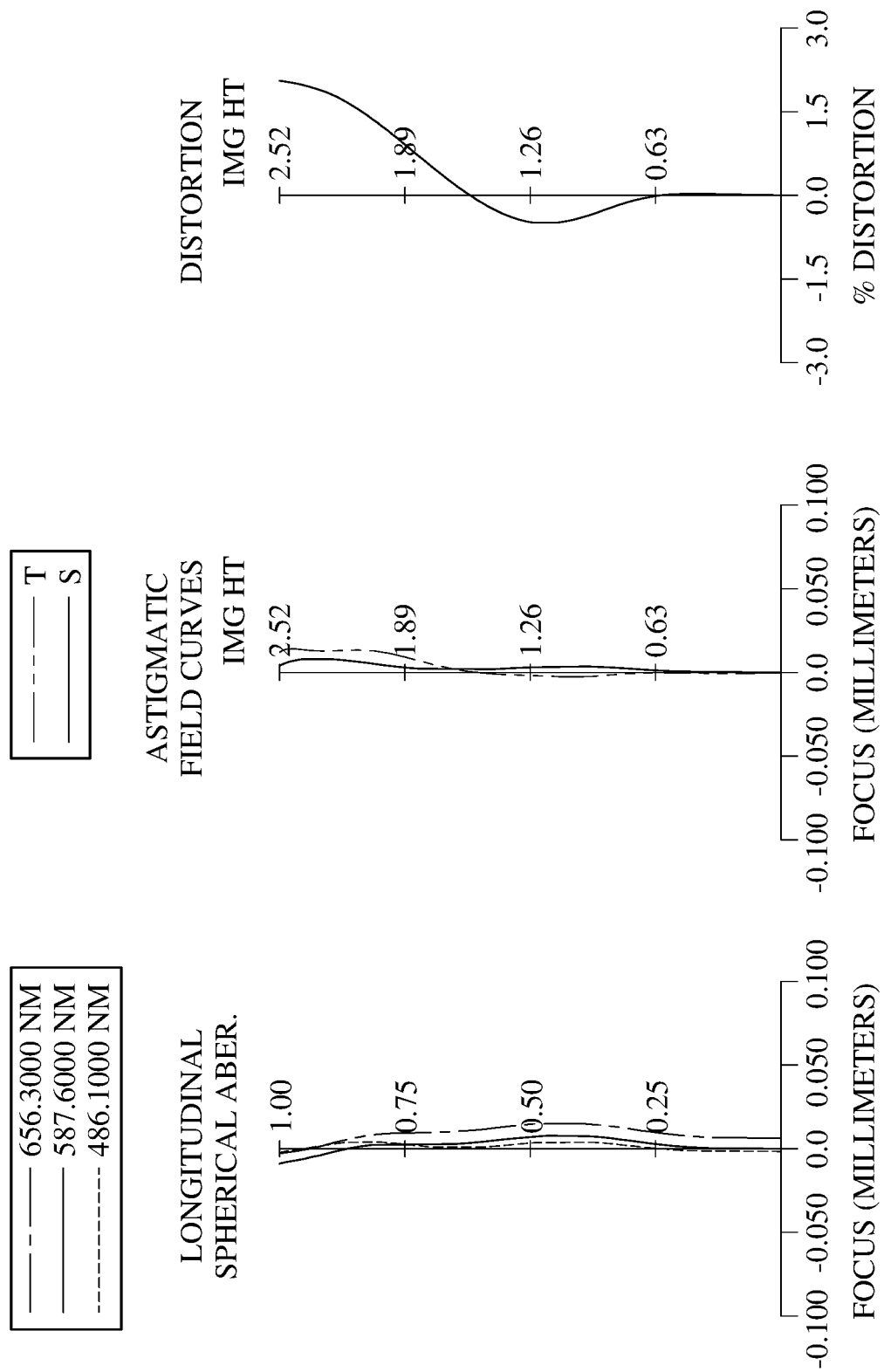
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 180. The optical imaging lens assembly includes, in order from an object side to an image side, an aperture stop 100, a first lens element 110, a second lens element 120, a stop 101, a third lens element 130, a fourth lens element 140, a fifth lens element 150, an IR-cut filter 160 and an image surface 170. The optical imaging lens assembly includes five lens elements (110, 120, 130, 140 and 150) with no additional lens element disposed between each of the adjacent five lens elements, wherein there is an air gap between every adjacent lens element.

The first lens element 110 with positive refractive power has an object-side surface 111 being convex in a paraxial region thereof and an image-side surface 112 being planar in a paraxial region thereof. The first lens element 110 is made of glass material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. At least one of the object-side surface 131 and the image-side surface 132 of the third lens element 130 has at least one inflection point.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric. At least one of the object-side surface 141 and the image-side surface 142 of the fourth lens element 140 has at least one inflection point.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. At least one of the object-side surface 151 and the image-side surface 152 of the fifth lens element 150 has at least one inflection point.

The IR-cut filter 160 is made of glass material and located between the fifth lens element 150 and the image surface 170, and will not affect the focal length of the optical imaging lens assembly. The image sensor 180 is disposed on or near the image surface 170 of the optical imaging lens assembly.

In this embodiment, an effective radius of the image-side surface 122 of the second lens element 120 is the smallest among all effective radii of the lens surfaces of the five lens elements. In detail, the effective radius of the image-side surface 122 of the second lens element 120 is smaller than the effective radii of the object-side surfaces (111, 121, 131, 141, 151) and the image-side surfaces (112, 132, 142, 152).

The equation of the aspheric surface profiles of the aforementioned lens elements of the 1st embodiment is expressed as follows:

$$X(Y) = (Y^2/R)/\left(1 + sqrt\left(1 - (1+k) \times (Y/R)^2\right)\right) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10 and 12.

In the optical imaging lens assembly of the image capturing unit according to the 1st embodiment, when a focal length of the optical imaging lens assembly is f, an f-number of the optical imaging lens assembly is Fno, and half of a maximum field of view of the optical imaging lens assembly is HFOV, these parameters have the following values: f=5.95 millimeters (mm), Fno=2.45, HFOV=22.5 degrees (deg.).

When an Abbe number of the second lens element 120 is V2, an Abbe number of the third lens element 130 is V3, and an Abbe number of the fourth lens element 140 is V4, the following condition is satisfied: V2+V3+V4=77.2.

When a number of lens elements having an Abbe number smaller than 30 in the optical imaging lens assembly is V30, the following condition is satisfied: V30=2. In this embodiment, the Abbe numbers of the second lens element 120 and the fourth lens element 140 are smaller than 30.

When a minimum value among Abbe numbers of the five lens elements is Vmin, the following condition is satisfied: Vmin=18.4. In this embodiment, the Abbe numbers of the second lens element 120 and the fourth lens element 140 are equal to each other and smaller than the Abbe numbers of the other lens elements, and thus Vmin is equal to the Abbe numbers of the second lens element 120 and the fourth lens element 140.

When a central thickness of the fourth lens element 140 is CT4, and a central thickness of the fifth lens element 150 is CT5, the following condition is satisfied: CT4/CT5=1.18.

When an axial distance between the second lens element 120 and the third lens element 130 is T23, and an axial distance between the third lens element 130 and the fourth lens element 140 is T34, the following condition is satisfied: T23/T34=0.49.

When a sum of central thicknesses of all lens elements of the optical imaging lens assembly is ΣCT, and a sum of axial distances between each of adjacent lens elements of the optical imaging lens assembly is ΣAT, the following condition is satisfied: ΣCT/ΣAT=0.87.

When an axial distance between the object-side surface 111 of the first lens element 110 and the image-side surface 152 of the fifth lens element 150 is TD, and an axial distance between the image-side surface 152 of the fifth lens element 150 and the image surface 170 is BL, and the following condition is satisfied: TD/BL=4.06.

When an axial distance between the object-side surface 111 of the first lens element 110 and the image surface 170 is TL, and the focal length of the optical imaging lens assembly is f, the following condition is satisfied: TL/f=0.92.

When a curvature radius of the object-side surface 141 of the fourth lens element 140 is R7, and a curvature radius of the image-side surface 142 of the fourth lens element 140 is R8, the following condition is satisfied: (R7+R8)/(R7−R8)=0.02.

When the focal length of the optical imaging lens assembly is f, and a curvature radius of the object-side surface 111 of the first lens element 110 is R1, the following condition is satisfied: f/R1=3.76.

When the focal length of the optical imaging lens assembly is f, and a curvature radius of the image-side surface 152 of the fifth lens element 150 is R10, the following condition is satisfied: f/R10=1.91.

When a focal length of the second lens element 120 is f2, and a focal length of the third lens element 130 is f3, the following condition is satisfied: |f3/f2|=1.92.

When the focal length of the third lens element 130 is f3, and a focal length of the fourth lens element 140 is f4, the following condition is satisfied: |f3/f4|=0.99.

When the focal length of the optical imaging lens assembly is f, a focal length of the first lens element 110 is f1, the focal length of the second lens element 120 is f2, the focal length of the third lens element 130 is f3, the focal length of the fourth lens element 140 is f4, and a focal length of the fifth lens element 150 is f5, the following conditions are satisfied: |f/f1|=1.97; |f/f2|=1.19; |f/f3|=0.62; |f/f4|=0.61; and |f/f5|=0.89.

The detailed optical data of the 1st embodiment are shown in Table 1 and the aspheric surface data are shown in Table 2 below.

TABLE 1

1st Embodiment
f = 5.95 mm, Fno = 2.45, HFOV = 22.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.554 | | | | |
| 2 | Lens 1 | 1.582 | (ASP) | 0.853 | Glass | 1.522 | 62.2 | 3.03 |
| 3 | | ∞ | (ASP) | 0.375 | | | | |
| 4 | Lens 2 | 22.408 | (ASP) | 0.249 | Plastic | 1.680 | 18.4 | −5.01 |
| 5 | | 2.946 | (ASP) | 0.241 | | | | |
| 6 | Stop | Plano | | 0.055 | | | | |
| 7 | Lens 3 | 100.000 | (ASP) | 0.200 | Plastic | 1.559 | 40.4 | −9.63 |
| 8 | | 5.102 | (ASP) | 0.604 | | | | |
| 9 | Lens 4 | 13.438 | (ASP) | 0.408 | Plastic | 1.680 | 18.4 | 9.73 |
| 10 | | −12.882 | (ASP) | 1.082 | | | | |
| 11 | Lens 5 | 22.019 | (ASP) | 0.346 | Plastic | 1.544 | 55.9 | −6.72 |
| 12 | | 3.115 | (ASP) | 0.500 | | | | |
| 13 | IR-cut filter | Plano | | 0.210 | Glass | 1.517 | 64.2 | — |
| 14 | | Plano | | 0.376 | | | | |
| 15 | Image | Plano | | — | | | | |

Note:
Reference wavelength is 587.6 nm (d-line).
An effective radius of the stop 101 (Surface 6) is 0.870 mm.

TABLE 2

Aspheric Coefficients

| | Surface # | | | | |
|---|---|---|---|---|---|
| | 2 | 3 | 4 | 5 | 7 |
| k = | −8.6440E−02 | 0.0000E+00 | 9.0000E+01 | −4.6715E+01 | −9.0000E+01 |
| A4 = | −7.9932E−04 | −1.0919E−03 | −1.0104E−01 | 4.7443E−02 | −3.4687E−01 |
| A6 = | 1.0270E−03 | 2.3285E−02 | 3.3424E−01 | 8.8929E−02 | 9.3172E−01 |
| A8 = | 5.5430E−04 | −2.7842E−02 | −4.5413E−01 | 2.2679E−01 | −8.9473E−01 |
| A10 = | −1.5634E−03 | 1.6429E−02 | 3.7064E−01 | −4.8063E−01 | 2.2861E−01 |
| A12 = | 6.0244E−04 | −3.6587E−03 | −1.4817E−01 | 3.5532E−01 | 1.0599E−01 |
| A14 = | — | — | 1.8470E−02 | — | — |

| | Surface # | | | | |
|---|---|---|---|---|---|
| | 8 | 9 | 10 | 11 | 12 |
| k = | 0.0000E+00 | 0.0000E+00 | −1.0000E+00 | 9.0000E+01 | −3.3385E+00 |
| A4 = | −2.4421E−01 | −1.4125E−01 | −1.3296E−01 | −3.3661E−01 | −3.3252E−01 |
| A6 = | 8.0622E−01 | 1.1356E−01 | 9.0329E−02 | 7.3565E−02 | 1.6339E−01 |
| A8 = | −7.8524E−01 | 1.0465E−02 | −1.7927E−02 | 1.0769E−01 | −4.4252E−02 |
| A10 = | 2.1909E−01 | −3.6398E−02 | 1.2477E−02 | −8.5328E−02 | 9.1449E−03 |
| A12 = | 8.8932E−02 | 1.4162E−02 | −7.0600E−03 | 2.7248E−02 | −2.0708E−03 |
| A14 = | −4.5659E−02 | −1.9778E−03 | 1.0613E−03 | −4.1715E−03 | 3.5164E−04 |
| A16 = | — | — | — | 2.5107E−04 | −2.4440E−05 |

In Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
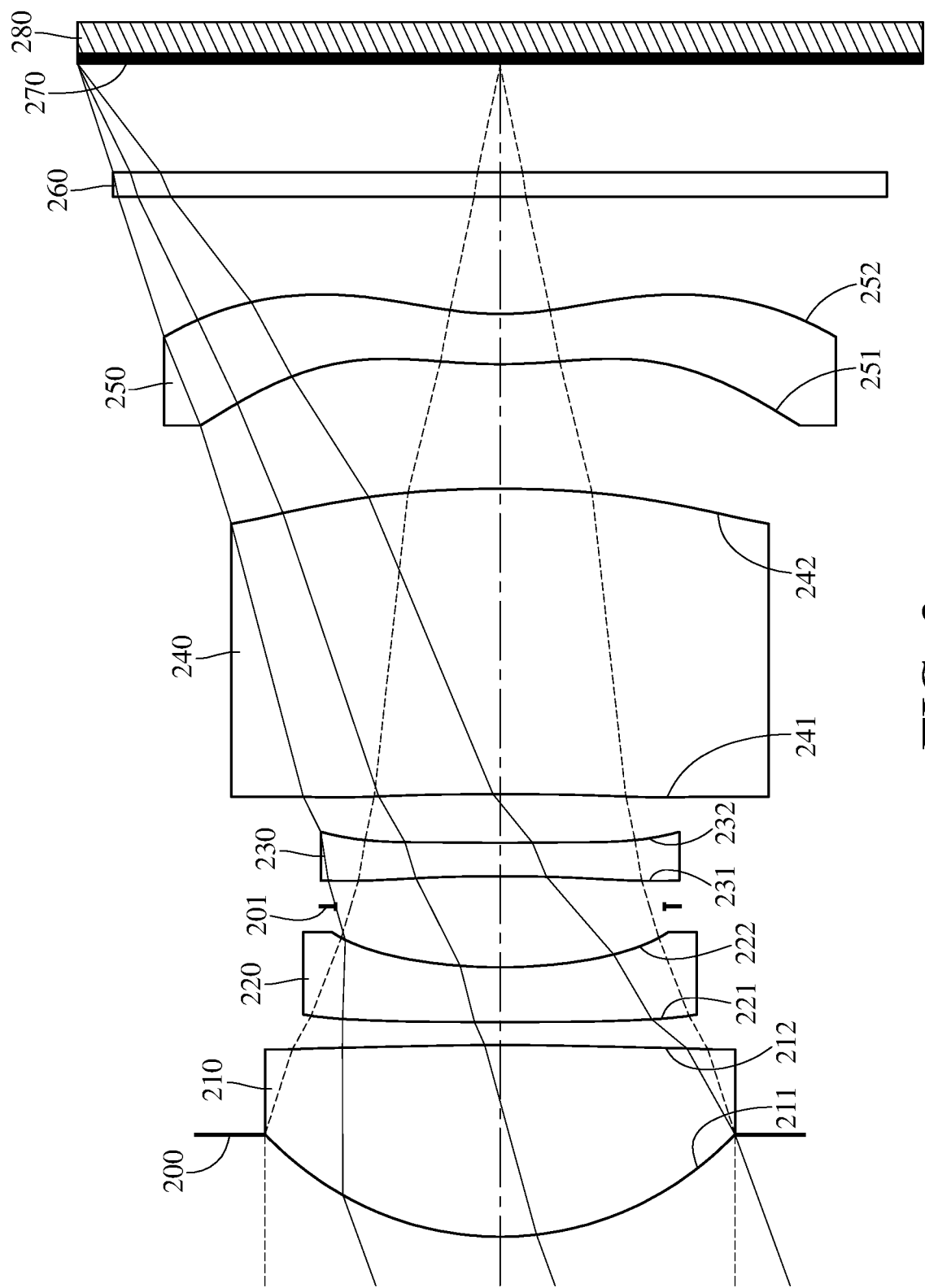
FIG. 3 is a schematic view of an image capturing unit according to the 2nd embodiment of the present disclosure.

FIG. 3 is a schematic view of an image capturing unit according to the 2nd embodiment of the present disclosure.

Figure 4:
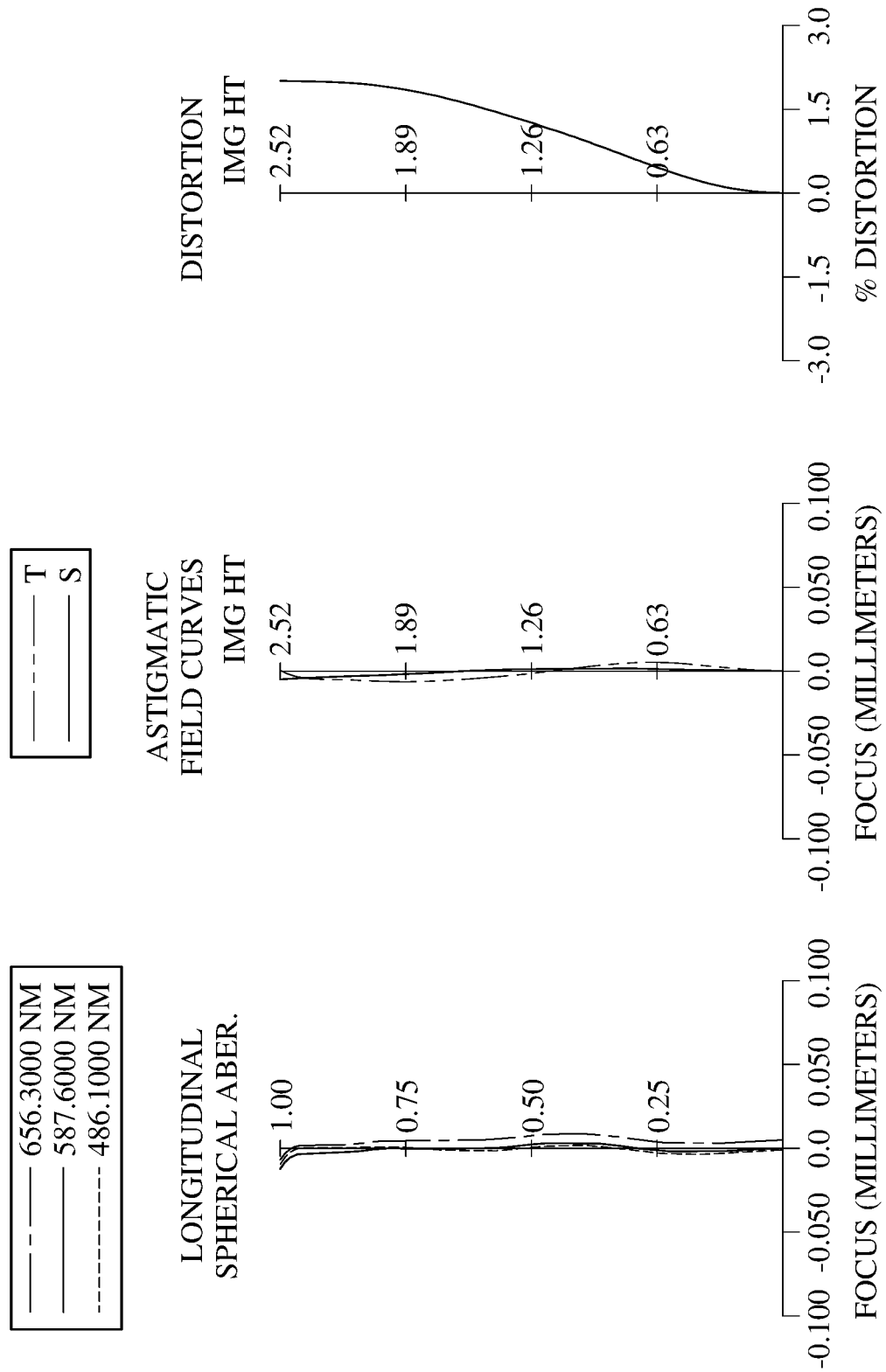
FIG. 4 shows spherical aberration curves, astigmatic field curves and a distortion curve of the image capturing unit according to the 2nd embodiment.

FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 280. The optical imaging lens assembly includes, in order from an object side to an image side, an aperture stop 200, a first lens element 210, a second lens element 220, a stop 201, a third lens element 230, a fourth lens element 240, a fifth lens element 250, an IR-cut filter 260 and an image surface 270. The optical imaging lens assembly includes five lens elements (210, 220, 230, 240 and 250) with no additional lens element disposed between each of the adjacent five lens elements, wherein there is an air gap between every adjacent lens element.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of plastic material and has the object-side surface 231 and the image-side surface 232 being both aspheric. At least one of the object-side surface 231 and the image-side surface 232 of the third lens element 230 has at least one inflection point.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric. At least one of the object-side surface 241 and the image-side surface 242 of the fourth lens element 240 has at least one inflection point.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. At least one of the object-side surface 251 and the image-side surface 252 of the fifth lens element 250 has at least one inflection point.

The IR-cut filter 260 is made of glass material and located between the fifth lens element 250 and the image surface 270, and will not affect the focal length of the optical imaging lens assembly. The image sensor 280 is disposed on or near the image surface 270 of the optical imaging lens assembly.

In this embodiment, an effective radius of the image-side surface 222 of the second lens element 220 is the smallest among all effective radii of the lens surfaces of the five lens elements. In detail, the effective radius of the image-side surface 222 of the second lens element 220 is smaller than the effective radii of the object-side surfaces (211, 221, 231, 241, 251) and the image-side surfaces (212, 232, 242, 252).

The detailed optical data of the 2nd embodiment are shown in Table 3 and the aspheric surface data are shown in Table 4 below.

TABLE 3

2nd Embodiment
f = 6.78 mm, Fno = 2.42, HFOV = 20.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.609 | | | | |
| 2 | Lens 1 | 1.890 | (ASP) | 1.144 | Plastic | 1.534 | 55.9 | 3.25 |
| 3 | | −16.818 | (ASP) | 0.137 | | | | |
| 4 | Lens 2 | 53.769 | (ASP) | 0.327 | Plastic | 1.614 | 26.0 | −5.52 |
| 5 | | 3.181 | (ASP) | 0.364 | | | | |
| 6 | Stop | Plano | | 0.179 | | | | |
| 7 | Lens 3 | −16.619 | (ASP) | 0.200 | Plastic | 1.660 | 20.3 | −12.84 |
| 8 | | 17.401 | (ASP) | 0.290 | | | | |
| 9 | Lens 4 | −40.394 | (ASP) | 1.823 | Plastic | 1.634 | 23.8 | 13.05 |
| 10 | | −6.987 | (ASP) | 0.743 | | | | |
| 11 | Lens 5 | 3.075 | (ASP) | 0.300 | Plastic | 1.529 | 45.4 | −9.22 |
| 12 | | 1.822 | (ASP) | 0.700 | | | | |
| 13 | IR-cut filter | Plano | | 0.145 | Glass | 1.517 | 64.2 | — |
| 14 | | Plano | | 0.648 | | | | |
| 15 | Image | Plano | | — | | | | |

Note:
Reference wavelength is 587.6 nm (d-line).
An effective radius of the stop 201 (Surface 6) is 0.980 mm.

TABLE 4

Aspheric Coefficients

| | Surface # | | | | |
|---|---|---|---|---|---|
| | 2 | 3 | 4 | 5 | 7 |
| k = | −5.0299E−02 | 0.0000E+00 | 9.0000E+01 | −4.1855E+01 | −7.7113E+01 |
| A4 = | 4.4518E−04 | 1.6863E−02 | 1.7685E−03 | 1.4811E−01 | −1.1947E−01 |
| A6 = | 1.4542E−03 | 1.9606E−03 | 3.9270E−02 | −1.6296E−01 | 2.6445E−01 |
| A8 = | −1.8021E−03 | −1.2065E−02 | −5.1124E−02 | 2.5555E−01 | −1.9864E−01 |

TABLE 4-continued

| Aspheric Coefficients | | | | |
|---|---|---|---|---|
| A10 = 1.1795E-03 | 6.3304E-03 | 2.9712E-02 | -2.1881E-01 | 5.1611E-02 |
| A12 = -4.0405E-04 | -9.9155E-04 | -5.9434E-03 | 9.0036E-02 | 3.4658E-03 |
| A14 = — | — | 4.3113E-04 | — | — |

| | Surface # | | | | |
|---|---|---|---|---|---|
| | 8 | 9 | 10 | 11 | 12 |
| k = | 0.0000E+00 | 0.0000E+00 | -1.0000E+00 | -3.2399E+00 | -1.2375E+00 |
| A4 = | -1.2878E-01 | -5.2626E-02 | -2.4833E-02 | -2.2659E-01 | -2.3911E-01 |
| A6 = | 2.9365E-01 | 6.4756E-02 | 1.3125E-02 | 8.1188E-02 | 1.1894E-01 |
| A8 = | -1.8088E-01 | -1.3816E-02 | -1.4166E-03 | -3.6242E-03 | -4.3312E-02 |
| A10 = | 1.7241E-02 | -1.7852E-02 | -1.6862E-03 | -1.0002E-02 | 1.0798E-02 |
| A12 = | 3.0608E-02 | 1.8128E-02 | 9.3811E-04 | 4.1891E-03 | -1.7883E-03 |
| A14 = | -1.2188E-02 | -5.6285E-03 | -1.4177E-04 | -6.9205E-04 | 1.7988E-04 |
| A16 = | — | — | — | 4.1855E-05 | -8.2941E-06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.78 | (R7 + R8)/(R7 - R8) | 1.42 |
| Fno | 2.42 | f/R1 | 3.59 |
| HFOV [deg.] | 20.0 | f/R10 | 3.72 |
| V2 + V3 + V4 | 70.1 | \|f3/f2\| | 2.33 |
| V30 | 3 | \|f3/f4\| | 0.98 |
| Vmin | 20.3 | \|f/f1\| | 2.08 |
| CT4/CT5 | 6.08 | \|f/f2\| | 1.23 |
| T23/T34 | 1.87 | \|f/f3\| | 0.53 |
| ΣCT/ΣAT | 2.21 | \|f/f4\| | 0.52 |
| TD/BL | 3.69 | \|f/f5\| | 0.74 |
| TL/f | 1.03 | — | — |

3rd Embodiment

Figure 5:
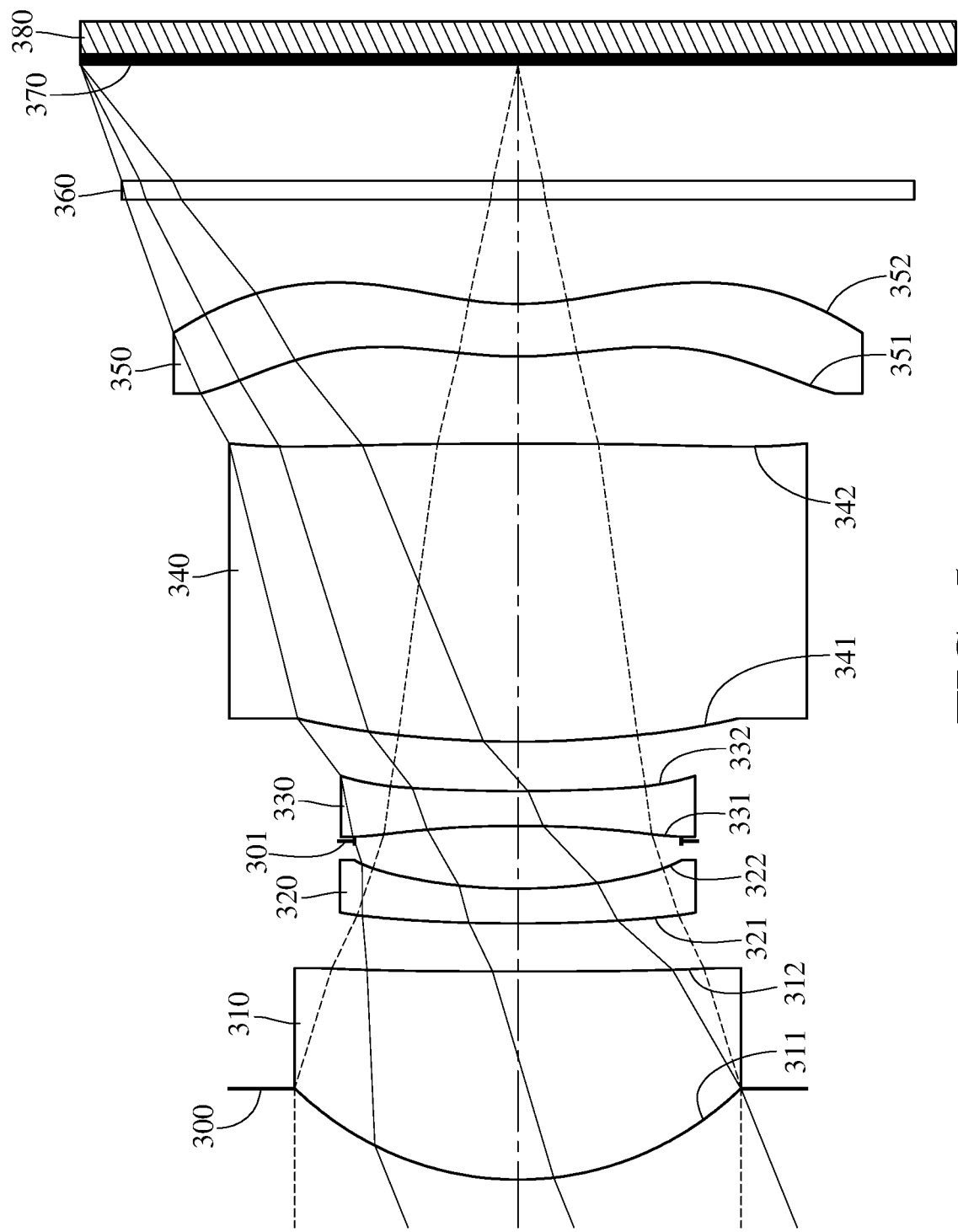
FIG. 5 is a schematic view of an image capturing unit according to the 3rd embodiment of the present disclosure.
Figure 6:
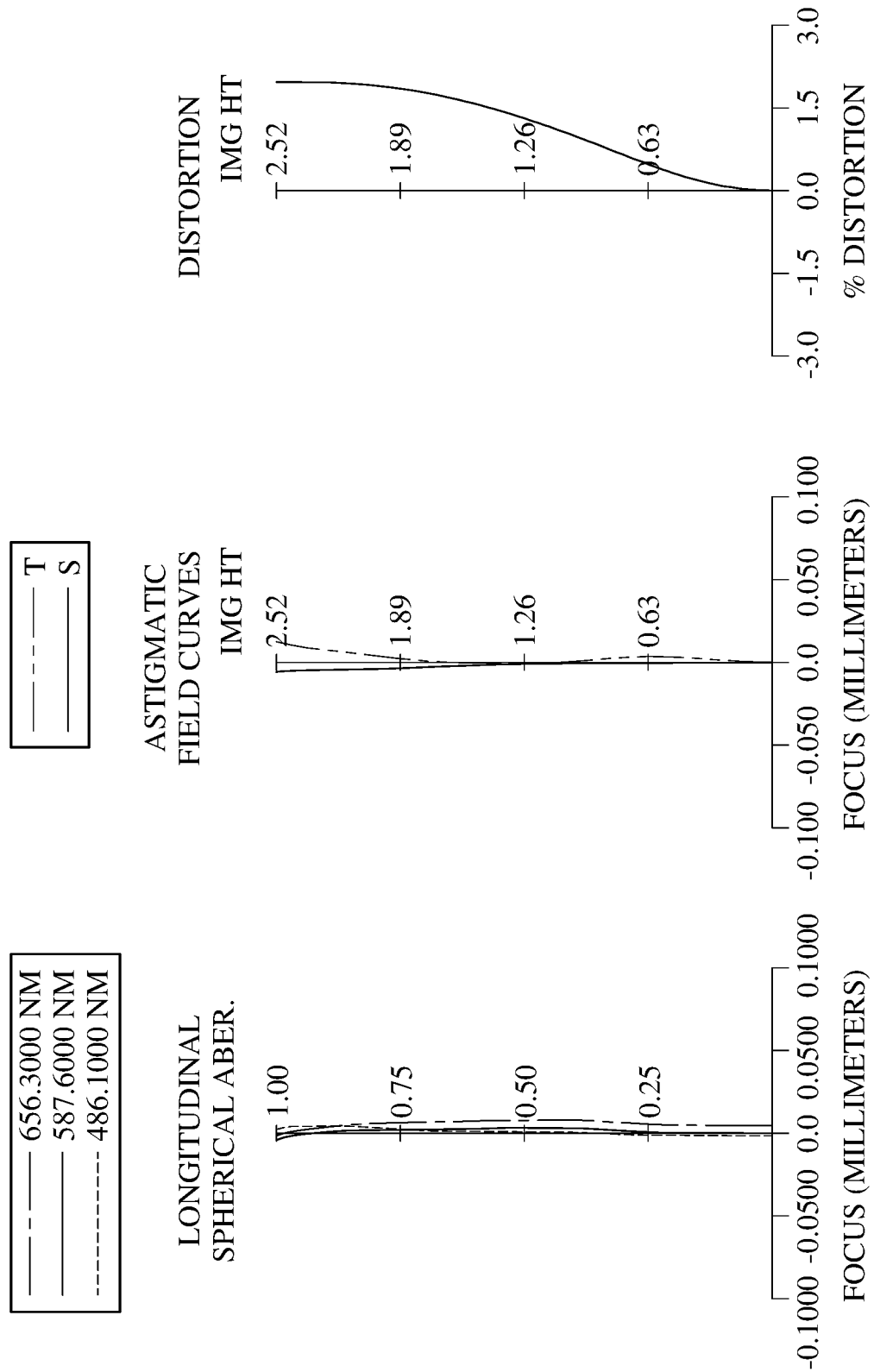
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 380. The optical imaging lens assembly includes, in order from an object side to an image side, an aperture stop 300, a first lens element 310, a second lens element 320, a stop 301, a third lens element 330, a fourth lens element 340, a fifth lens element 350, an IR-cut filter 360 and an image surface 370. The optical imaging lens assembly includes five lens elements (310, 320, 330, 340 and 350) with no additional lens element disposed between each of the adjacent five lens elements, wherein there is an air gap between every adjacent lens element.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. At least one of the object-side surface 341 and the image-side surface 342 of the fourth lens element 340 has at least one inflection point.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. At least one of the object-side surface 351 and the image-side surface 352 of the fifth lens element 350 has at least one inflection point.

The IR-cut filter 360 is made of glass material and located between the fifth lens element 350 and the image surface 370, and will not affect the focal length of the optical imaging lens assembly. The image sensor 380 is disposed on or near the image surface 370 of the optical imaging lens assembly.

In this embodiment, an effective radius of the image-side surface 322 of the second lens element 320 is the smallest among all effective radii of the lens surfaces of the five lens elements. In detail, the effective radius of the image-side surface 322 of the second lens element 320 is smaller than the effective radii of the object-side surfaces (311, 321, 331, 341, 351) and the image-side surfaces (312, 332, 342, 352).

The detailed optical data of the 3rd embodiment are shown in Table 5 and the aspheric surface data are shown in Table 6 below.

TABLE 5

3rd Embodiment
f = 6.11 mm, Fno = 2.38, HFOV = 22.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.524 | | | | |
| 2 | Lens 1 | 1.818 | (ASP) | 1.200 | Plastic | 1.534 | 55.9 | 3.37 |
| 3 | | −142.576 | (ASP) | 0.276 | | | | |
| 4 | Lens 2 | 14.068 | (ASP) | 0.200 | Plastic | 1.642 | 22.5 | −6.78 |
| 5 | | 3.306 | (ASP) | 0.273 | | | | |
| 6 | Stop | Plano | | 0.088 | | | | |
| 7 | Lens 3 | −8.339 | (ASP) | 0.200 | Plastic | 1.688 | 18.7 | −5.99 |
| 8 | | 8.217 | (ASP) | 0.285 | | | | |
| 9 | Lens 4 | 5.647 | (ASP) | 1.716 | Plastic | 1.688 | 18.7 | 7.99 |
| 10 | | −178.818 | (ASP) | 0.503 | | | | |
| 11 | Lens 5 | 2.431 | (ASP) | 0.302 | Plastic | 1.559 | 40.4 | −12.83 |
| 12 | | 1.734 | (ASP) | 0.600 | | | | |
| 13 | IR-cut filter | Plano | | 0.110 | Glass | 1.517 | 64.2 | — |
| 14 | | Plano | | 0.668 | | | | |
| 15 | Image | Plano | | — | | | | |

Note:
Reference wavelength is 587.6 nm (d-line).
An effective radius of the stop 301 (Surface 6) is 0.940 mm.

TABLE 6

Aspheric Coefficients

| | Surface # | | | | |
|---|---|---|---|---|---|
| | 2 | 3 | 4 | 5 | 7 |
| k = | −5.2256E−02 | 0.0000E+00 | 9.0000E+01 | −4.0658E+01 | −4.5535E+00 |
| A4 = | 1.6392E−04 | 3.4264E−02 | 6.6584E−02 | 1.8257E−01 | −9.6896E−02 |
| A6 = | 1.3271E−03 | −3.1827E−02 | −1.4580E−01 | −3.3701E−01 | 1.1379E−01 |
| A8 = | −1.5391E−03 | 2.0344E−02 | 1.6895E−01 | 4.5789E−01 | 9.8842E−03 |
| A10 = | 9.7061E−04 | −7.6761E−03 | −1.0861E−01 | −3.3098E−01 | −7.3800E−02 |
| A12 = | −2.6803E−04 | 1.0305E−03 | 4.8510E−02 | 1.3568E−01 | 4.4448E−02 |
| A14 = | — | — | −1.1970E−02 | — | — |

| | Surface # | | | | |
|---|---|---|---|---|---|
| | 8 | 9 | 10 | 11 | 12 |
| k = | 0.0000E+00 | 0.0000E+00 | −1.0000E+00 | −2.2479E+00 | −1.3919E+00 |
| A4 = | −8.7770E−02 | −2.9762E−02 | −2.1651E−02 | −2.2765E−01 | −2.3965E−01 |
| A6 = | 1.6189E−01 | 2.7502E−02 | 1.7944E−02 | 8.6142E−02 | 1.1776E−01 |
| A8 = | −1.6853E−02 | −4.5589E−03 | −6.8061E−03 | −1.2129E−02 | −4.5121E−02 |
| A10 = | −7.7247E−02 | −5.4645E−03 | 1.4742E−03 | −3.7890E−03 | 1.2455E−02 |
| A12 = | 5.7645E−02 | 3.7158E−03 | −2.8318E−03 | 2.0872E−03 | −2.3456E−03 |
| A14 = | −1.6206E−02 | −8.2292E−04 | −3.4922E−05 | −3.3522E−04 | 2.6612E−04 |
| A16 = | — | — | — | 1.6847E−05 | −1.3272E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 6.11 | (R7 + R8)/(R7 − R8) | −0.94 |
| Fno | 2.38 | f/R1 | 3.36 |
| HFOV [deg.] | 22.0 | f/R10 | 3.52 |
| V2 + V3 + V4 | 59.9 | |f3/f2| | 0.88 |
| V30 | 3 | |f3/f4| | 0.75 |
| Vmin | 18.7 | |f/f1| | 1.81 |
| CT4/CT5 | 5.68 | |f/f2| | 0.90 |
| T23/T34 | 1.27 | |f/f3| | 1.02 |
| ΣCT/ΣAT | 2.54 | |f/f4| | 0.77 |
| TD/BL | 3.66 | |f/f5| | 0.48 |
| TL/f | 1.05 | — | — |

4th Embodiment

Figure 7:
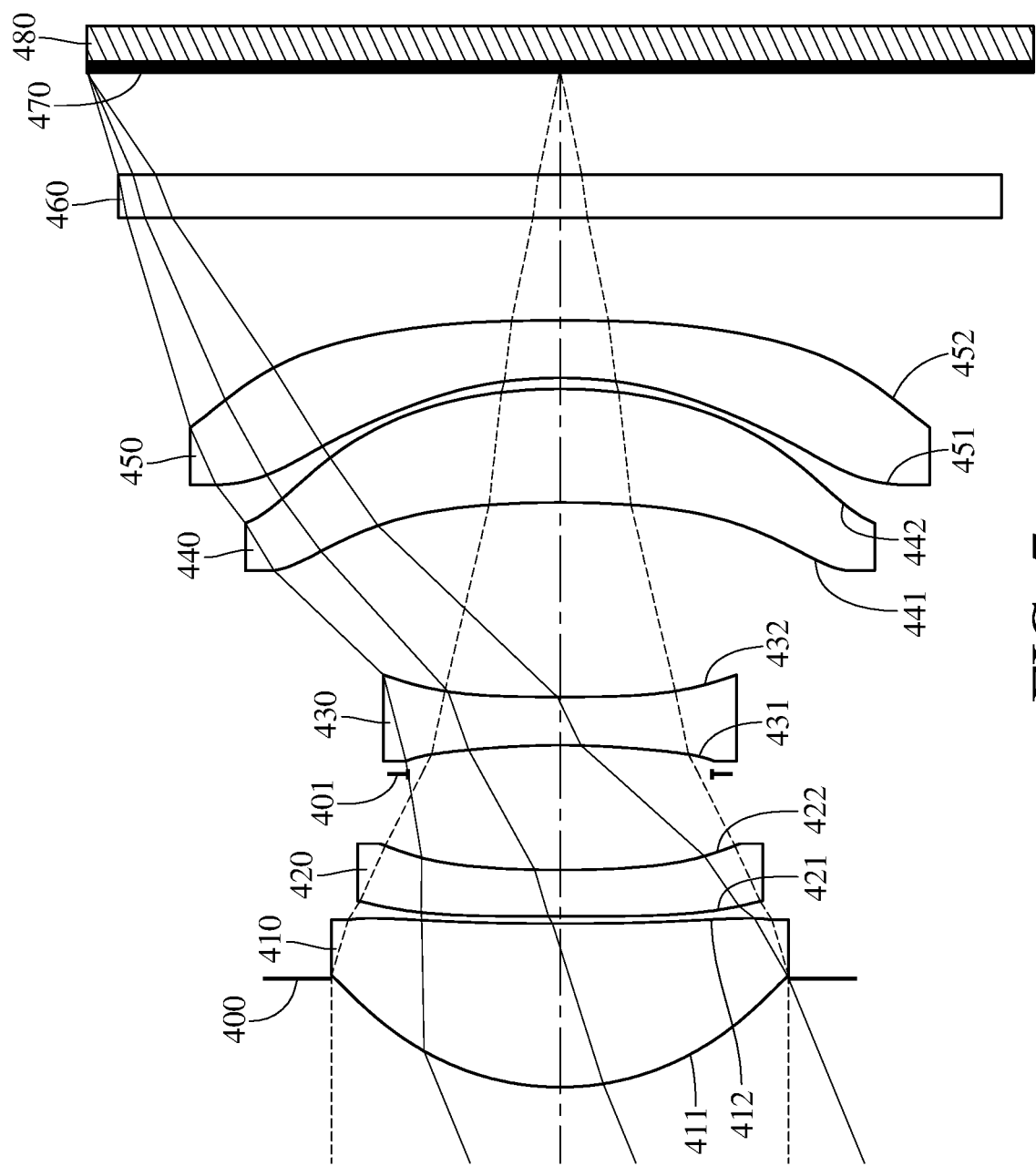
FIG. 7 is a schematic view of an image capturing unit according to the 4th embodiment of the present disclosure.
Figure 8:
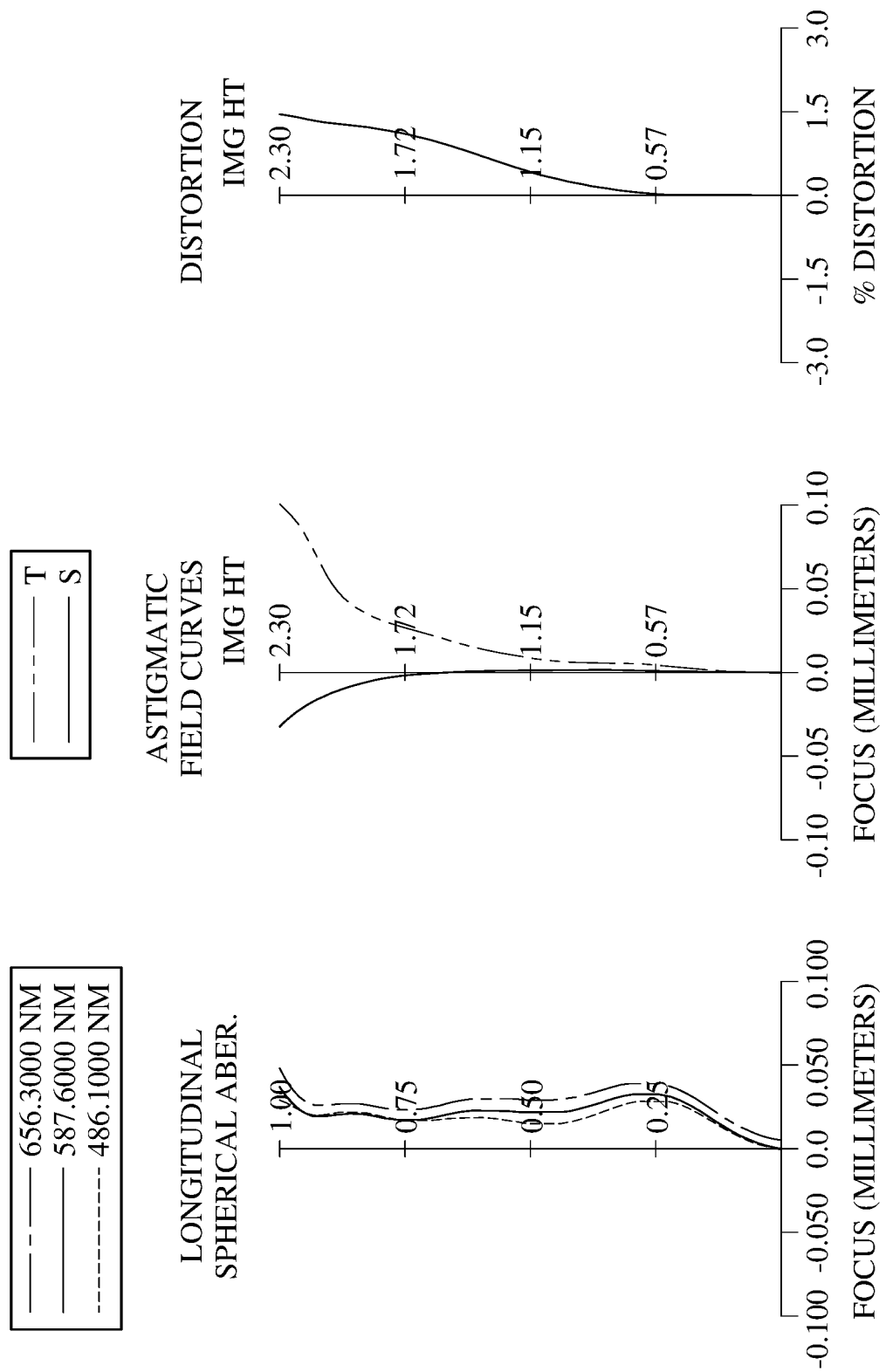
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 480. The optical imaging lens assembly includes, in order from an object side to an image side, an aperture stop 400, a first lens element 410, a second lens element 420, a stop 401, a third lens element 430, a fourth lens element 440, a fifth lens element 450, an IR-cut filter 460 and an image surface 470. The optical imaging lens assembly includes five lens elements (410, 420, 430, 440 and 450) with no additional lens element disposed between each of the adjacent five lens elements, wherein there is an air gap between every adjacent lens element.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. At least one of the object-side surface 411 and the image-side surface 412 of the first lens element 410 has at least one inflection point.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. At least one of the object-side surface 441 and the image-side surface 442 of the fourth lens element 440 has at least one inflection point.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. At least one of the object-side surface 451 and the image-side surface 452 of the fifth lens element 450 has at least one inflection point.

The IR-cut filter 460 is made of glass material and located between the fifth lens element 450 and the image surface 470, and will not affect the focal length of the optical imaging lens assembly. The image sensor 480 is disposed on or near the image surface 470 of the optical imaging lens assembly.

In this embodiment, an effective radius of the object-side surface 431 of the third lens element 430 is the smallest among all effective radii of the lens surfaces of the five lens elements. In detail, the effective radius of the object-side surface 431 of the third lens element 430 is smaller than the effective radii of the object-side surfaces (411, 421, 441, 451) and the image-side surfaces (412, 422, 432, 442, 452).

The detailed optical data of the 4th embodiment are shown in Table 7 and the aspheric surface data are shown in Table 8 below.

TABLE 7

4th Embodiment
f = 5.50 mm, Fno = 2.47, HFOV = 22.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.530 | | | | |
| 2 | Lens 1 | 1.319 | (ASP) | 0.798 | Plastic | 1.545 | 56.1 | 2.49 |
| 3 | | 39.583 | (ASP) | 0.036 | | | | |
| 4 | Lens 2 | −31.433 | (ASP) | 0.225 | Plastic | 1.669 | 19.4 | −8.33 |
| 5 | | 6.793 | (ASP) | 0.467 | | | | |
| 6 | Stop | Plano | | 0.141 | | | | |
| 7 | Lens 3 | −3.729 | (ASP) | 0.235 | Plastic | 1.639 | 23.5 | −4.72 |
| 8 | | 16.099 | (ASP) | 0.948 | | | | |
| 9 | Lens 4 | −5.481 | (ASP) | 0.553 | Plastic | 1.669 | 19.4 | 6.69 |
| 10 | | −2.564 | (ASP) | 0.054 | | | | |
| 11 | Lens 5 | −2.168 | (ASP) | 0.280 | Plastic | 1.544 | 56.0 | −4.83 |
| 12 | | −12.955 | (ASP) | 0.500 | | | | |
| 13 | IR-cut filter | Plano | | 0.210 | Glass | 1.517 | 64.2 | — |
| 14 | | Plano | | 0.497 | | | | |
| 15 | Image | Plano | | — | | | | |

Note:
Reference wavelength is 587.6 nm (d-line).
An effective radius of the stop 401 (Surface 6) is 0.740 mm.

TABLE 8

Aspheric Coefficients

| Surface # | | | | | |
|---|---|---|---|---|---|
| | 2 | 3 | 4 | 5 | 7 |
| k = | 1.4274E−02 | 0.0000E+00 | 0.0000E+00 | 7.3562E+00 | 2.1146E+00 |
| A4 = | −1.8903E−02 | 1.4664E−01 | 2.1271E−01 | 1.3350E−01 | 1.2730E−01 |
| A6 = | 8.6771E−02 | −3.8412E−01 | −4.1275E−01 | −1.3425E−01 | −1.6295E−01 |
| A8 = | −3.3632E−01 | 5.3506E−01 | 6.8500E−01 | 4.8687E−01 | −2.3434E−02 |
| A10 = | 6.5509E−01 | −3.9963E−01 | −6.0199E−01 | −8.2617E−01 | 1.7229E−01 |
| A12 = | −7.3738E−01 | 1.2118E−01 | 2.6840E−01 | 8.3563E−01 | −5.6417E−01 |
| A14 = | 4.3535E−01 | −9.9945E−03 | −5.7238E−02 | −4.3400E−01 | — |
| A16 = | −1.0962E−01 | — | — | — | — |

| Surface # | | | | | |
|---|---|---|---|---|---|
| | 8 | 9 | 10 | 11 | 12 |
| k = | 0.0000E+00 | −1.2771E+00 | −6.8773E−04 | −1.0000E+00 | 0.0000E+00 |
| A4 = | 2.1009E−01 | −6.7589E−02 | −4.7659E−02 | −7.7705E−02 | −1.0540E−01 |
| A6 = | −7.2332E−02 | 5.4068E−02 | −6.3244E−02 | −6.6311E−02 | 8.0899E−02 |
| A8 = | 8.3174E−02 | −2.0275E−01 | 1.7384E−01 | 4.5682E−01 | −4.2656E−03 |
| A10 = | −6.2084E−02 | 2.9638E−01 | −1.8936E−01 | −6.2743E−01 | −5.0008E−02 |
| A12 = | −2.4059E−01 | −2.1525E−01 | 9.5995E−02 | 4.1190E−01 | 4.0840E−02 |
| A14 = | 2.2554E−01 | 7.9859E−02 | −2.1701E−02 | −1.4377E−01 | −1.5383E−02 |
| A16 = | — | −1.1729E−02 | 1.7502E−03 | 2.5818E−02 | 2.9291E−03 |
| A18 = | — | — | — | −1.8865E−03 | −2.2555E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.50 | (R7 + R8)/(R7 − R8) | 2.76 |
| Fno | 2.47 | f/R1 | 4.17 |
| HFOV [deg.] | 22.3 | f/R10 | −0.42 |
| V2 + V3 + V4 | 62.4 | \|f3/f2\| | 0.57 |
| V30 | 3 | \|f3/f4\| | 0.71 |
| Vmin | 19.4 | \|f/f1\| | 2.21 |
| CT4/CT5 | 1.98 | \|f/f2\| | 0.66 |
| T23/T34 | 0.64 | \|f/f3\| | 1.16 |
| ΣCT/ΣAT | 1.27 | \|f/f4\| | 0.82 |
| TD/BL | 3.10 | \|f/f5\| | 1.14 |
| TL/f | 0.90 | — | — |

5th Embodiment

Figure 9:
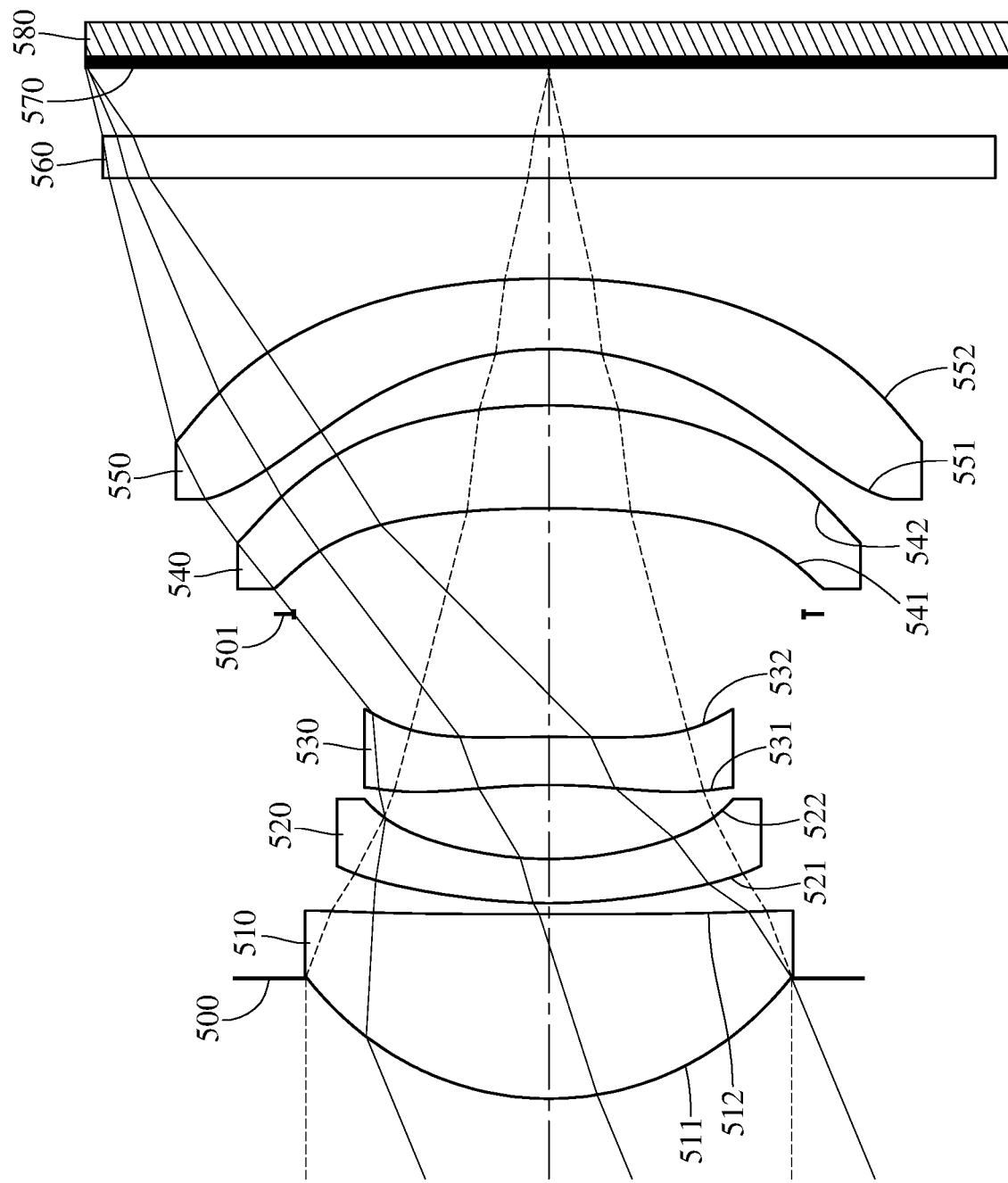
FIG. 9 is a schematic view of an image capturing unit according to the 5th embodiment of the present disclosure.
Figure 10:
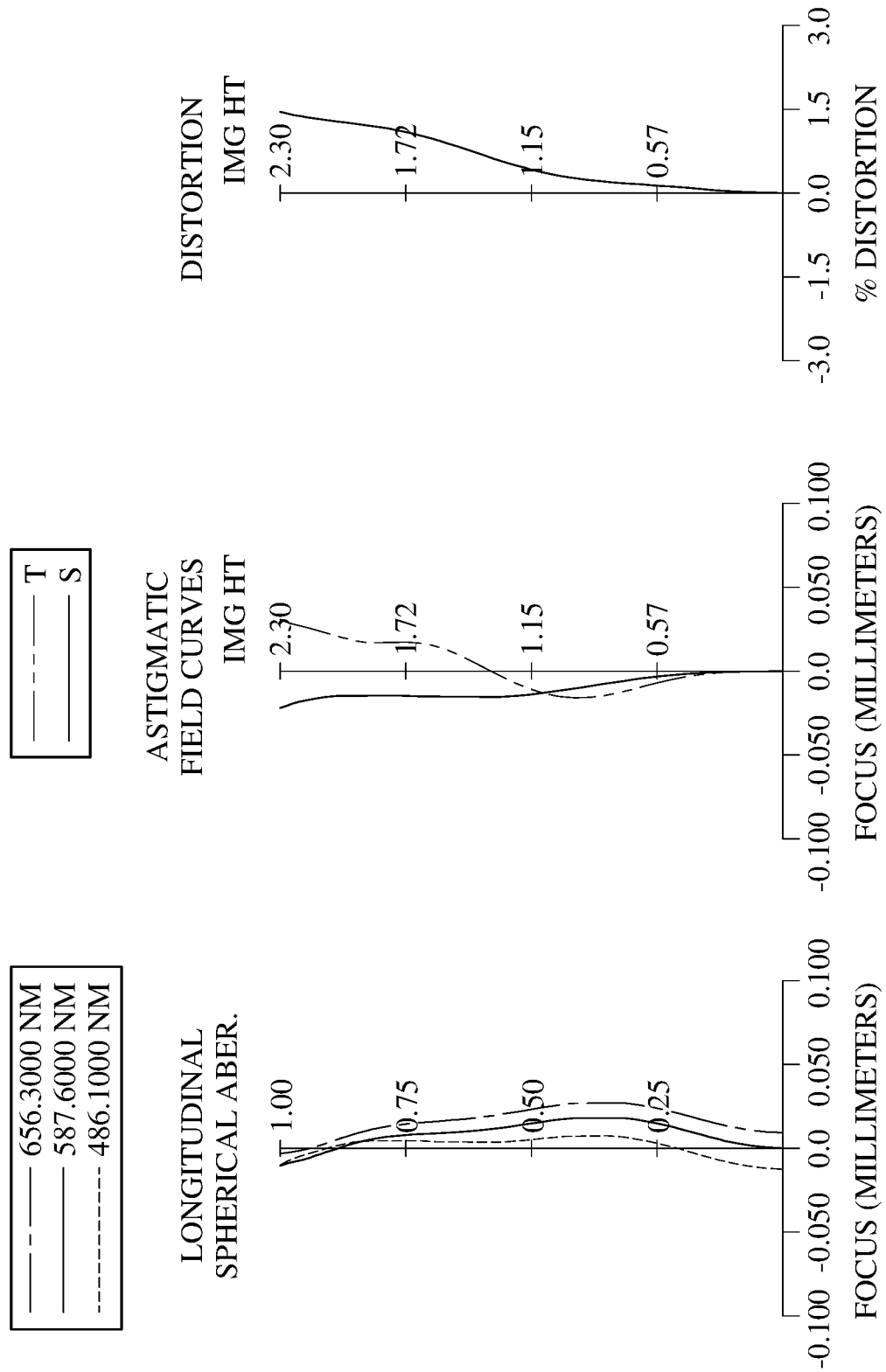
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 580. The optical imaging lens assembly includes, in order from an object side to an image side, an aperture stop 500, a first lens element 510, a second lens element 520, a third lens element 530, a stop 501, a fourth lens element 540, a fifth lens element 550, an IR-cut filter 560 and an image surface 570. The optical imaging lens assembly includes five lens elements (510, 520, 530, 540 and 550) with no additional lens element disposed between each of the adjacent five lens elements, wherein there is an air gap between every adjacent lens element.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric. At least one of the object-side surface 531 and the image-side surface 532 of the third lens element 530 has at least one inflection point.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. At least one of the object-side surface 551 and the image-side surface 552 of the fifth lens element 550 has at least one inflection point.

The IR-cut filter 560 is made of glass material and located between the fifth lens element 550 and the image surface 570, and will not affect the focal length of the optical imaging lens assembly. The image sensor 580 is disposed on or near the image surface 570 of the optical imaging lens assembly.

In this embodiment, an effective radius of the image-side surface 532 of the third lens element 530 is the smallest among all effective radii of the lens surfaces of the five lens elements. In detail, the effective radius of the image-side surface 532 of the third lens element 530 is smaller than the effective radii of the object-side surfaces (511, 521, 531, 541, 551) and the image-side surfaces (512, 522, 542, 552).

The detailed optical data of the 5th embodiment are shown in Table 9 and the aspheric surface data are shown in Table 10 below.

TABLE 9

5th Embodiment
f = 5.46 mm, Fno = 2.25, HFOV = 22.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.600 | | | | |
| 2 | Lens 1 | 1.481 | (ASP) | 0.921 | Plastic | 1.545 | 56.1 | 2.69 |
| 3 | | −103.396 | (ASP) | 0.054 | | | | |
| 4 | Lens 2 | 2.891 | (ASP) | 0.220 | Plastic | 1.660 | 20.4 | −7.27 |
| 5 | | 1.750 | (ASP) | 0.369 | | | | |
| 6 | Lens 3 | −3.190 | (ASP) | 0.240 | Plastic | 1.639 | 23.3 | −7.09 |
| 7 | | −11.122 | (ASP) | 0.612 | | | | |
| 8 | Stop | Plano | | 0.528 | | | | |
| 9 | Lens 4 | −5.710 | (ASP) | 0.513 | Plastic | 1.660 | 20.4 | 7.47 |
| 10 | | −2.740 | (ASP) | 0.281 | | | | |
| 11 | Lens 5 | −1.551 | (ASP) | 0.352 | Plastic | 1.544 | 56.0 | −5.48 |
| 12 | | −3.490 | (ASP) | 0.500 | | | | |
| 13 | IR-cut filter | Plano | | 0.210 | Glass | 1.517 | 64.2 | — |
| 14 | | Plano | | 0.340 | | | | |
| 15 | Image | Plano | | — | | | | |

Note:
Reference wavelength is 587.6 nm (d-line).
An effective radius of the stop 501 (Surface 8) is 1.270 mm.

TABLE 10

Aspheric Coefficients

| | Surface # | | | | |
|---|---|---|---|---|---|
| | 2 | 3 | 4 | 5 | 6 |
| k = | −1.0556E−01 | 5.1926E+01 | −2.1730E+00 | −2.7231E−01 | −9.3478E+00 |
| A4 = | −1.9332E−03 | 2.9898E−02 | −6.9471E−02 | −1.1121E−01 | 1.2966E−01 |
| A6 = | 1.5922E−02 | −1.3091E−02 | 8.4899E−02 | 1.2894E−01 | 7.4060E−03 |
| A8 = | −2.2626E−02 | −7.0256E−03 | −3.2696E−02 | 7.4032E−02 | 2.7245E−01 |
| A10 = | 1.6275E−02 | 8.7338E−03 | 8.2748E−03 | 2.3329E−03 | −6.7397E−01 |
| A12 = | −5.0129E−03 | −2.4273E−03 | 2.6260E−03 | 2.3885E−02 | 7.8435E−01 |
| A14 = | — | — | — | — | −4.1753E−01 |

| | Surface # | | | | |
|---|---|---|---|---|---|
| | 7 | 9 | 10 | 11 | 12 |
| k = | −8.8004E+01 | −1.7387E+01 | −9.4774E−01 | −9.6796E−01 | −4.9222E−01 |
| A4 = | 2.0108E−01 | −4.5338E−02 | 1.3023E−02 | 8.3152E−02 | 1.2692E−02 |
| A6 = | 2.2805E−01 | 3.7217E−02 | −4.3616E−02 | −1.7653E−01 | −9.1689E−02 |
| A8 = | −6.7040E−01 | −1.5810E−01 | −4.0137E−02 | 1.4682E−01 | 1.0447E−01 |
| A10 = | 1.4550E+00 | 1.8677E−01 | 6.2773E−02 | −5.7471E−02 | −6.2409E−02 |
| A12 = | −1.6347E+00 | −1.0130E−01 | −2.6865E−02 | 1.1375E−02 | 2.0641E−02 |
| A14 = | 6.6433E−01 | 2.0585E−02 | 3.2299E−03 | −9.0386E−04 | −3.6573E−03 |
| A16 = | — | — | 2.4578E−04 | — | 2.7329E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.46 | (R7 + R8)/(R7 − R8) | 2.85 |
| Fno | 2.25 | f/R1 | 3.68 |
| HFOV [deg.] | 22.5 | f/R10 | −1.56 |
| V2 + V3 + V4 | 64.1 | \|f3/f2\| | 0.97 |
| V30 | 3 | \|f3/f4\| | 0.95 |
| Vmin | 20.4 | \|f/f1\| | 2.03 |
| CT4/CT5 | 1.46 | \|f/f2\| | 0.75 |
| T23/T34 | 0.32 | \|f/f3\| | 0.77 |
| ΣCT/ΣAT | 1.22 | \|f/f4\| | 0.73 |
| TD/BL | 3.89 | \|f/f5\| | 1.00 |
| TL/f | 0.94 | — | — |

6th Embodiment

Figure 11:
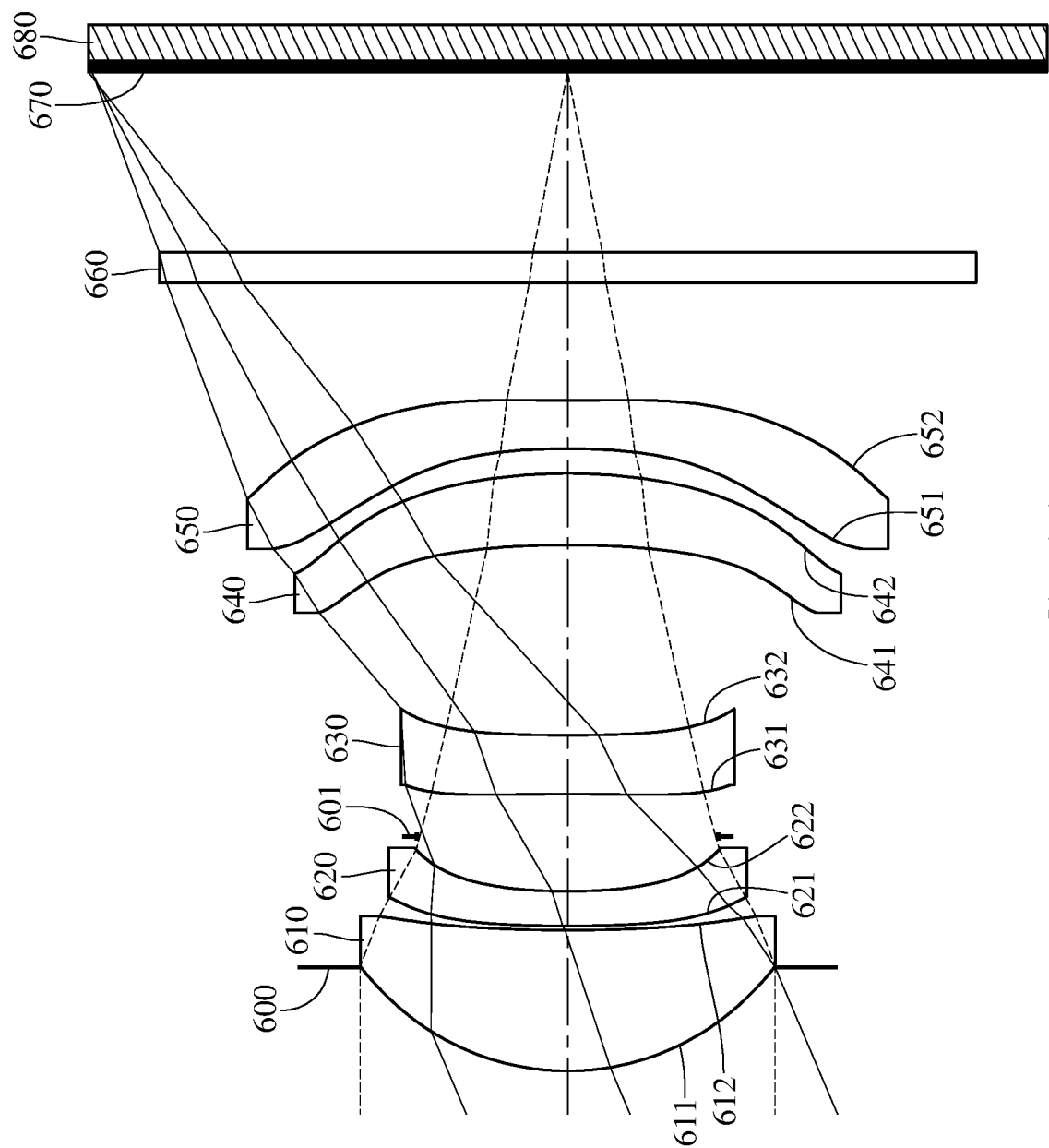
FIG. 11 is a schematic view of an image capturing unit according to the 6th embodiment of the present disclosure.
Figure 12:
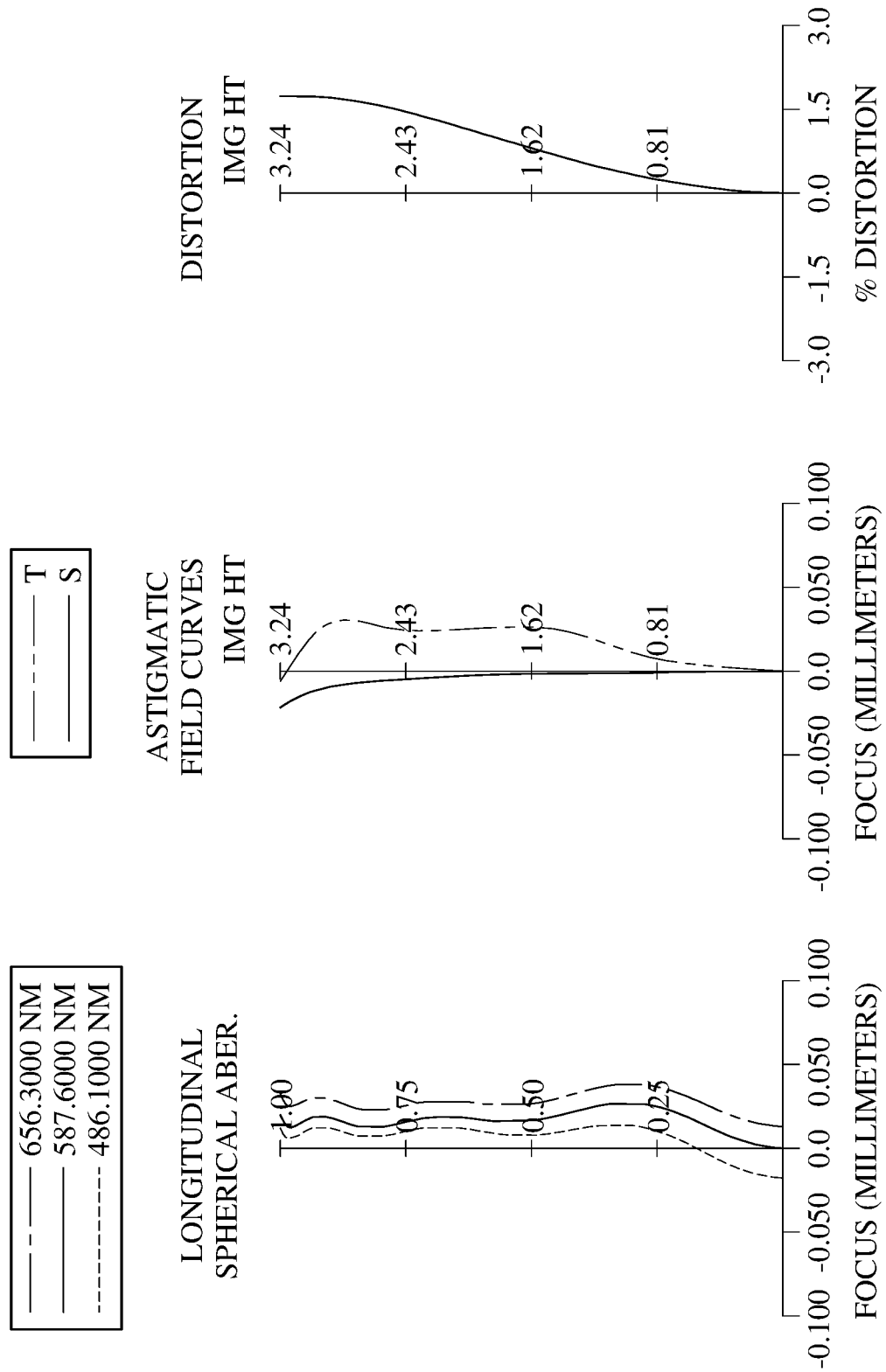
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 680. The optical imaging lens assembly includes, in order from an object side to an image side, an aperture stop 600, a first lens element 610, a second lens element 620, a stop 601, a third lens element 630, a fourth lens element 640, a fifth lens element 650, an IR-cut filter 660 and an image surface 670. The optical imaging lens assembly includes five lens elements (610, 620, 630, 640 and 650) with no additional lens element disposed between each of the adjacent five lens elements, wherein there is an air gap between every adjacent lens element.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric. At least one of the object-side surface 631 and the image-side surface 632 of the third lens element 630 has at least one inflection point.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. At least one of the object-side surface 641 and the image-side surface 642 of the fourth lens element 640 has at least one inflection point.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. At least one of the object-side surface 651 and the image-side surface 652 of the fifth lens element 650 has at least one inflection point.

The IR-cut filter 660 is made of glass material and located between the fifth lens element 650 and the image surface 670, and will not affect the focal length of the optical imaging lens assembly. The image sensor 680 is disposed on or near the image surface 670 of the optical imaging lens assembly.

In this embodiment, an effective radius of the image-side surface 622 of the second lens element 620 is the smallest among all effective radii of the lens surfaces of the five lens elements. In detail, the effective radius of the image-side surface 622 of the second lens element 620 is smaller than the effective radii of the object-side surfaces (611, 621, 631, 641, 651) and the image-side surfaces (612, 632, 642, 652).

The detailed optical data of the 6th embodiment are shown in Table 11 and the aspheric surface data are shown in Table 12 below.

TABLE 11

6th Embodiment
f = 7.48 mm, Fno = 2.65, HFOV = 23.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.706 | | | | |
| 2 | Lens 1 | 1.730 | (ASP) | 0.959 | Plastic | 1.545 | 56.0 | 3.63 |
| 3 | | 11.226 | (ASP) | 0.030 | | | | |
| 4 | Lens 2 | 11.406 | (ASP) | 0.235 | Plastic | 1.660 | 20.4 | −9.33 |
| 5 | | 3.966 | (ASP) | 0.373 | | | | |
| 6 | Stop | Plano | | 0.289 | | | | |
| 7 | Lens 3 | −17.499 | (ASP) | 0.401 | Plastic | 1.584 | 28.2 | −13.10 |
| 8 | | 13.718 | (ASP) | 1.295 | | | | |
| 9 | Lens 4 | −6.200 | (ASP) | 0.488 | Plastic | 1.660 | 20.4 | 11.26 |

TABLE 11-continued

6th Embodiment
f = 7.48 mm, Fno = 2.65, HFOV = 23.0 deg.

| Surface # | | Curvature Radius | | Thickness | Material | Index | Abbe # | Focal Length |
|---|---|---|---|---|---|---|---|---|
| 10 | | −3.485 | (ASP) | 0.167 | | | | |
| 11 | Lens 5 | −5.043 | (ASP) | 0.330 | Plastic | 1.544 | 56.0 | −7.15 |
| 12 | | 17.360 | (ASP) | 0.800 | | | | |
| 13 | IR-cut filter | Plano | | 0.210 | Glass | 1.517 | 64.2 | — |
| 14 | | Plano | | 1.226 | | | | |
| 15 | Image | Plano | | — | | | | |

Note:
Reference wavelength is 587.6 nm (d-line).
An effective radius of the stop 601 (Surface 6) is 1.025 mm.
An effective radius of the image-side surface 652 (Surface 12) is 2.180 mm.

TABLE 12

Aspheric Coefficients

| Surface # | | | | |
|---|---|---|---|---|
| 2 | 3 | 4 | 5 | 7 |

| | | | | |
|---|---|---|---|---|
| k = | −1.8946E−01 | 0.0000E+00 | 0.0000E+00 | −6.5507E+00 | 0.0000E+00 |
| A4 = | 2.7122E−03 | 1.5534E−03 | 4.4102E−02 | 9.2054E−02 | 3.8356E−02 |
| A6 = | 5.7601E−03 | 1.7047E−02 | 1.3459E−02 | −3.6892E−03 | 2.4988E−02 |
| A8 = | −5.3947E−03 | −7.4340E−03 | 1.9672E−03 | 6.9580E−02 | −3.9133E−02 |
| A10 = | 3.5918E−03 | −2.1727E−03 | −3.4541E−03 | −5.8779E−02 | 6.3302E−02 |
| A12 = | −9.2467E−04 | 1.0657E−03 | 8.2100E−04 | 3.6689E−02 | −3.8393E−02 |
| A14 = | — | — | — | — | 8.8091E−03 |

| Surface # | | | | |
|---|---|---|---|---|
| 8 | 9 | 10 | 11 | 12 |

| | | | | |
|---|---|---|---|---|
| k = | 7.7913E+01 | 0.0000E+00 | −3.0071E+00 | 0.0000E+00 | 0.0000E+00 |
| A4 = | 4.9798E−02 | 1.4631E−02 | 4.6956E−02 | −5.1463E−02 | −1.0223E−01 |
| A6 = | 1.4811E−02 | −6.3985E−02 | −1.1549E−01 | −5.0542E−02 | 4.0873E−02 |
| A8 = | −1.2797E−02 | 6.1533E−02 | 9.7429E−02 | 6.3480E−02 | −1.2739E−02 |
| A10 = | 2.3884E−02 | −3.8073E−02 | −4.7672E−02 | −2.8828E−02 | 2.9808E−03 |
| A12 = | −1.1060E−02 | 1.1131E−02 | 1.2657E−02 | 6.6270E−03 | −4.8214E−04 |
| A14 = | 1.7973E−03 | −1.1329E−03 | −1.6561E−03 | −7.3598E−04 | 3.5411E−05 |
| A16 = | — | — | 8.6087E−05 | 3.0125E−05 | — |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 7.48 | (R7 + R8)/(R7 − R8) | 3.57 |
| Fno | 2.65 | f/R1 | 4.32 |
| HFOV [deg.] | 23.0 | f/R10 | 0.43 |
| V2 + V3 + V4 | 69.0 | |f3/f2| | 1.40 |
| V30 | 3 | |f3/f4| | 1.16 |
| Vmin | 20.4 | |f/f1| | 2.06 |
| CT4/CT5 | 1.48 | |f/f2| | 0.80 |
| T23/T34 | 0.51 | |f/f3| | 0.57 |
| ΣCT/ΣAT | 1.12 | |f/f4| | 0.66 |
| TD/BL | 2.04 | |f/f5| | 1.05 |
| TL/f | 0.91 | — | — |

7th Embodiment

Figure 13:
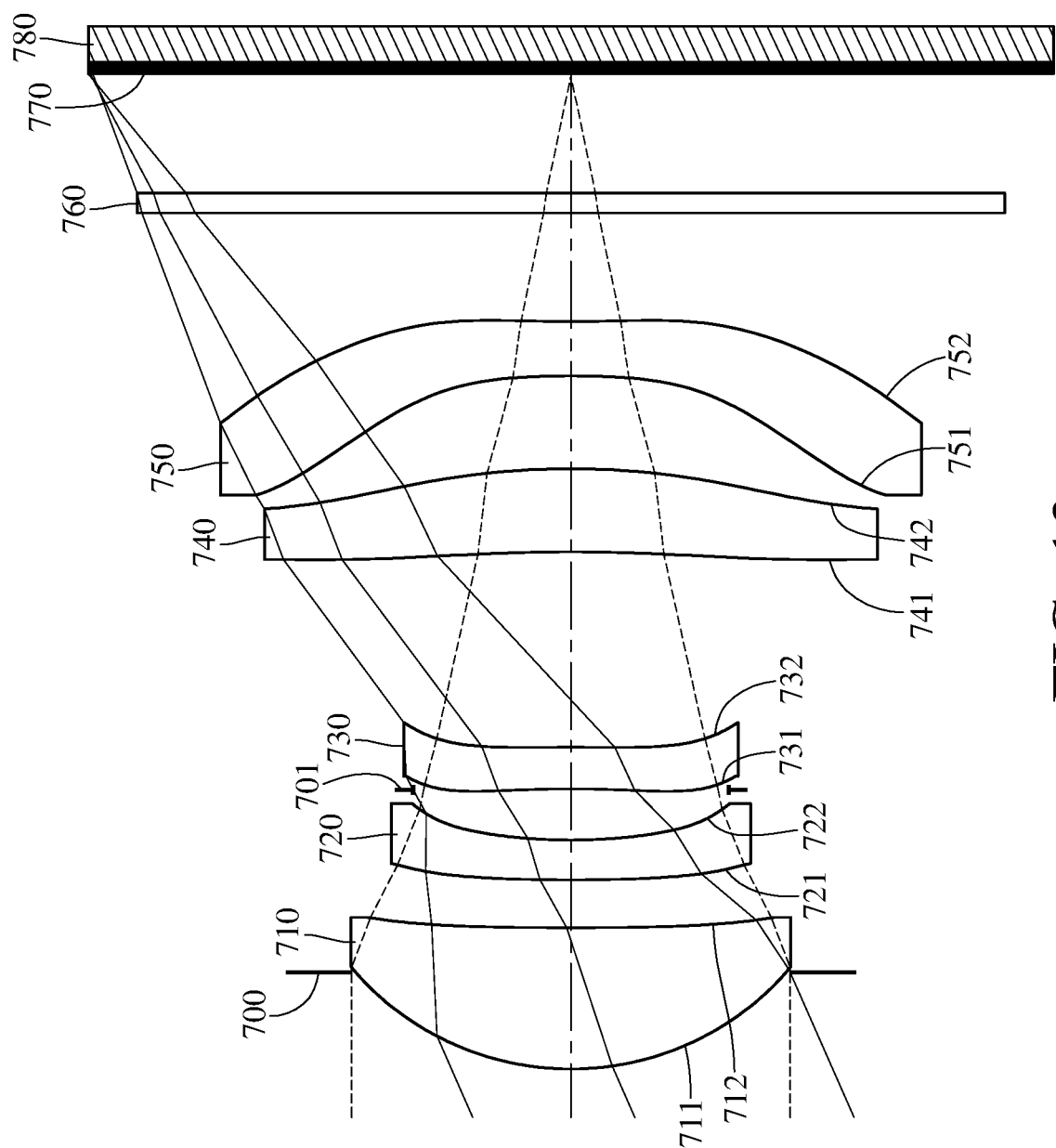
FIG. 13 is a schematic view of an image capturing unit according to the 7th embodiment of the present disclosure.
Figure 14:
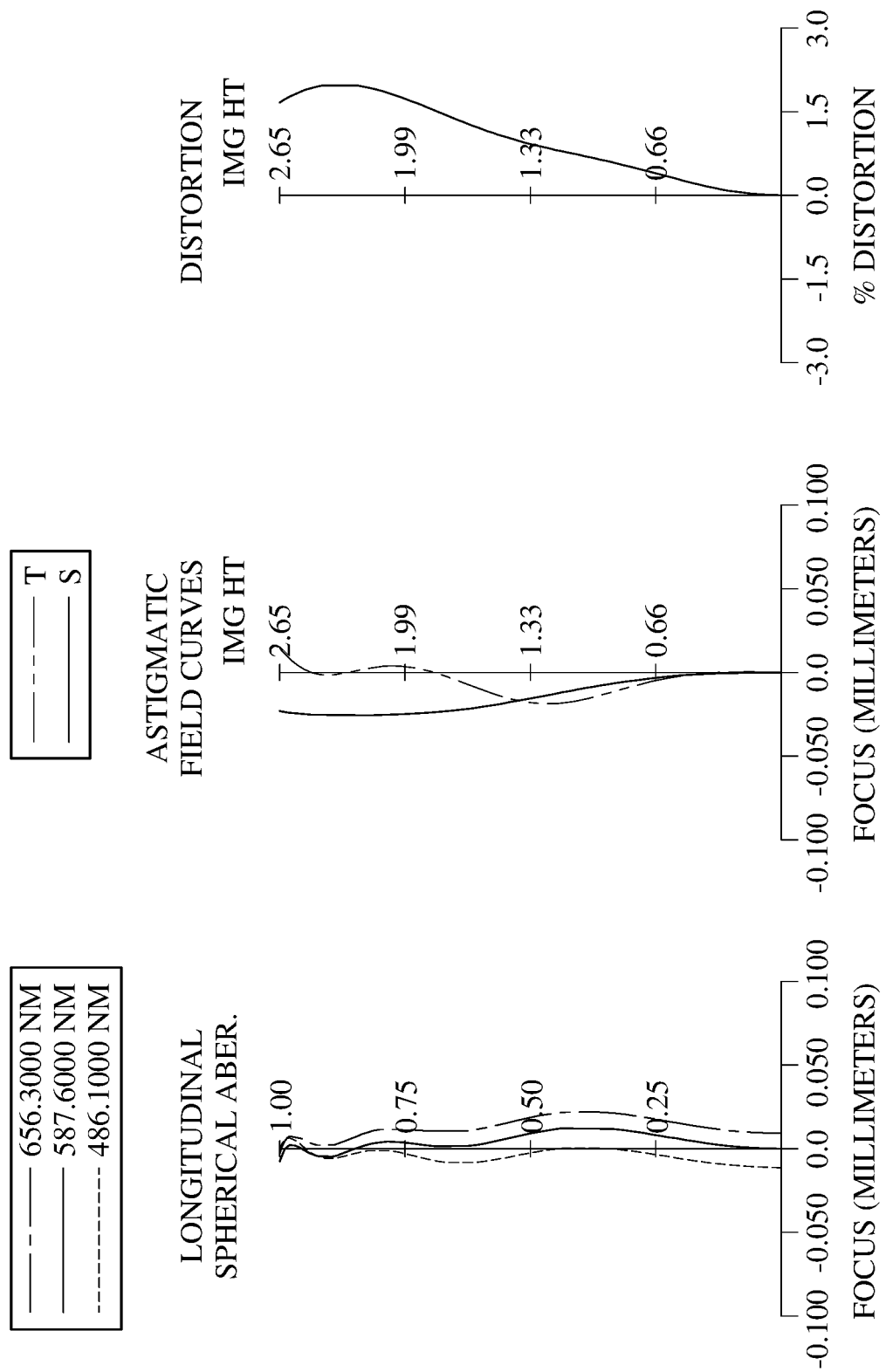
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 780. The optical imaging lens assembly includes, in order from an object side to an image side, an aperture stop 700, a first lens element 710, a second lens element 720, a stop 701, a third lens element 730, a fourth lens element 740, a fifth lens element 750, an IR-cut filter 760 and an image surface 770. The optical imaging lens assembly includes five lens elements (710, 720, 730, 740 and 750) with no additional lens element disposed between each of the adjacent five lens elements, wherein there is an air gap between every adjacent lens element.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric. At least one of the object-side surface 731 and the image-side surface 732 of the third lens element 730 has at least one inflection point.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric. At least one of the object-side surface 741 and the image-side surface 742 of the fourth lens element 740 has at least one inflection point.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. At least one of the object-side surface 751 and the image-side surface 752 of the fifth lens element 750 has at least one inflection point.

The IR-cut filter 760 is made of glass material and located between the fifth lens element 750 and the image surface 770, and will not affect the focal length of the optical imaging lens assembly. The image sensor 780 is disposed on or near the image surface 770 of the optical imaging lens assembly.

In this embodiment, an effective radius of the image-side surface 722 of the second lens element 720 is the smallest among all effective radii of the lens surfaces of the five lens elements. In detail, the effective radius of the image-side surface 722 of the second lens element 720 is smaller than the effective radii of the object-side surfaces (711, 721, 731, 741, 751) and the image-side surfaces (712, 732, 742, 752).

The detailed optical data of the 7th embodiment are shown in Table 13 and the aspheric surface data are shown in Table 14 below.

TABLE 13

7th Embodiment
f = 5.92 mm, Fno = 2.45, HFOV = 23.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.533 | | | | |
| 2 | Lens 1 | 1.591 | (ASP) | 0.780 | Plastic | 1.545 | 56.1 | 3.03 |
| 3 | | 34.833 | (ASP) | 0.264 | | | | |
| 4 | Lens 2 | 12.166 | (ASP) | 0.220 | Plastic | 1.669 | 19.5 | −6.65 |
| 5 | | 3.232 | (ASP) | 0.277 | | | | |
| 6 | Stop | Plano | | 0.005 | | | | |
| 7 | Lens 3 | −6.084 | (ASP) | 0.230 | Plastic | 1.614 | 26.0 | −13.68 |
| 8 | | −22.433 | (ASP) | 1.078 | | | | |
| 9 | Lens 4 | −9.234 | (ASP) | 0.459 | Plastic | 1.669 | 19.5 | 10.92 |
| 10 | | −4.159 | (ASP) | 0.512 | | | | |
| 11 | Lens 5 | −5.789 | (ASP) | 0.300 | Plastic | 1.544 | 56.0 | −5.87 |
| 12 | | 7.261 | (ASP) | 0.600 | | | | |
| 13 | IR-cut filter | Plano | | 0.110 | Glass | 1.517 | 64.2 | — |
| 14 | | Plano | | 0.656 | | | | |
| 15 | Image | Plano | | — | | | | |

Note:
Reference wavelength is 587.6 nm (d-line).
An effective radius of the stop 701 (Surface 6) is 0.870 mm.
An effective radius of the image-side surface 752 (Surface 12) is 1.932 mm.

TABLE 14

Aspheric Coefficients

| Surface # | 2 | 3 | 4 | 5 | 7 |
|---|---|---|---|---|---|
| k = | −3.0048E−01 | 7.1114E+01 | 8.9714E+01 | −4.5455E+00 | −9.0000E+01 |
| A4 = | 8.6306E−03 | 3.3371E−02 | 3.0759E−02 | 2.9596E−02 | 2.4059E−02 |
| A6 = | 4.1340E−03 | −1.3464E−02 | 4.5735E−02 | 1.5241E−01 | 3.2985E−01 |
| A8 = | 2.7547E−03 | −7.1312E−03 | −2.0701E−01 | −3.9208E−01 | −6.6285E−01 |
| A10 = | −4.1960E−03 | 1.9900E−02 | 4.9400E−01 | 1.0703E+00 | 1.2897E+00 |
| A12 = | 2.7108E−03 | −8.1604E−03 | −4.5870E−01 | −7.1133E−01 | −1.0963E+00 |
| A14 = | — | — | 1.3702E−01 | — | 2.9620E−01 |

TABLE 14-continued

| Aspheric Coefficients | | | | | |
|---|---|---|---|---|---|
| Surface # | 8 | 9 | 10 | 11 | 12 |
| k = | −9.0000E+01 | 7.9829E+00 | −4.2831E+01 | 1.3136E−01 | 1.5912E+00 |
| A4 = | 1.3357E−01 | 2.8226E−02 | −5.2368E−02 | −1.9140E−01 | −1.9648E−01 |
| A6 = | 2.2924E−01 | −2.0474E−02 | 2.6367E−02 | 1.7880E−02 | 8.3681E−02 |
| A8 = | −4.0739E−01 | 1.6618E−02 | −8.2719E−03 | 7.0775E−02 | −1.7915E−02 |
| A10 = | 5.2608E−01 | −3.3506E−03 | 9.2402E−03 | −4.5956E−02 | 3.4072E−04 |
| A12 = | −2.7693E−01 | −2.5451E−03 | −5.9646E−03 | 1.3383E−02 | 7.1865E−04 |
| A14 = | 4.9952E−03 | 1.3580E−03 | 1.6116E−03 | −1.9058E−03 | −1.6858E−04 |
| A16 = | — | −1.8521E−04 | −1.5722E−04 | 1.0618E−04 | 1.4433E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.92 | (R7 + R8)/(R7 − R8) | 2.64 |
| Fno | 2.45 | f/R1 | 3.72 |
| HFOV [deg.] | 23.7 | f/R10 | 0.82 |
| V2 + V3 + V4 | 64.9 | |f3/f2| | 2.06 |
| V30 | 3 | |f3/f4| | 1.25 |
| Vmin | 19.5 | |f/f1| | 1.95 |
| CT4/CT5 | 1.53 | |f/f2| | 0.89 |
| T23/T34 | 0.26 | |f/f3| | 0.43 |
| ΣCT/ΣAT | 0.93 | |f/f4| | 0.54 |
| TD/BL | 3.02 | |f/f5| | 1.01 |
| TL/f | 0.93 | — | — |

8th Embodiment

Figure 15:
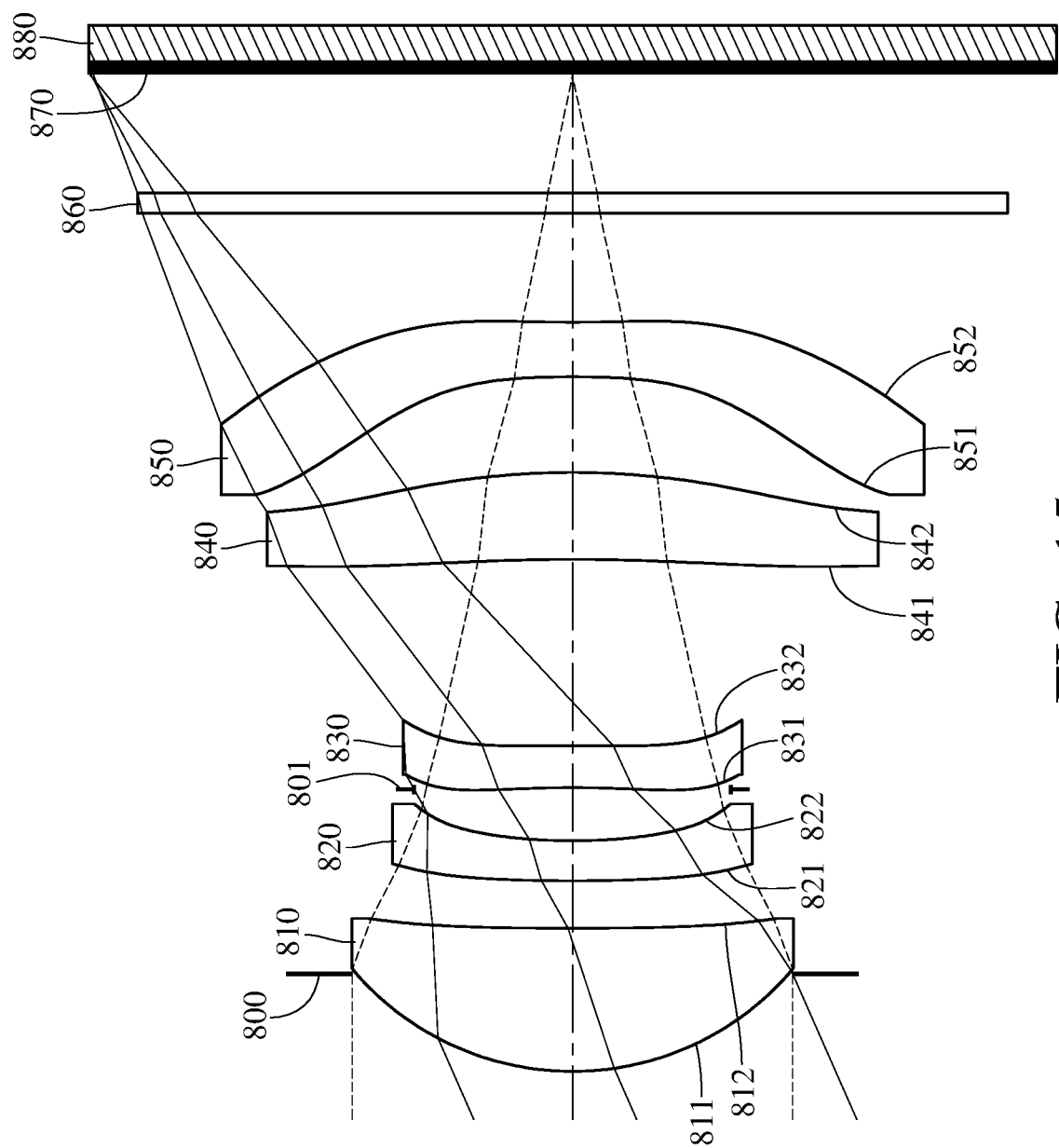
FIG. 15 is a schematic view of an image capturing unit according to the 8th embodiment of the present disclosure.
Figure 16:
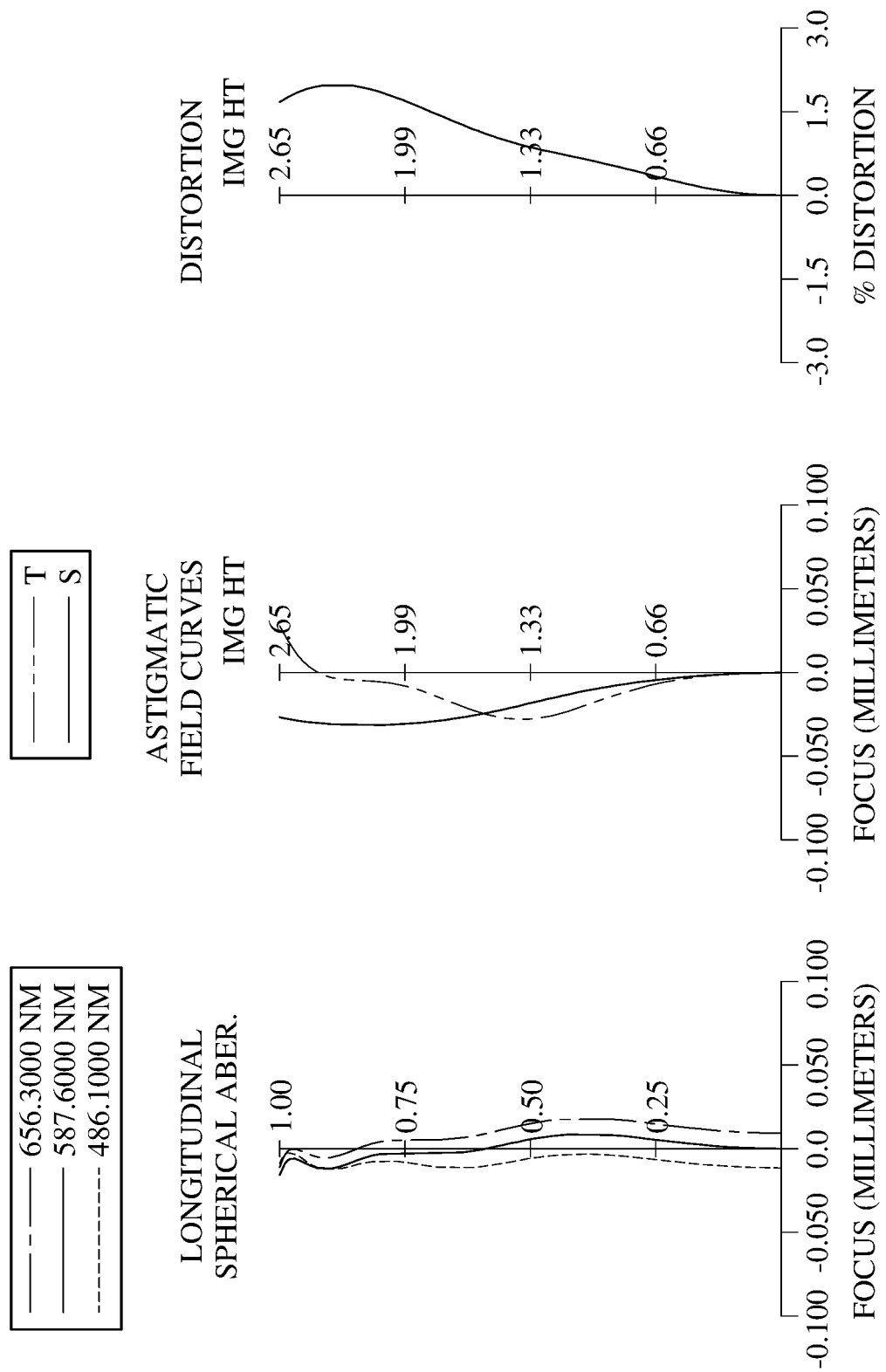
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens assembly (its reference numeral is omitted) of the present disclosure and an image sensor 880. The optical imaging lens assembly includes, in order from an object side to an image side, an aperture stop 800, a first lens element 810, a second lens element 820, a stop 801, a third lens element 830, a fourth lens element 840, a fifth lens element 850, an IR-cut filter 860 and an image surface 870. The optical imaging lens assembly includes five lens elements (810, 820, 830, 840 and 850) with no additional lens element disposed between each of the adjacent five lens elements, wherein there is an air gap between every adjacent lens element.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric. At least one of the object-side surface 831 and the image-side surface 832 of the third lens element 830 has at least one inflection point.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. At least one of the object-side surface 841 and the image-side surface 842 of the fourth lens element 840 has at least one inflection point.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. At least one of the object-side surface 851 and the image-side surface 852 of the fifth lens element 850 has at least one inflection point.

The IR-cut filter 860 is made of glass material and located between the fifth lens element 850 and the image surface 870, and will not affect the focal length of the optical imaging lens assembly. The image sensor 880 is disposed on or near the image surface 870 of the optical imaging lens assembly.

In this embodiment, an effective radius of the image-side surface 822 of the second lens element 820 is the smallest among all effective radii of the lens surfaces of the five lens elements. In detail, the effective radius of the image-side surface 822 of the second lens element 820 is smaller than the effective radii of the object-side surfaces (811, 821, 831, 841, 851) and the image-side surfaces (812, 832, 842, 852).

The detailed optical data of the 8th embodiment are shown in Table 15 and the aspheric surface data are shown in Table 16 below.

TABLE 15

8th Embodiment
f = 5.93 mm, Fno = 2.45, HFOV = 23.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.536 | | | | |
| 2 | Lens 1 | 1.585 | (ASP) | 0.787 | Plastic | 1.545 | 56.1 | 3.02 |
| 3 | | 34.441 | (ASP) | 0.261 | | | | |
| 4 | Lens 2 | 11.747 | (ASP) | 0.220 | Plastic | 1.669 | 19.5 | −6.71 |
| 5 | | 3.223 | (ASP) | 0.282 | | | | |
| 6 | Stop | Plano | | 0.010 | | | | |
| 7 | Lens 3 | −5.827 | (ASP) | 0.230 | Plastic | 1.614 | 26.0 | −12.55 |
| 8 | | −24.297 | (ASP) | 1.025 | | | | |
| 9 | Lens 4 | −10.319 | (ASP) | 0.478 | Plastic | 1.669 | 19.5 | 10.93 |
| 10 | | −4.358 | (ASP) | 0.526 | | | | |
| 11 | Lens 5 | −5.620 | (ASP) | 0.300 | Plastic | 1.544 | 56.0 | −5.99 |
| 12 | | 7.915 | (ASP) | 0.600 | | | | |
| 13 | IR-cut filter | Plano | | 0.110 | Glass | 1.517 | 64.2 | — |
| 14 | | Plano | | 0.659 | | | | |
| 15 | Image | Plano | | — | | | | |

Note:
Reference wavelength is 587.6 nm (d-line).
An effective radius of the stop 801 (Surface 6) is 0.870 mm.

TABLE 16

Aspheric Coefficients

| Surface # | 2 | 3 | 4 | 5 | 7 |
|---|---|---|---|---|---|
| k = | −3.0513E−01 | −8.3492E+01 | 9.0000E+01 | −2.7750E+00 | −8.8916E+01 |
| A4 = | 9.0182E−03 | 3.5300E−02 | 3.8886E−02 | 4.0179E−02 | 4.7016E−02 |
| A6 = | 4.4177E−03 | −2.3502E−02 | −1.7032E−03 | 8.7337E−02 | 1.7642E−01 |
| A8 = | 1.4481E−03 | 6.7623E−03 | −9.5662E−02 | −2.1392E−01 | −1.7024E−01 |
| A10 = | −3.0733E−03 | 1.1006E−02 | 3.6821E−01 | 8.7175E−01 | 4.7107E−01 |
| A12 = | 2.3379E−03 | −5.9727E−03 | −3.9092E−01 | −6.2948E−01 | −4.3099E−01 |
| A14 = | — | — | 1.2314E−01 | — | 8.3509E−02 |

| Surface # | 8 | 9 | 10 | 11 | 12 |
|---|---|---|---|---|---|
| k = | −4.4543E+01 | 1.2103E+01 | −4.1255E+01 | −1.9324E−01 | 2.5261E+00 |
| A4 = | 1.5337E−01 | 2.7660E−02 | −4.2356E−02 | −1.8482E−01 | −1.9194E−01 |
| A6 = | 1.1634E−01 | −2.7222E−02 | 4.9978E−03 | 2.9587E−03 | 7.6628E−02 |
| A8 = | −9.3461E−02 | 2.6134E−02 | 1.3179E−02 | 8.6839E−02 | −1.1449E−02 |
| A10 = | 6.3407E−02 | −1.0248E−02 | −3.3012E−03 | −5.4176E−02 | −2.7637E−03 |
| A12 = | 5.2193E−02 | 1.7265E−04 | −1.7299E−03 | 1.5616E−02 | 1.5667E−03 |
| A14 = | −8.5980E−02 | 8.6035E−04 | 8.7440E−04 | −2.2239E−03 | −2.9536E−04 |
| A16 = | — | −1.5668E−04 | −1.0750E−04 | 1.2502E−04 | 2.2454E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.93 | (R7 + R8)/(R7 − R8) | 2.46 |
| Fno | 2.45 | f/R1 | 3.74 |
| HFOV [deg.] | 23.8 | f/R10 | 0.75 |
| V2 + V3 + V4 | 64.9 | |f3/f2| | 1.87 |
| V30 | 3 | |f3/f4| | 1.15 |
| Vmin | 19.5 | |f/f1| | 1.96 |
| CT4/CT5 | 1.59 | |f/f2| | 0.88 |
| T23/T34 | 0.28 | |f/f3| | 0.47 |
| ΣCT/ΣAT | 0.96 | |f/f4| | 0.54 |
| TD/BL | 3.01 | |f/f5| | 0.99 |
| TL/f | 0.93 | — | — |

9th Embodiment

Figure 17:
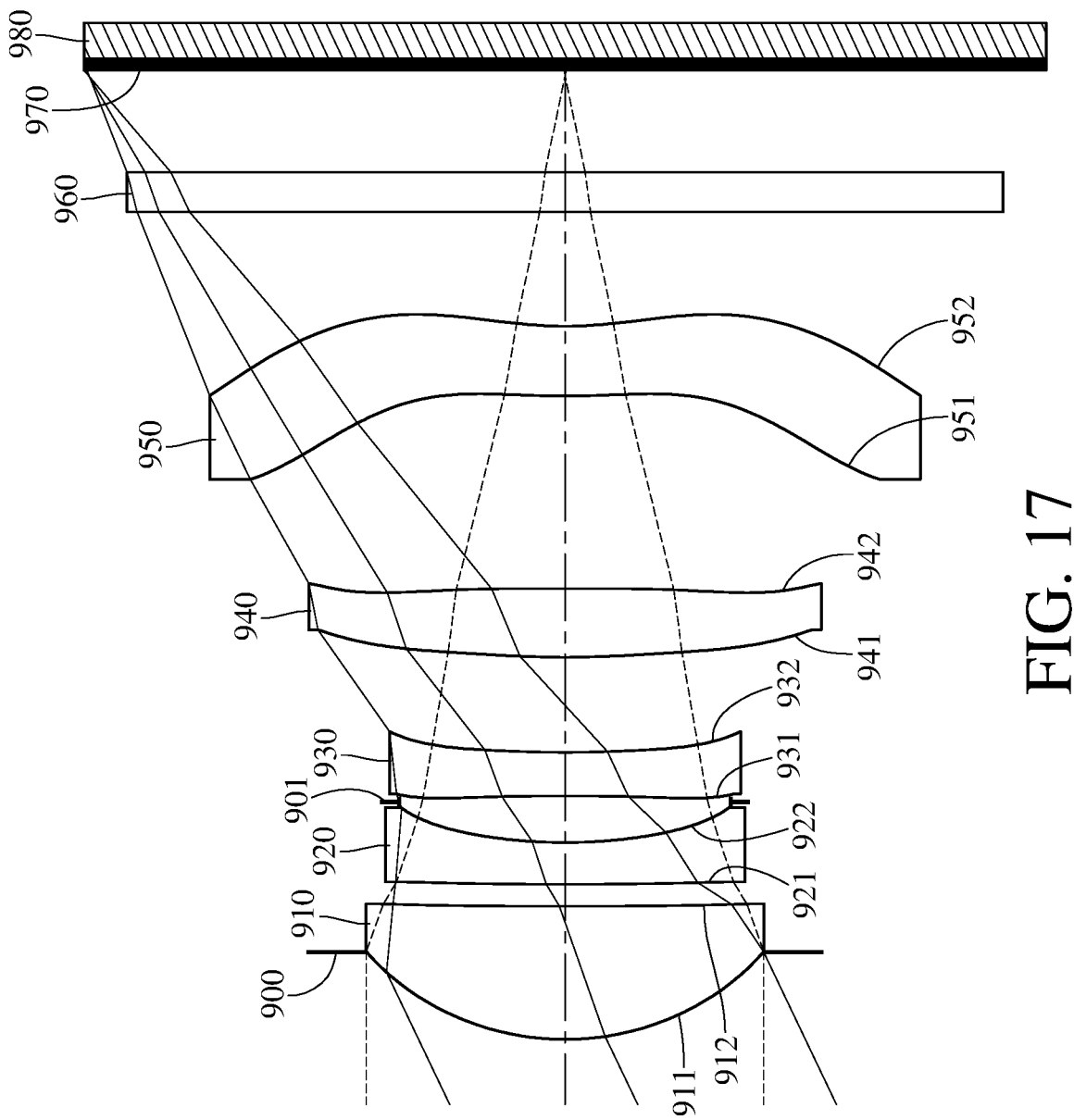
FIG. 17 is a schematic view of an image capturing unit according to the 9th embodiment of the present disclosure.
Figure 18:
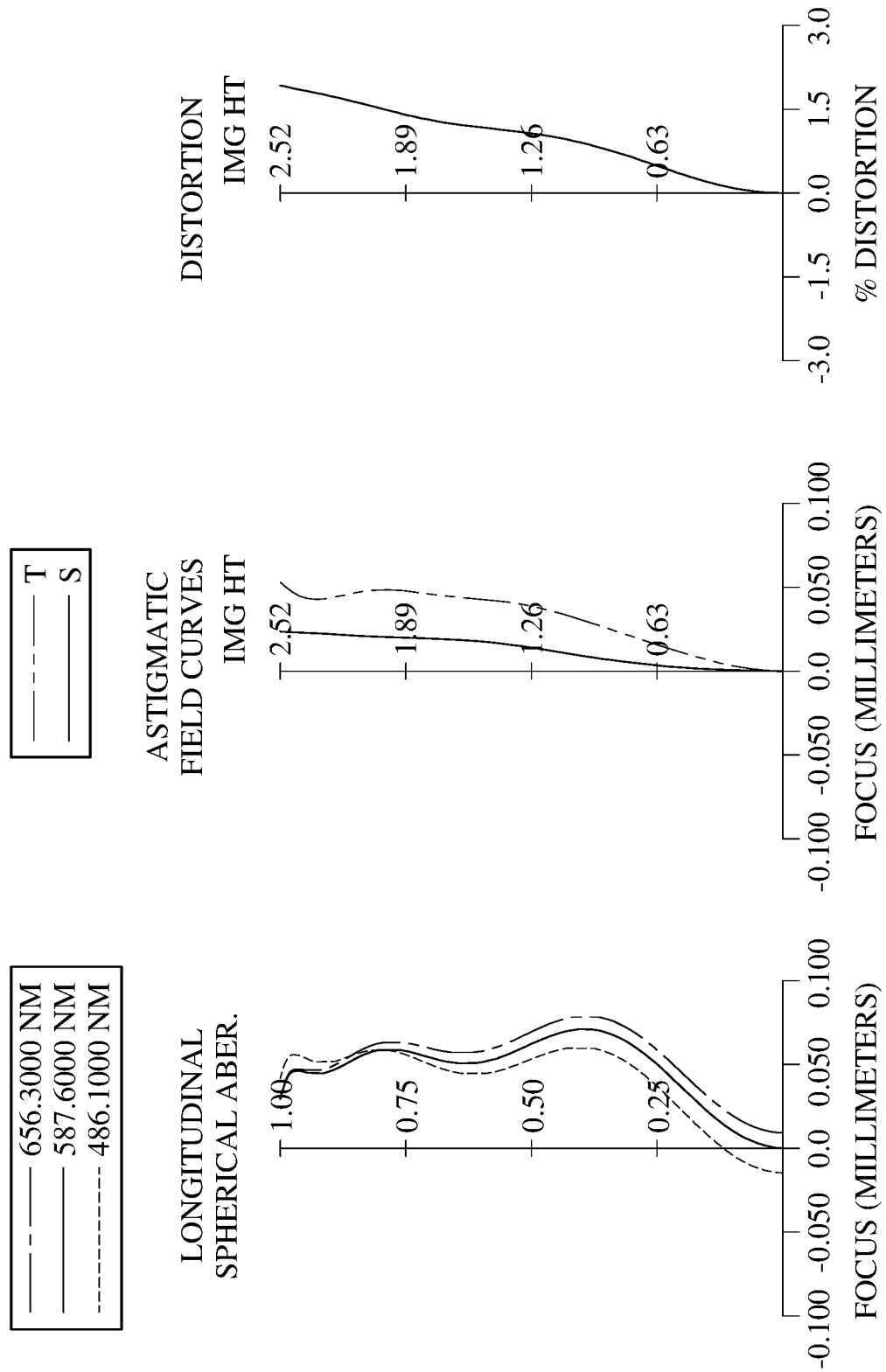
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens assembly (its reference numeral is omitted) of the present disclosure and an image sensor 980.

The optical imaging lens assembly includes, in order from an object side to an image side, an aperture stop 900, a first lens element 910, a second lens element 920, a stop 901, a third lens element 930, a fourth lens element 940, a fifth lens element 950, an IR-cut filter 960 and an image surface 970. The optical imaging lens assembly includes five lens elements (910, 920, 930, 940 and 950) with no additional lens element disposed between each of the adjacent five lens elements, wherein there is an air gap between every adjacent lens element.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with negative refractive power has an object-side surface 931 being concave in a paraxial region thereof and an image-side surface 932 being concave in a paraxial region thereof. The third lens element 930 is made of plastic material and has the object-side surface 931 and the image-side surface 932 being both aspheric. At least one of the object-side surface 931 and the image-side surface 932 of the third lens element 930 has at least one inflection point.

The fourth lens element 940 with positive refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. At least one of the object-side surface 941 and the image-side surface 942 of the fourth lens element 940 has at least one inflection point.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. At least one of the object-side surface 951 and the image-side surface 952 of the fifth lens element 950 has at least one inflection point.

The IR-cut filter 960 is made of glass material and located between the fifth lens element 950 and the image surface 970, and will not affect the focal length of the optical imaging lens assembly. The image sensor 980 is disposed on or near the image surface 970 of the optical imaging lens assembly.

In this embodiment, an effective radius of the image-side surface 922 of the second lens element 920 is the smallest among all effective radii of the lens surfaces of the five lens elements. In detail, the effective radius of the image-side surface 922 of the second lens element 920 is smaller than the effective radii of the object-side surfaces (911, 921, 931, 941, 951) and the image-side surfaces (912, 932, 942, 952).

The detailed optical data of the 9th embodiment are shown in Table 17 and the aspheric surface data are shown in Table 18 below.

TABLE 17

9th embodiment
f = 5.11 mm, Fno = 2.45, HFOV = 25.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.458 | | | | |
| 2 | Lens 1 | 1.439 | (ASP) | 0.700 | Plastic | 1.545 | 56.1 | 2.69 |
| 3 | | 68.330 | (ASP) | 0.115 | | | | |
| 4 | Lens 2 | 20.684 | (ASP) | 0.220 | Plastic | 1.614 | 26.0 | −5.01 |
| 5 | | 2.666 | (ASP) | 0.214 | | | | |
| 6 | Stop | Plano | | 0.030 | | | | |
| 7 | Lens 3 | −100.000 | (ASP) | 0.230 | Plastic | 1.660 | 20.4 | −7.98 |
| 8 | | 5.567 | (ASP) | 0.500 | | | | |
| 9 | Lens 4 | 4.803 | (ASP) | 0.361 | Plastic | 1.660 | 20.4 | 7.61 |
| 10 | | 107.293 | (ASP) | 1.013 | | | | |
| 11 | Lens 5 | 4.476 | (ASP) | 0.367 | Plastic | 1.534 | 55.9 | −7.58 |
| 12 | | 2.064 | (ASP) | 0.600 | | | | |
| 13 | IR-cut filter | Plano | | 0.210 | Glass | 1.517 | 64.2 | — |
| 14 | | Plano | | 0.535 | | | | |
| 15 | Image | Plano | | — | | | | |

Note:
Reference wavelength is 587.6 nm (d-line).
An effective radius of the stop 901 (Surface 6) is 0.870 mm.

TABLE 18

| Aspheric Coefficients | | | | | |
|---|---|---|---|---|---|
| Surface # | 2 | 3 | 4 | 5 | 7 |
| k = | 4.2787E−02 | 0.0000E+00 | −7.1586E+01 | −3.9090E+01 | −1.2326E+01 |
| A4 = | −5.9437E−03 | −1.1727E−03 | −7.3354E−02 | 1.7107E−01 | −2.3268E−01 |
| A6 = | 2.8511E−02 | 4.1966E−02 | 3.8183E−01 | −1.0199E−01 | 7.2414E−01 |
| A8 = | −4.7358E−02 | −8.9071E−02 | −1.0153E+00 | 1.4583E−01 | −1.0458E+00 |
| A10 = | 4.1920E−02 | 9.4498E−02 | 1.4882E+00 | −2.8564E−02 | 1.0056E+00 |
| A12 = | −1.1361E−02 | −4.1221E−02 | −1.1377E+00 | 4.0691E−02 | −4.0541E−01 |
| A14 = | — | — | 3.4300E−01 | — | — |
| Surface # | 8 | 9 | 10 | 11 | 12 |
| k = | 0.0000E+00 | 0.0000E+00 | −1.0000E+00 | −3.6760E+00 | −2.3447E+00 |
| A4 = | −1.9162E−01 | −1.3256E−01 | −1.0478E−01 | −3.0751E−01 | −2.9390E−01 |
| A6 = | 5.7969E−01 | 1.4265E−01 | 1.0431E−01 | 1.1670E−01 | 1.7489E−01 |
| A8 = | −6.1505E−01 | −5.7001E−02 | −3.6797E−02 | −1.8428E−02 | −8.8697E−02 |
| A10 = | 3.5653E−01 | 9.3390E−03 | 1.9275E−02 | 2.7252E−03 | 3.4658E−02 |
| A12 = | 1.7471E−02 | 6.0775E−04 | −9.2680E−03 | −1.0644E−03 | −9.0387E−03 |
| A14 = | −8.8570E−02 | −5.6494E−04 | 1.4323E−03 | 3.4872E−04 | 1.3511E−03 |
| A16 = | — | — | — | −4.7315E−05 | −8.5626E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 5.11 | (R7 + R8)/(R7 − R8) | −1.09 |
| Fno | 2.45 | f/R1 | 3.55 |
| HFOV [deg.] | 25.5 | f/R10 | 2.48 |
| V2 + V3 + V4 | 66.8 | |f3/f2| | 1.59 |
| V30 | 3 | |f3/f4| | 1.05 |
| Vmin | 20.4 | |f/f1| | 1.90 |
| CT4/CT5 | 0.98 | |f/f2| | 1.02 |
| T23/T34 | 0.49 | |f/f3| | 0.64 |
| ΣCT/ΣAT | 1.00 | |f/f4| | 0.67 |
| TD/BL | 2.79 | |f/f5| | 0.68 |
| TL/f | 1.00 | — | — |

10th Embodiment

Figure 19:
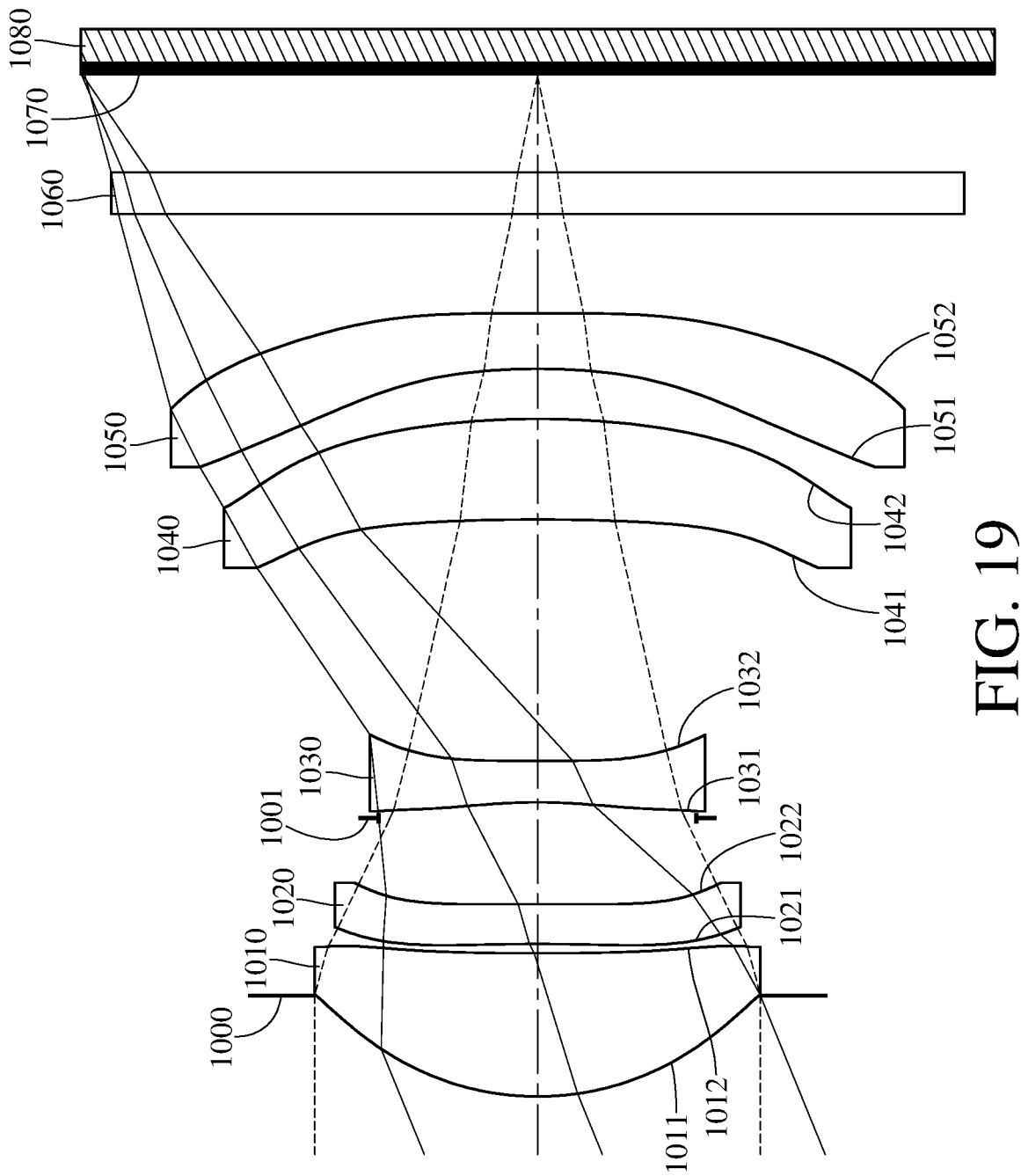
FIG. 19 is a schematic view of an image capturing unit according to the 10th embodiment of the present disclosure.
Figure 20:
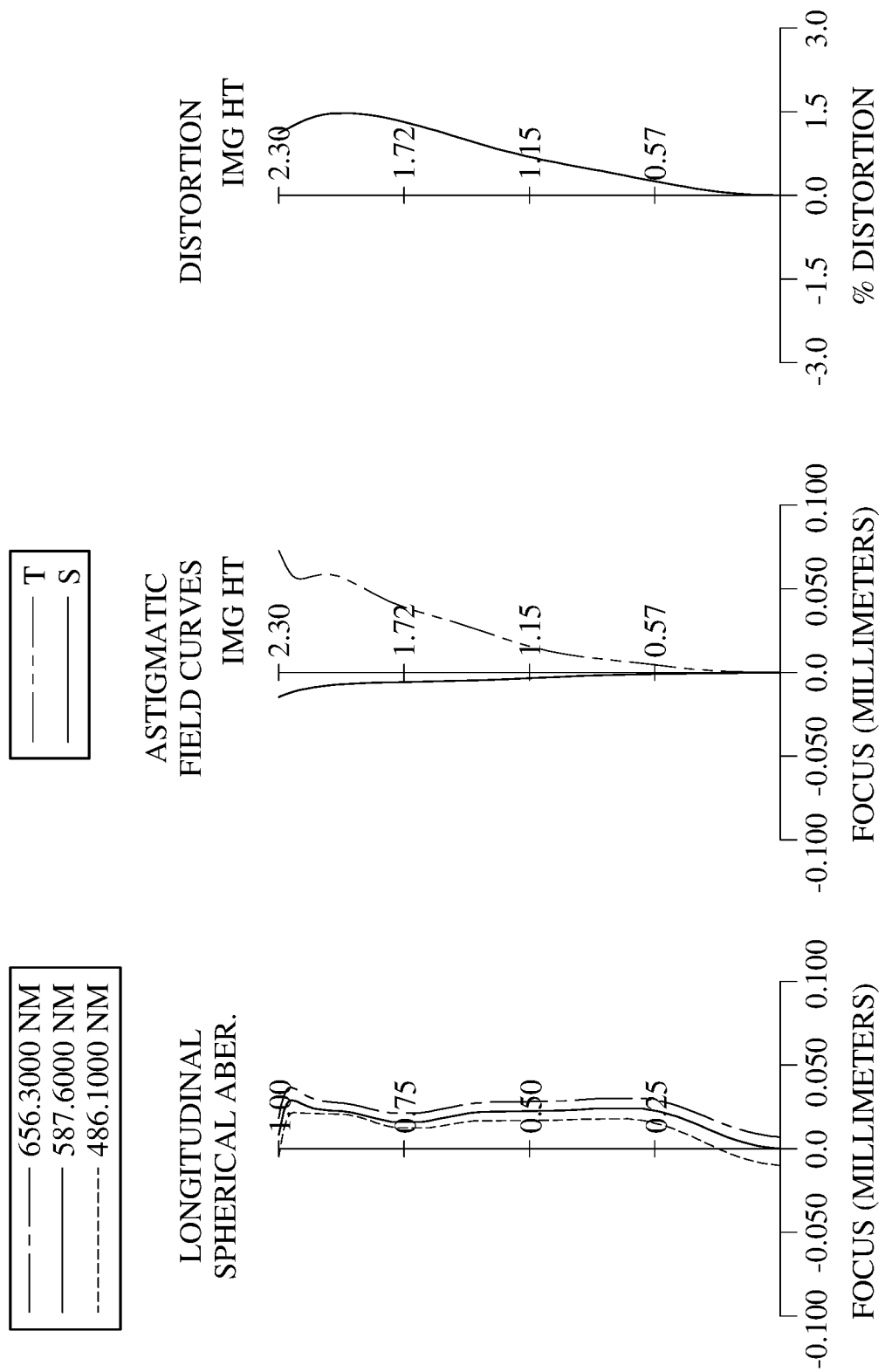
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens assembly (its reference numeral is omitted) of the present disclosure and an image sensor 1080. The optical imaging lens assembly includes, in order from an object side to an image side, an aperture stop 1000, a first lens element 1010, a second lens element 1020, a stop 1001, a third lens element 1030, a fourth lens element 1040, a fifth lens element 1050, an IR-cut filter 1060 and an image surface 1070. The optical imaging lens assembly includes five lens elements (1010, 1020, 1030, 1040 and 1050) with no additional lens element disposed between each of the adjacent five lens elements, wherein there is an air gap between every adjacent lens element.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. At least one of the object-side surface 1011 and the image-side surface 1012 of the first lens element 1010 has at least one inflection point.

The second lens element 1020 with negative refractive power has an object-side surface 1021 being concave in a paraxial region thereof and an image-side surface 1022 being convex in a paraxial region thereof. The second lens element 1020 is made of plastic material and has the object-side surface 1021 and the image-side surface 1022 being both aspheric. At least one of the object-side surface 1021 and the image-side surface 1022 of the second lens element 1020 has at least one inflection point.

The third lens element 1030 with negative refractive power has an object-side surface 1031 being concave in a paraxial region thereof and an image-side surface 1032 being convex in a paraxial region thereof. The third lens element 1030 is made of plastic material and has the object-side surface 1031 and the image-side surface 1032 being both aspheric.

The fourth lens element 1040 with positive refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric. At least one of the object-side surface 1041 and the image-side surface 1042 of the fourth lens element 1040 has at least one inflection point.

The fifth lens element 1050 with negative refractive power has an object-side surface 1051 being concave in a paraxial region thereof and an image-side surface 1052 being planar in a paraxial region thereof. The fifth lens element 1050 is made of plastic material and has the object-side surface 1051 and the image-side surface 1052 being both aspheric. At least one of the object-side surface 1051 and the image-side surface 1052 of the fifth lens element 1050 has at least one inflection point.

The IR-cut filter 1060 is made of glass material and located between the fifth lens element 1050 and the image surface 1070, and will not affect the focal length of the optical imaging lens assembly. The image sensor 1080 is disposed on or near the image surface 1070 of the optical imaging lens assembly.

In this embodiment, an effective radius of the object-side surface 1031 of the third lens element 1030 is the smallest among all effective radii of the lens surfaces of the five lens elements. In detail, the effective radius of the object-side surface 1031 of the third lens element 1030 is smaller than the effective radii of the object-side surfaces (1011, 1021, 1041, 1051) and the image-side surfaces (1012, 1022, 1032, 1042, 1052).

The detailed optical data of the 10th embodiment are shown in Table 19 and the aspheric surface data are shown in Table 20 below.

Moreover, these parameters can be calculated from Table 19 and Table 20 as the following values and satisfy the following conditions:

| 10th Embodiment | | | |
|---|---|---|---|
| f [mm] | 5.54 | (R7 + R8)/(R7 − R8) | 2.26 |
| Fno | 2.47 | f/R1 | 3.96 |
| HFOV [deg.] | 22.2 | f/R10 | 0.00 |

TABLE 19

10th embodiment
f = 5.54 mm, Fno = 2.47, HFOV = 22.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.509 | | | | |
| 2 | Lens 1 | 1.400 | (ASP) | 0.722 | Plastic | 1.545 | 56.0 | 2.73 |
| 3 | | 19.458 | (ASP) | 0.047 | | | | |
| 4 | Lens 2 | −8.912 | (ASP) | 0.201 | Plastic | 1.700 | 16.9 | −22.15 |
| 5 | | −21.157 | (ASP) | 0.433 | | | | |
| 6 | Stop | Plano | | 0.080 | | | | |
| 7 | Lens 3 | −2.596 | (ASP) | 0.209 | Plastic | 1.624 | 24.0 | −4.38 |
| 8 | | −52.833 | (ASP) | 1.216 | | | | |
| 9 | Lens 4 | −11.011 | (ASP) | 0.507 | Plastic | 1.700 | 16.9 | 9.63 |
| 10 | | −4.261 | (ASP) | 0.252 | | | | |
| 11 | Lens 5 | −3.402 | (ASP) | 0.280 | Plastic | 1.544 | 55.9 | −6.26 |
| 12 | | ∞ | (ASP) | 0.500 | | | | |
| 13 | IR-cut filter | Plano | | 0.210 | Glass | 1.517 | 64.2 | — |
| 14 | | Plano | | 0.496 | | | | |
| 15 | Image | Plano | | — | | | | |

Note:
Reference wavelength is 587.6 nm (d-line).
An effective radius of the stop 1001 (Surface 6) is 0.800 mm.

TABLE 20

| Aspheric Coefficients | | | | | |
|---|---|---|---|---|---|
| Surface # | 2 | 3 | 4 | 5 | 7 |
| k = | 2.8533E−02 | 0.0000E+00 | 0.0000E+00 | 7.0094E+01 | −5.2371E+01 |
| A4 = | −1.3452E−02 | 1.4701E−02 | 1.0540E−01 | 1.3946E−01 | 4.5847E−02 |
| A6 = | 5.8515E−02 | 1.1845E−01 | 9.6173E−02 | −2.4673E−02 | 4.1440E−01 |
| A8 = | −1.8817E−01 | −2.1596E−01 | −1.1322E−01 | 3.1272E−01 | −1.1723E+00 |
| A10 = | 3.2231E−01 | 1.1389E−01 | 4.2194E−02 | −6.1927E−01 | 1.3513E+00 |
| A12 = | −3.3433E−01 | −1.2483E−02 | 2.0719E−02 | 6.9136E−01 | −7.1944E−01 |
| A14 = | 1.8344E−01 | −7.6665E−03 | −1.8114E−02 | −3.3537E−01 | — |
| A16 = | −4.4991E−02 | — | — | — | — |

| Surface # | 8 | 9 | 10 | 11 | 12 |
|---|---|---|---|---|---|
| k = | 0.0000E+00 | 1.2243E+01 | 5.4895E−01 | −1.0000E+00 | 0.0000E+00 |
| A4 = | 4.3007E−01 | −5.0048E−03 | 1.0376E−02 | −8.3523E−02 | −1.1352E−01 |
| A6 = | −4.6136E−01 | −8.0417E−03 | −4.1143E−02 | −5.1447E−02 | 9.2508E−03 |
| A8 = | 9.6536E−01 | −4.1688E−02 | 2.6667E−02 | 1.6868E−01 | 6.2948E−02 |
| A10 = | −1.7962E+00 | 5.3185E−02 | −7.8649E−03 | −1.3147E−01 | −6.0246E−02 |
| A12 = | 1.8333E+00 | −4.1445E−02 | −3.9657E−03 | 5.1447E−02 | 2.8990E−02 |
| A14 = | −7.7396E−01 | 1.8059E−02 | 3.0239E−03 | −1.0960E−02 | −8.1815E−03 |
| A16 = | — | −2.9570E−03 | −4.6724E−04 | 1.1812E−03 | 1.2681E−03 |
| A18 = | — | — | — | −4.6891E−05 | −8.2815E−05 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

-continued

| 10th Embodiment | | | |
|---|---|---|---|
| V2 + V3 + V4 | 57.8 | |f3/f2| | 0.20 |
| V30 | 3 | |f3/f4| | 0.45 |
| Vmin | 16.9 | |f/f1| | 2.03 |
| CT4/CT5 | 1.81 | |f/f2| | 0.25 |

-continued

| | 10th Embodiment | | |
|---|---|---|---|
| T23/T34 | 0.42 | \|f/f3\| | 1.27 |
| ΣCT/ΣAT | 0.95 | \|f/f4\| | 0.58 |
| TD/BL | 3.27 | \|f/f5\| | 0.89 |
| TL/f | 0.93 | — | — |

11th Embodiment

Figure 21:
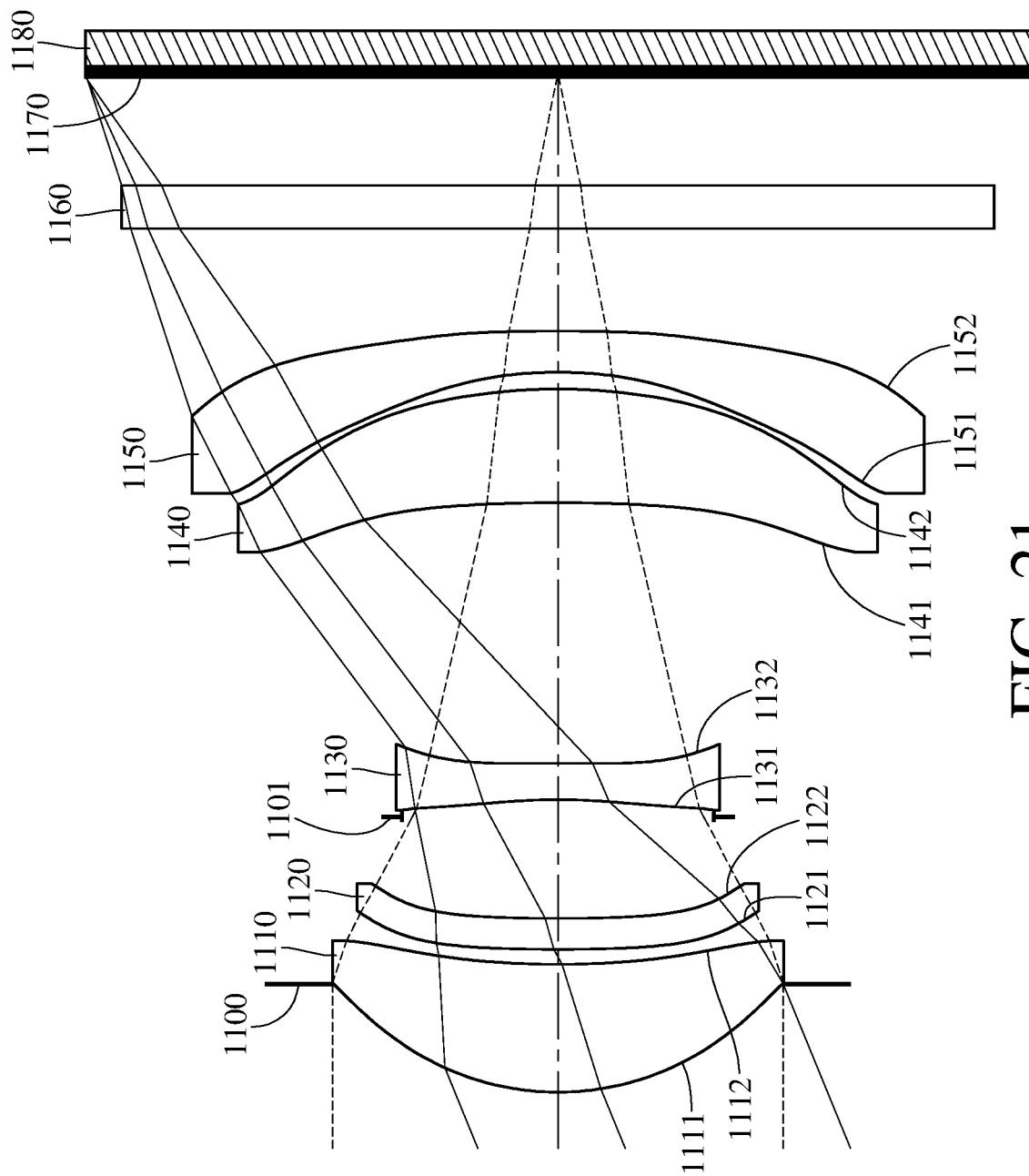
FIG. 21 is a schematic view of an image capturing unit according to the 11th embodiment of the present disclosure.
Figure 22:
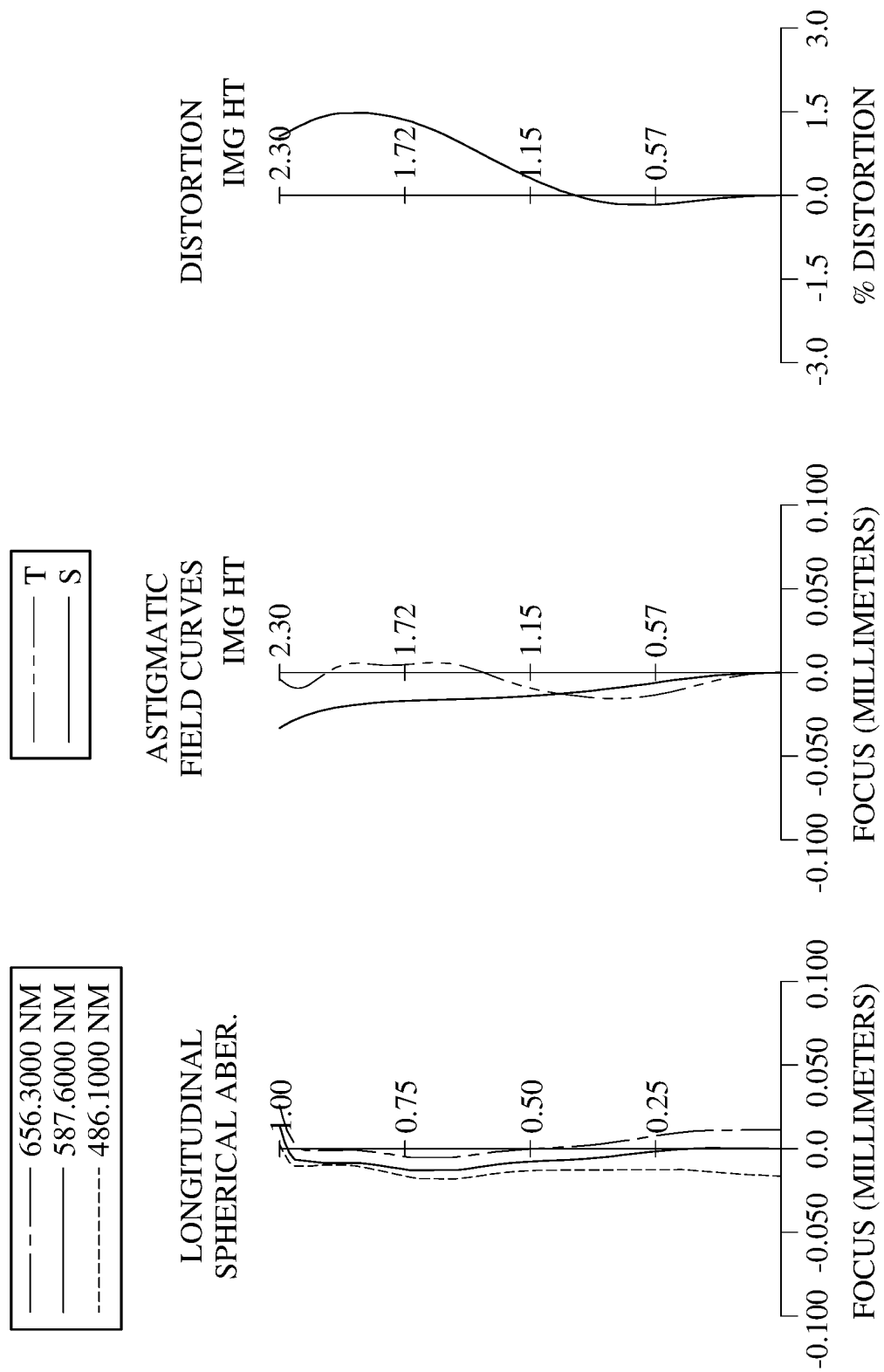
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the optical imaging lens assembly (its reference numeral is omitted) of the present disclosure and an image sensor 1180. The optical imaging lens assembly includes, in order from an object side to an image side, an aperture stop 1100, a first lens element 1110, a second lens element 1120, a stop 1101, a third lens element 1130, a fourth lens element 1140, a fifth lens element 1150, an IR-cut filter 1160 and an image surface 1170. The optical imaging lens assembly includes five lens elements (1110, 1120, 1130, 1140 and 1150) with no additional lens element disposed between each of the adjacent five lens elements, wherein there is an air gap between every adjacent lens element.

The first lens element 1110 with positive refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric.

The second lens element 1120 with positive refractive power has an object-side surface 1121 being convex in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with negative refractive power has an object-side surface 1131 being concave in a paraxial region thereof and an image-side surface 1132 being convex in a paraxial region thereof. The third lens element 1130 is made of plastic material and has the object-side surface 1131 and the image-side surface 1132 being both aspheric.

The fourth lens element 1140 with positive refractive power has an object-side surface 1141 being concave in a paraxial region thereof and an image-side surface 1142 being convex in a paraxial region thereof. The fourth lens element 1140 is made of plastic material and has the object-side surface 1141 and the image-side surface 1142 being both aspheric. At least one of the object-side surface 1141 and the image-side surface 1142 of the fourth lens element 1140 has at least one inflection point.

The fifth lens element 1150 with negative refractive power has an object-side surface 1151 being concave in a paraxial region thereof and an image-side surface 1152 being convex in a paraxial region thereof. The fifth lens element 1150 is made of plastic material and has the object-side surface 1151 and the image-side surface 1152 being both aspheric. At least one of the object-side surface 1151 and the image-side surface 1152 of the fifth lens element 1150 has at least one inflection point.

The IR-cut filter 1160 is made of glass material and located between the fifth lens element 1150 and the image surface 1170, and will not affect the focal length of the optical imaging lens assembly. The image sensor 1180 is disposed on or near the image surface 1170 of the optical imaging lens assembly.

In this embodiment, an effective radius of the object-side surface 1131 of the third lens element 1130 is the smallest among all effective radii of the lens surfaces of the five lens elements. In detail, the effective radius of the object-side surface 1131 of the third lens element 1130 is smaller than the effective radii of the object-side surfaces (1111, 1121, 1141, 1151) and the image-side surfaces (1112, 1122, 1132, 1142, 1152).

The detailed optical data of the 11th embodiment are shown in Table 21 and the aspheric surface data are shown in Table 22 below.

TABLE 21

11th Embodiment
f = 5.55 mm, Fno = 2.53, HFOV = 22.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.526 | | | | |
| 2 | Lens 1 | 1.335 | (ASP) | 0.623 | Plastic | 1.580 | 59.0 | 3.13 |
| 3 | | 4.180 | (ASP) | 0.073 | | | | |
| 4 | Lens 2 | 8.210 | (ASP) | 0.151 | Plastic | 1.710 | 16.6 | 126.80 |
| 5 | | 8.965 | (ASP) | 0.495 | | | | |
| 6 | Stop | Plano | | 0.084 | | | | |
| 7 | Lens 3 | −2.726 | (ASP) | 0.177 | Plastic | 1.710 | 16.6 | −4.58 |
| 8 | | −17.306 | (ASP) | 1.271 | | | | |
| 9 | Lens 4 | −7.896 | (ASP) | 0.554 | Plastic | 1.710 | 16.6 | 5.49 |
| 10 | | −2.685 | (ASP) | 0.082 | | | | |
| 11 | Lens 5 | −2.106 | (ASP) | 0.200 | Plastic | 1.580 | 59.0 | −4.01 |
| 12 | | −22.972 | (ASP) | 0.500 | | | | |
| 13 | IR-cut filter | Plano | | 0.210 | Glass | 1.517 | 64.2 | — |
| 14 | | Plano | | 0.526 | | | | |
| 15 | Image | Plano | | — | | | | |

Note:
Reference wavelength is 587.6 nm (d-line).
An effective radius of the stop 1101 (Surface 6) is 0.760 mm.
An effective radius of the object-side surface 1141 (Surface 9) is 1.450 mm.

TABLE 22

| Aspheric Coefficients | | | | | |
|---|---|---|---|---|---|
| Surface # | 2 | 3 | 4 | 5 | 7 |
| k = | 4.7100E−02 | 0.0000E+00 | 0.0000E+00 | 8.1463E+01 | −2.5836E+01 |
| A4 = | −8.8625E−03 | −6.4469E−02 | −6.2768E−02 | −7.2559E−03 | 1.3192E−01 |
| A6 = | 2.7447E−02 | 3.9057E−01 | 7.3690E−01 | 5.0084E−01 | 1.8149E−01 |
| A8 = | −9.2886E−02 | −7.5880E−01 | −1.5060E+00 | −1.0294E+00 | −8.7575E−01 |
| A10 = | 1.6449E−01 | 6.9336E−01 | 1.9650E+00 | 1.5507E+00 | 1.2699E+00 |
| A12 = | −1.9694E−01 | −3.4440E−01 | −1.3453E+00 | −9.3704E−01 | −9.8569E−01 |
| A14 = | 1.1802E−01 | 7.4453E−02 | 3.5480E−01 | 2.4094E−02 | — |
| A16 = | −3.2265E−02 | — | — | — | — |
| Surface # | 8 | 9 | 10 | 11 | 12 |
| k = | 0.0000E+00 | −4.1415E+01 | −7.8349E−01 | −1.0000E+00 | 0.0000E+00 |
| A4 = | 3.4561E−01 | 1.2649E−03 | 7.9727E−02 | −1.3576E−01 | −2.4868E−01 |
| A6 = | 1.3976E−01 | −9.2781E−02 | −2.4768E−01 | 1.7870E−01 | 4.0617E−01 |
| A8 = | −1.1053E+00 | 5.4449E−02 | 2.4350E−01 | −2.3827E−02 | −3.4732E−01 |
| A10 = | 2.6909E+00 | −1.3061E−03 | −1.1204E−01 | −9.0858E−02 | 1.7419E−01 |
| A12 = | −3.4919E+00 | −1.1733E−02 | 1.2096E−02 | 7.7780E−02 | −5.4075E−02 |
| A14 = | 1.7307E+00 | 6.3417E−03 | 6.7742E−03 | −3.1853E−02 | 1.0123E−02 |
| A16 = | — | −1.1214E−03 | −1.5595E−03 | 7.2053E−03 | −1.0474E−03 |
| A18 = | — | — | — | −7.0133E−04 | 4.7083E−05 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 5.55 | (R7 + R8)/(R7 − R8) | 2.03 |
| Fno | 2.53 | f/R1 | 4.16 |
| HFOV [deg.] | 22.3 | f/R10 | −0.24 |
| V2 + V3 + V4 | 49.8 | \|f3/f2\| | 0.04 |
| V30 | 3 | \|f3/f4\| | 0.83 |
| Vmin | 16.6 | \|f/f1\| | 1.77 |
| CT4/CT5 | 2.77 | \|f/f2\| | 0.04 |
| T23/T34 | 0.46 | \|f/f3\| | 1.21 |
| ΣCT/ΣAT | 0.85 | \|f/f4\| | 1.01 |
| TD/BL | 3.00 | \|f/f5\| | 1.38 |
| TL/f | 0.89 | — | — |

12th Embodiment

Figure 23:
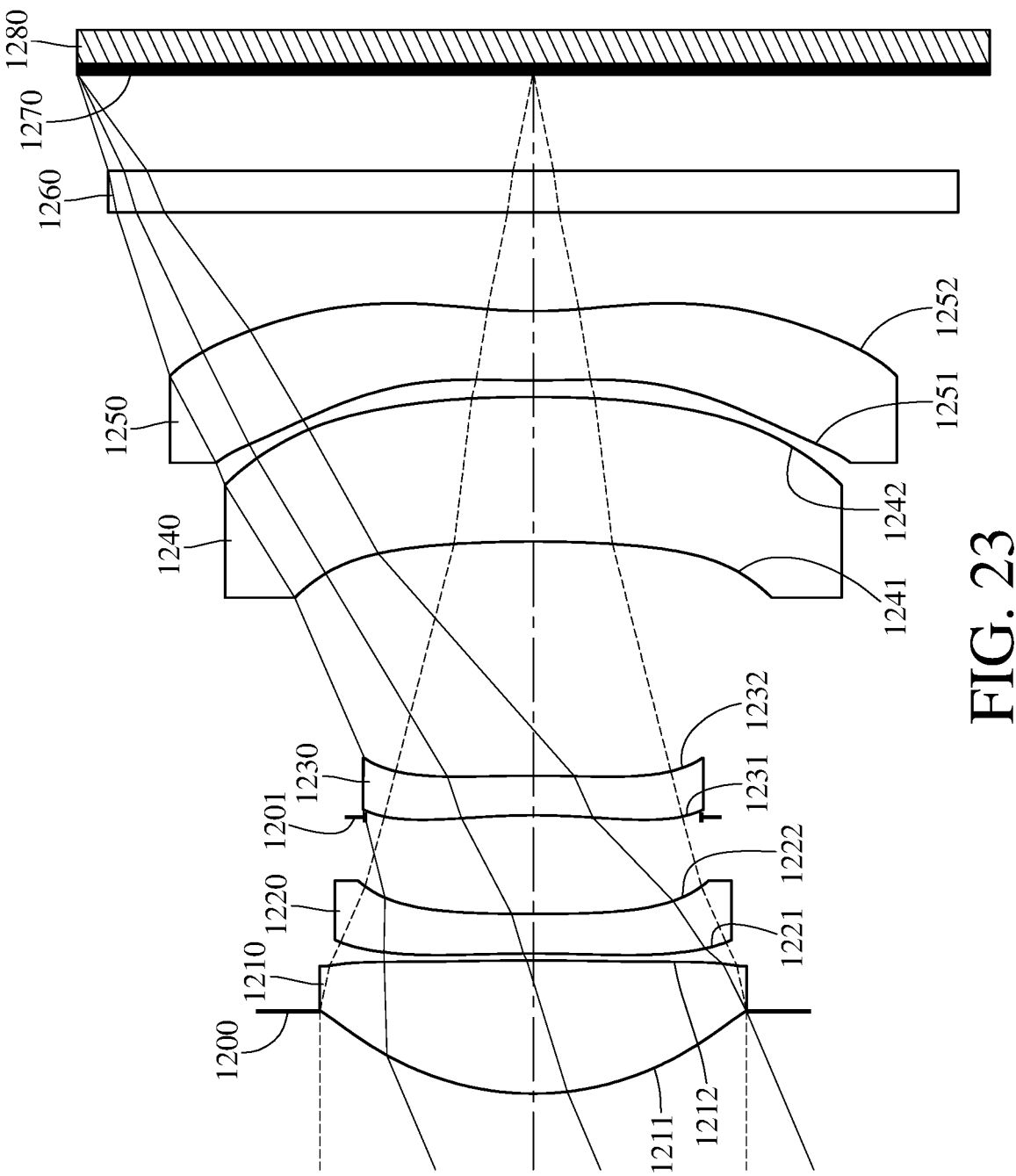
FIG. 23 is a schematic view of an image capturing unit according to the 12th embodiment of the present disclosure.
Figure 24:
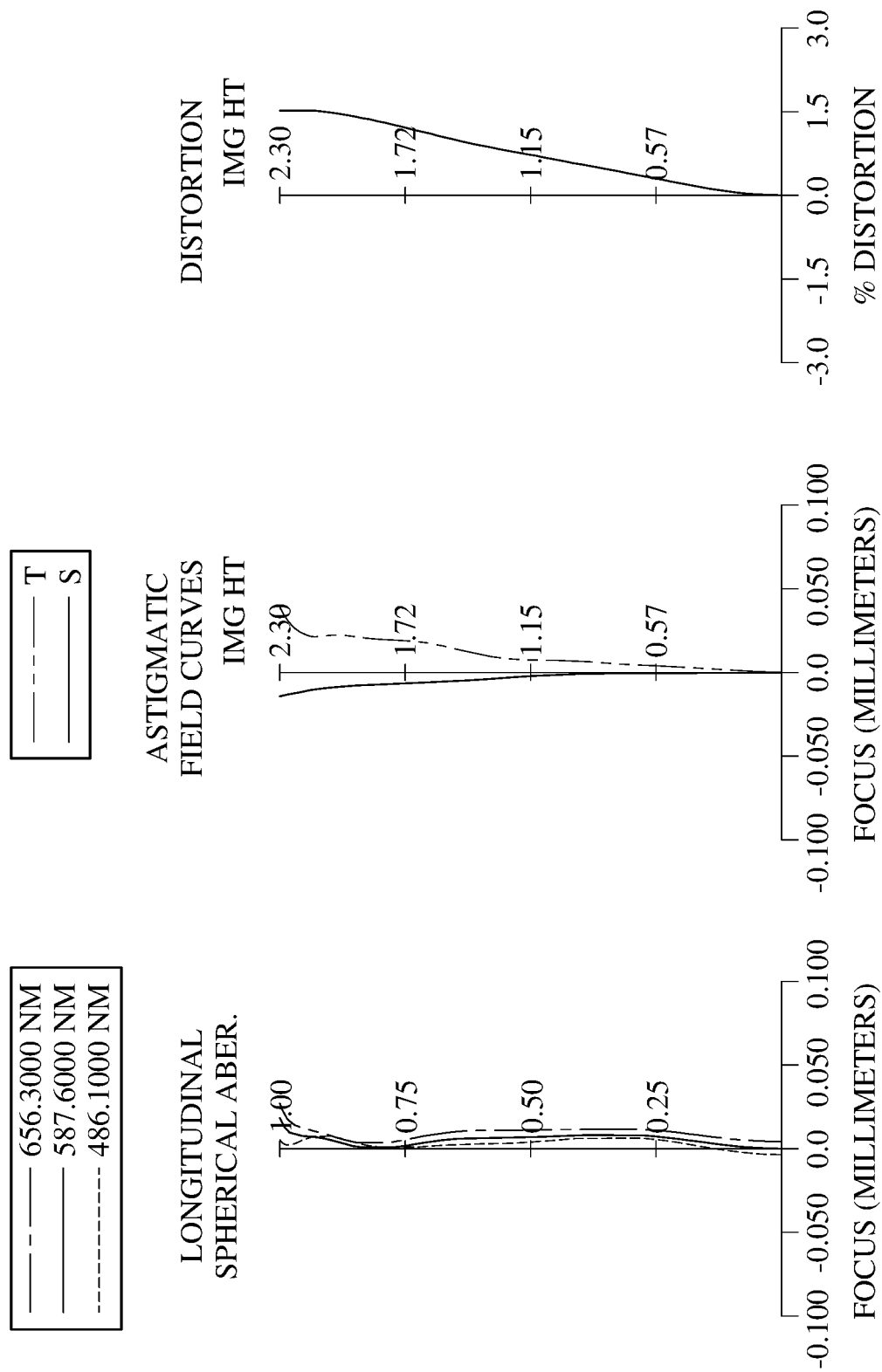
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the optical imaging lens assembly (its reference numeral is omitted) of the present disclosure and an image sensor 1280. The optical imaging lens assembly includes, in order from an object side to an image side, an aperture stop 1200, a first lens element 1210, a second lens element 1220, a stop 1201, a third lens element 1230, a fourth lens element 1240, a fifth lens element 1250, an IR-cut filter 1260 and an image surface 1270. The optical imaging lens assembly includes five lens elements (1210, 1220, 1230, 1240 and 1250) with no additional lens element disposed between each of the adjacent five lens elements, wherein there is an air gap between every adjacent lens element.

The first lens element 1210 with positive refractive power has an object-side surface 1211 being convex in a paraxial region thereof and an image-side surface 1212 being convex in a paraxial region thereof. The first lens element 1210 is made of plastic material and has the object-side surface 1211 and the image-side surface 1212 being both aspheric.

The second lens element 1220 with negative refractive power has an object-side surface 1221 being concave in a paraxial region thereof and an image-side surface 1222 being concave in a paraxial region thereof. The second lens element 1220 is made of plastic material and has the object-side surface 1221 and the image-side surface 1222 being both aspheric. At least one of the object-side surface 1221 and the image-side surface 1222 of the second lens element 1220 has at least one inflection point.

The third lens element 1230 with negative refractive power has an object-side surface 1231 being concave in a paraxial region thereof and an image-side surface 1232 being convex in a paraxial region thereof. The third lens element 1230 is made of plastic material and has the object-side surface 1231 and the image-side surface 1232 being both aspheric. At least one of the object-side surface 1231 and the image-side surface 1232 of the third lens element 1230 has at least one inflection point.

The fourth lens element 1240 with negative refractive power has an object-side surface 1241 being concave in a paraxial region thereof and an image-side surface 1242 being convex in a paraxial region thereof. The fourth lens element 1240 is made of plastic material and has the object-side surface 1241 and the image-side surface 1242 being both aspheric.

The fifth lens element 1250 with negative refractive power has an object-side surface 1251 being convex in a paraxial region thereof and an image-side surface 1252 being concave in a paraxial region thereof. The fifth lens element 1250 is made of plastic material and has the object-side surface 1251 and the image-side surface 1252 being both aspheric. At least one of the object-side surface 1251 and the image-side surface 1252 of the fifth lens element 1250 has at least one inflection point.

The IR-cut filter 1260 is made of glass material and located between the fifth lens element 1250 and the image surface 1270, and will not affect the focal length of the optical imaging lens assembly. The image sensor 1280 is disposed on or near the image surface 1270 of the optical imaging lens assembly.

In this embodiment, an effective radius of the image-side surface 1232 of the third lens element 1230 is the smallest among all effective radii of the lens surfaces of the five lens elements. In detail, the effective radius of the image-side surface 1232 of the third lens element 1230 is smaller than the effective radii of the object-side surfaces (1211, 1221, 1231, 1241, 1251) and the image-side surfaces (1212, 1222, 1242, 1252).

The detailed optical data of the 12th embodiment are shown in Table 23 and the aspheric surface data are shown in Table 24 below.

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 5.33 | (R7 + R8)/(R7 − R8) | −20.12 |
| Fno | 2.47 | f/R1 | 3.56 |
| HFOV [deg.] | 23.0 | f/R10 | 2.20 |

TABLE 23

12th Embodiment
f = 5.33 mm, Fno = 2.47, HFOV = 23.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.415 | | | | |
| 2 | Lens 1 | 1.496 | (ASP) | 0.673 | Plastic | 1.545 | 56.1 | 2.55 |
| 3 | | −16.150 | (ASP) | 0.035 | | | | |
| 4 | Lens 2 | −7.676 | (ASP) | 0.200 | Plastic | 1.632 | 23.4 | −7.36 |
| 5 | | 11.920 | (ASP) | 0.489 | | | | |
| 6 | Stop | Plano | | 0.010 | | | | |
| 7 | Lens 3 | −3.446 | (ASP) | 0.200 | Plastic | 1.582 | 30.2 | −11.25 |
| 8 | | −7.422 | (ASP) | 1.184 | | | | |
| 9 | Lens 4 | −6.674 | (ASP) | 0.731 | Plastic | 1.690 | 16.7 | −178.48 |
| 10 | | −7.372 | (ASP) | 0.084 | | | | |
| 11 | Lens 5 | 6.224 | (ASP) | 0.350 | Plastic | 1.534 | 55.9 | −7.65 |
| 12 | | 2.417 | (ASP) | 0.500 | | | | |
| 13 | IR-cut filter | Plano | | 0.210 | Glass | 1.517 | 64.2 | — |
| 14 | | Plano | | 0.484 | | | | |
| 15 | Image | Plano | | — | | | | |

Note:
Reference wavelength is 587.6 nm (d-line).
An effective radius of the stop 1201 (Surface 6) is 0.850 mm.

TABLE 24

Aspheric Coefficients

| Surface # | 2 | 3 | 4 | 5 | 7 |
|---|---|---|---|---|---|
| k = | 1.2623E−03 | 0.0000E+00 | 0.0000E+00 | 8.9927E+01 | −6.6694E+01 |
| A4 = | −7.1551E−03 | −1.5326E−02 | 9.6958E−02 | 1.5034E−01 | 3.9711E−02 |
| A6 = | 1.8301E−02 | 3.5565E−01 | 3.0121E−01 | −2.9353E−03 | 3.6226E−01 |
| A8 = | −4.6862E−02 | −8.3022E−01 | −7.2599E−01 | 1.9945E−01 | −5.6829E−01 |
| A10 = | 4.1687E−02 | 8.2449E−01 | 7.1978E−01 | −4.5340E−01 | 6.0212E−01 |
| A12 = | −9.3810E−03 | −3.9985E−01 | −3.1063E−01 | 6.1374E−01 | −2.2180E−01 |
| A14 = | −1.9049E−02 | 7.4728E−02 | 5.1902E−02 | −2.4394E−01 | — |
| A16 = | 4.9434E−03 | — | — | — | — |

| Surface # | 8 | 9 | 10 | 11 | 12 |
|---|---|---|---|---|---|
| k = | 0.0000E+00 | 2.7622E+01 | 1.6636E+01 | −1.0000E+00 | 0.0000E+00 |
| A4 = | 2.3596E−01 | 7.6308E−03 | −1.1155E−01 | −5.0144E−01 | −3.9464E−01 |
| A6 = | −7.9012E−02 | −8.8173E−02 | 1.7231E−01 | 5.2766E−01 | 3.6664E−01 |
| A8 = | 3.3389E−01 | 1.6647E−01 | −1.5609E−01 | −3.2095E−01 | −2.8533E−01 |
| A10 = | −6.3769E−01 | −3.2254E−01 | 5.9473E−02 | 6.8268E−02 | 1.6136E−01 |
| A12 = | 7.2678E−01 | 3.4920E−01 | −3.2891E−03 | 3.9824E−02 | −6.1769E−02 |
| A14 = | −2.5574E−01 | −2.0151E−01 | −3.4954E−03 | −3.0153E−02 | 1.4966E−02 |
| A16 = | — | 4.8285E−02 | 6.5294E−04 | 7.5158E−03 | −2.0572E−03 |
| A18 = | — | — | — | −6.8915E−04 | 1.2068E−04 |

-continued

| 12th Embodiment | | | |
|---|---|---|---|
| V2 + V3 + V4 | 70.3 | \|f3/f2\| | 1.53 |
| V30 | 2 | \|f3/f4\| | 0.06 |
| Vmin | 16.7 | \|f/f1\| | 2.09 |
| CT4/CT5 | 2.09 | \|f/f2\| | 0.72 |
| T23/T34 | 0.42 | \|f/f3\| | 0.47 |
| ΣCT/ΣAT | 1.20 | \|f/f4\| | 0.03 |
| TD/BL | 3.31 | \|f/f5\| | 0.70 |
| TL/f | 0.97 | — | — |

13th Embodiment

Figure 25:
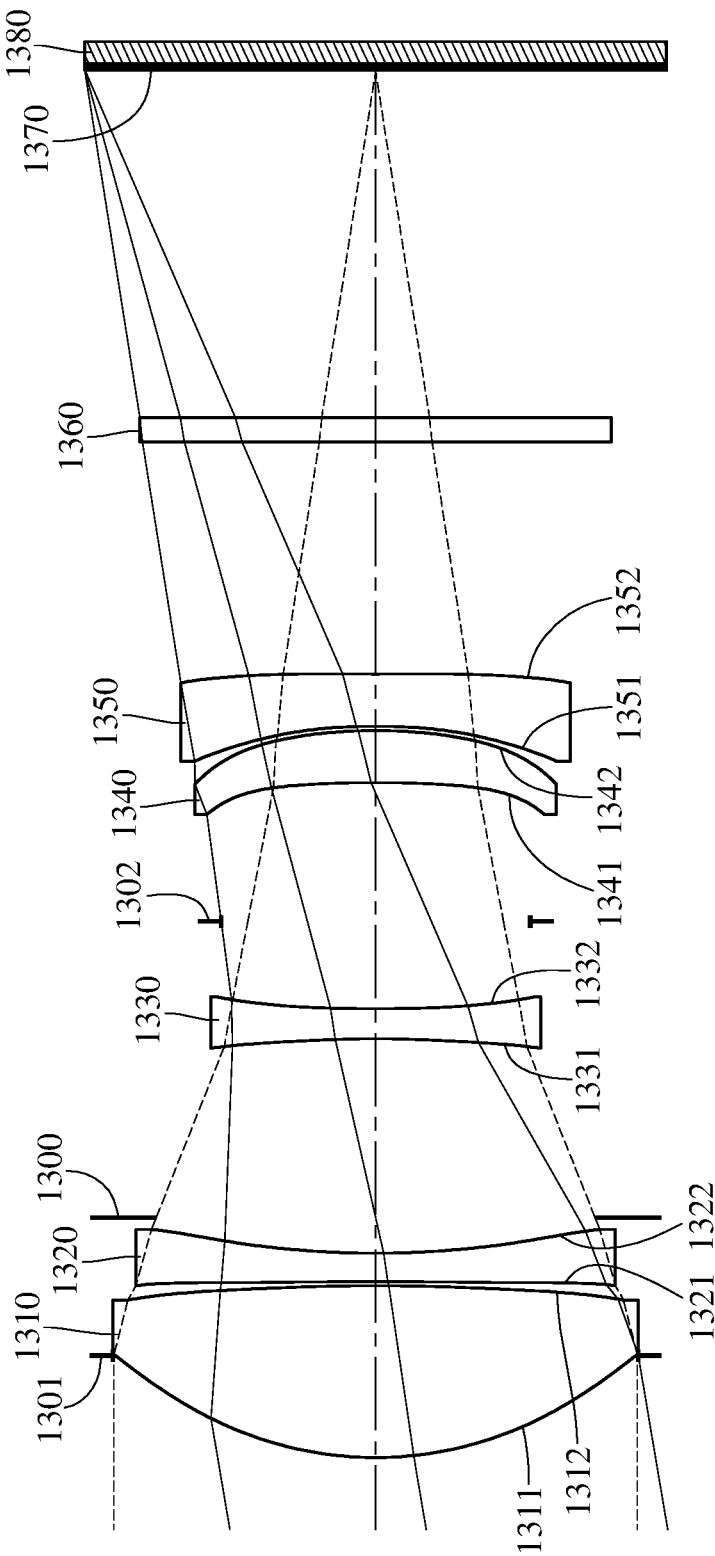
FIG. 25 is a schematic view of an image capturing unit according to the 13th embodiment of the present disclosure.
Figure 26:
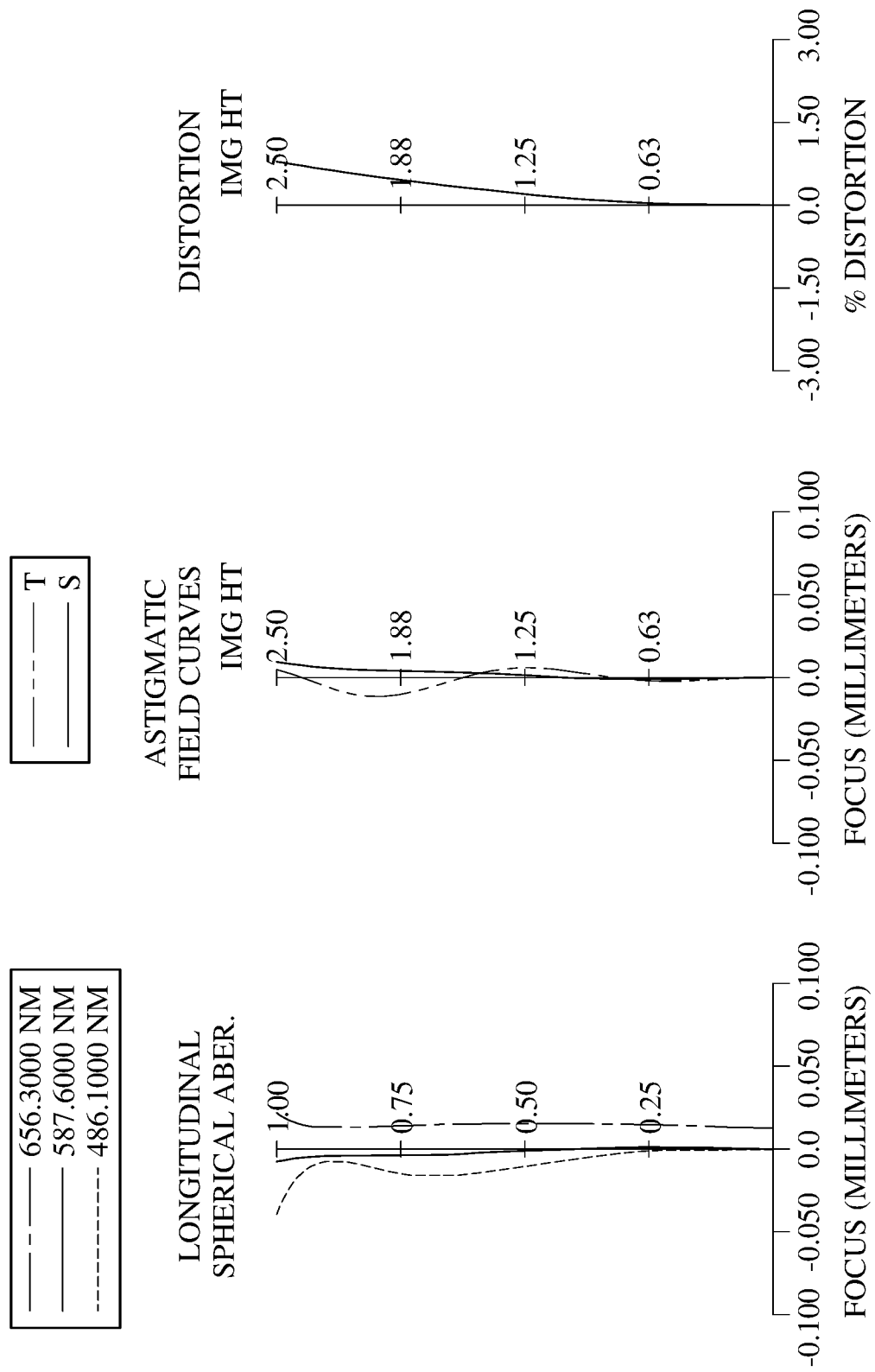
FIG. 26 shows spherical aberration curves, astigmatic field curves and a distortion curve of the image capturing unit according to the 13th embodiment.

FIG. 25 is a schematic view of an image capturing unit according to the 13th embodiment of the present disclosure. FIG. 26 shows, in order from left to right, spherical aberration curves, astigmatic field curves and a distortion curve of the image capturing unit according to the 13th embodiment. In FIG. 25, the image capturing unit includes the optical imaging lens assembly (its reference numeral is omitted) of the present disclosure and an image sensor 1380. The optical imaging lens assembly includes, in order from an object side to an image side, a first stop 1301, a first lens element 1310, a second lens element 1320, an aperture stop 1300, a third lens element 1330, a second stop 1302, a fourth lens element 1340, a fifth lens element 1350, an IR-cut filter 1360 and an image surface 1370. The optical imaging lens assembly includes five lens elements (1310, 1320, 1330, 1340 and 1350) with no additional lens element disposed between each of the adjacent five lens elements, wherein there is an air gap between every adjacent lens element.

The first lens element 1310 with positive refractive power has an object-side surface 1311 being convex in a paraxial region thereof and an image-side surface 1312 being convex in a paraxial region thereof. The first lens element 1310 is made of plastic material and has the object-side surface 1311 and the image-side surface 1312 being both aspheric.

The second lens element 1320 with negative refractive power has an object-side surface 1321 being concave in a paraxial region thereof and an image-side surface 1322 being concave in a paraxial region thereof. The second lens element 1320 is made of plastic material and has the object-side surface 1321 and the image-side surface 1322 being both aspheric.

The third lens element 1330 with negative refractive power has an object-side surface 1331 being concave in a paraxial region thereof and an image-side surface 1332 being concave in a paraxial region thereof. The third lens element 1330 is made of plastic material and has the object-side surface 1231 and the image-side surface 1232 being both aspheric.

The fourth lens element 1340 with positive refractive power has an object-side surface 1341 being concave in a paraxial region thereof and an image-side surface 1342 being convex in a paraxial region thereof. The fourth lens element 1340 is made of plastic material and has the object-side surface 1341 and the image-side surface 1342 being both aspheric.

The fifth lens element 1350 with negative refractive power has an object-side surface 1351 being concave in a paraxial region thereof and an image-side surface 1352 being concave in a paraxial region thereof. The fifth lens element 1350 is made of plastic material and has the object-side surface 1351 and the image-side surface 1352 being both aspheric. At least one of the object-side surface 1351 and the image-side surface 1352 of the fifth lens element 1350 has at least one inflection point.

The IR-cut filter 1360 is made of glass material and located between the fifth lens element 1350 and the image surface 1370, and will not affect the focal length of the optical imaging lens assembly. The image sensor 1380 is disposed on or near the image surface 1370 of the optical imaging lens assembly.

In this embodiment, an effective radius of the image-side surface 1332 of the third lens element 1330 is the smallest among all effective radii of the lens surfaces of the five lens elements. In detail, the effective radius of the image-side surface 1332 of the third lens element 1330 is smaller than the effective radii of the object-side surfaces (1311, 1321, 1331, 1341, 1351) and the image-side surfaces (1312, 1322, 1342, 1352).

The detailed optical data of the 13th embodiment are shown in Table 25 and the aspheric surface data are shown in Table 26 below.

TABLE 25

13th Embodiment
f = 14.68 mm, Fno = 3.26, HFOV = 9.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop 1 | Plano | | −0.880 | | | | |
| 2 | Lens 1 | 3.108 | (ASP) | 1.480 | Plastic | 1.545 | 56.1 | 5.00 |
| 3 | | −18.292 | (ASP) | 0.035 | | | | |
| 4 | Lens 2 | −99.183 | (ASP) | 0.245 | Plastic | 1.614 | 26.0 | 11.43 |
| 5 | | 7.556 | (ASP) | 0.306 | | | | |
| 6 | Ape. Stop | Plano | | 1.542 | | | | |
| 7 | Lens 3 | −9.504 | (ASP) | 0.260 | Plastic | 1.639 | 23.5 | −10.29 |
| 8 | | 21.492 | (ASP) | 0.751 | | | | |
| 9 | Stop 2 | Plano | | 1.196 | | | | |
| 10 | Lens 4 | −11.543 | (ASP) | 0.448 | Plastic | 1.669 | 19.4 | 12.93 |
| 11 | | −5.023 | (ASP) | 0.037 | | | | |
| 12 | Lens 5 | −6.358 | (ASP) | 0.450 | Plastic | 1.534 | 55.9 | −10.08 |
| 13 | | 35.981 | (ASP) | 2.000 | | | | |
| 14 | IR-cut filter | Plano | | 0.210 | Glass | 1.517 | 64.2 | — |
| 15 | | Plano | | 2.992 | | | | |
| 16 | Image | Plano | | — | | | | |

Note:
Reference wavelength is 587.6 nm (d-line).
An effective radius of the stop 1301 (Surface 1) is 2.260 mm.
An effective radius of the stop 1302 (Surface 9) is 1.130 mm.

TABLE 26

| Aspheric Coefficients | | | | | |
|---|---|---|---|---|---|
| Surface # | 2 | 3 | 4 | 5 | 7 |
| k = | −4.5979E−01 | −8.2166E+01 | −6.3832E+01 | −2.5714E+01 | −8.5211E+01 |
| A4 = | 1.4130E−03 | −9.7578E−04 | −7.2197E−03 | −3.7763E−04 | 1.0863E−02 |
| A6 = | 2.6004E−05 | 2.9656E−03 | 8.5315E−03 | 4.8688E−03 | −9.4448E−03 |
| A8 = | −6.8340E−05 | −1.4465E−03 | −3.2410E−03 | −1.8365E−03 | 6.4072E−03 |
| A10 = | 1.8236E−05 | 2.3476E−04 | 4.9322E−04 | 1.9538E−04 | −5.2868E−03 |
| A12 = | −3.0520E−06 | −1.3363E−05 | −2.7804E−05 | −5.8984E−06 | 2.0469E−03 |
| A14 = | — | — | 7.8253E−08 | — | −2.7836E−04 |

| Surface # | 8 | 10 | 11 | 12 | 13 |
|---|---|---|---|---|---|
| k = | 0.0000E+00 | 5.3588E+01 | −1.0001E+00 | 1.1467E+01 | −7.3414E+01 |
| A4 = | 3.1209E−02 | −1.0549E−02 | −6.3377E−02 | −9.2045E−02 | −3.4979E−02 |
| A6 = | −1.5801E−02 | 1.1795E−02 | 1.2348E−01 | 1.5490E−01 | 1.4760E−02 |
| A8 = | 1.1210E−02 | −3.1050E−02 | −1.6823E−01 | −1.7130E−01 | −1.8423E−03 |
| A10 = | −8.0642E−03 | 1.7842E−02 | 1.2166E−01 | 1.2236E−01 | −1.0398E−03 |
| A12 = | 3.0598E−03 | −3.4152E−03 | −5.1098E−02 | −5.2533E−02 | 3.5565E−04 |
| A14 = | −4.0254E−04 | −1.1359E−03 | 1.1520E−02 | 1.2385E−02 | −1.2918E−05 |
| A16 = | — | 4.5273E−04 | −1.0751E−03 | −1.2341E−03 | −6.3327E−06 |

In the 13th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 13th embodiment, so an explanation in this regard will not be provided again.

Moreover, these parameters can be calculated from Table 25 and Table 26 as the following values and satisfy the following conditions:

| 13th Embodiment | | | |
|---|---|---|---|
| f [mm] | 14.68 | (R7 + R8)/(R7 − R8) | 2.54 |
| Fno | 3.26 | f/R1 | 4.72 |
| HFOV [deg.] | 9.6 | f/R10 | 0.41 |
| V2 + V3 + V4 | 68.9 | |f3/f2| | 0.90 |
| V30 | 3 | |f3/f4| | 0.80 |
| Vmin | 19.4 | |f/f1| | 2.94 |
| CT4/CT5 | 1.00 | |f/f2| | 1.28 |
| T23/T34 | 0.95 | |f/f3| | 1.43 |
| ΣCT/ΣAT | 0.75 | |f/f4| | 1.14 |
| TD/BL | 1.30 | |f/f5| | 1.46 |
| TL/f | 0.81 | — | — |

14th Embodiment

Figure 27:
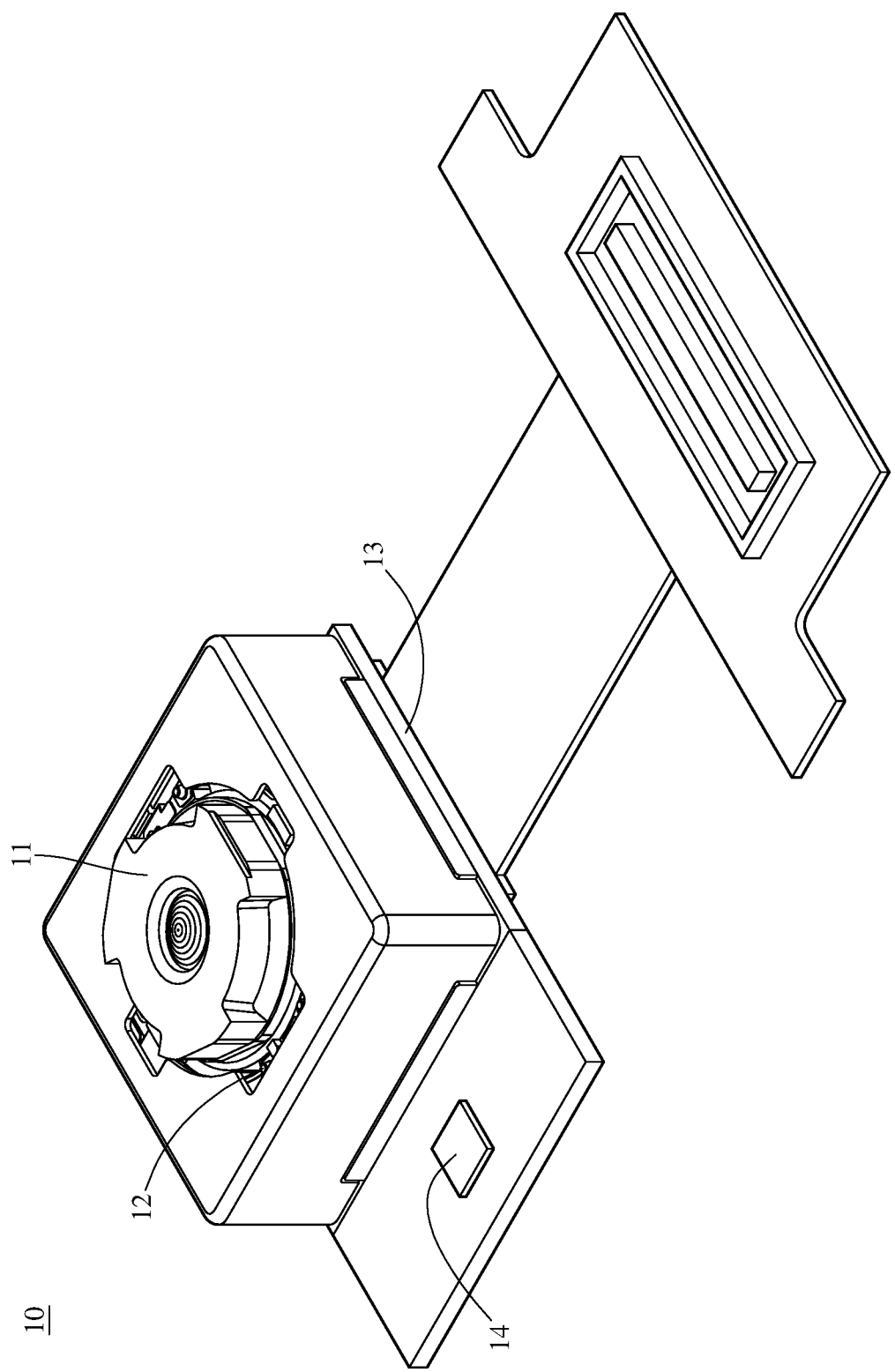
FIG. 27 is a perspective view of an image capturing unit according to the 14th embodiment of the present disclosure.

FIG. 27 is a perspective view of an image capturing unit according to the 14th embodiment of the present disclosure. In this embodiment, an image capturing unit 10 is a camera module including a lens unit 11, a driving device 12, an image sensor 13 and an image stabilizer 14. The lens unit 11 includes the optical imaging lens assembly of the 1st embodiment, a barrel and a holder member (their reference numerals are omitted) for holding the optical imaging lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical imaging lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

15th Embodiment

Figure 28:
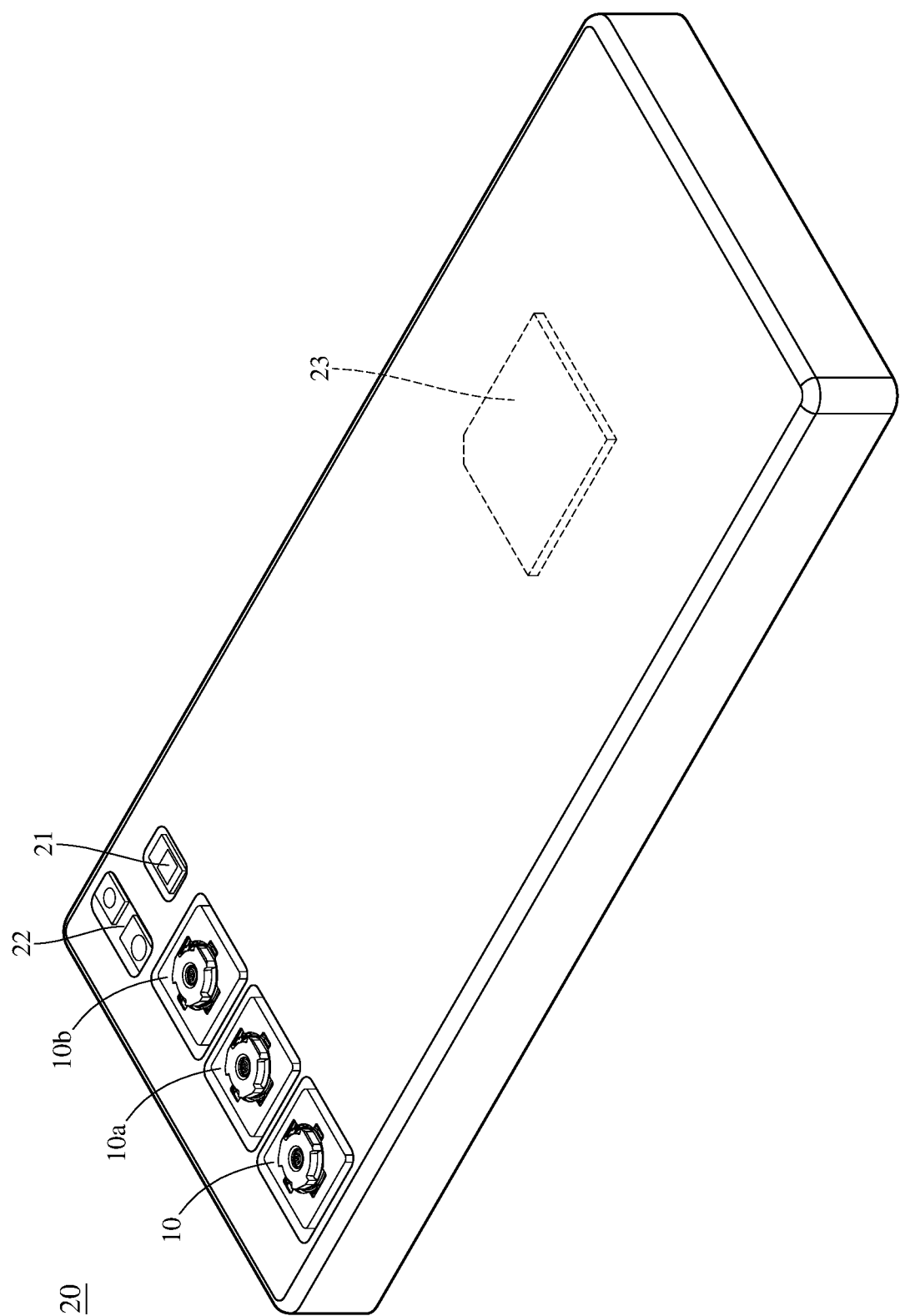
FIG. 28 is one perspective view of an electronic device according to the 15th embodiment of the present disclosure.
Figure 29:
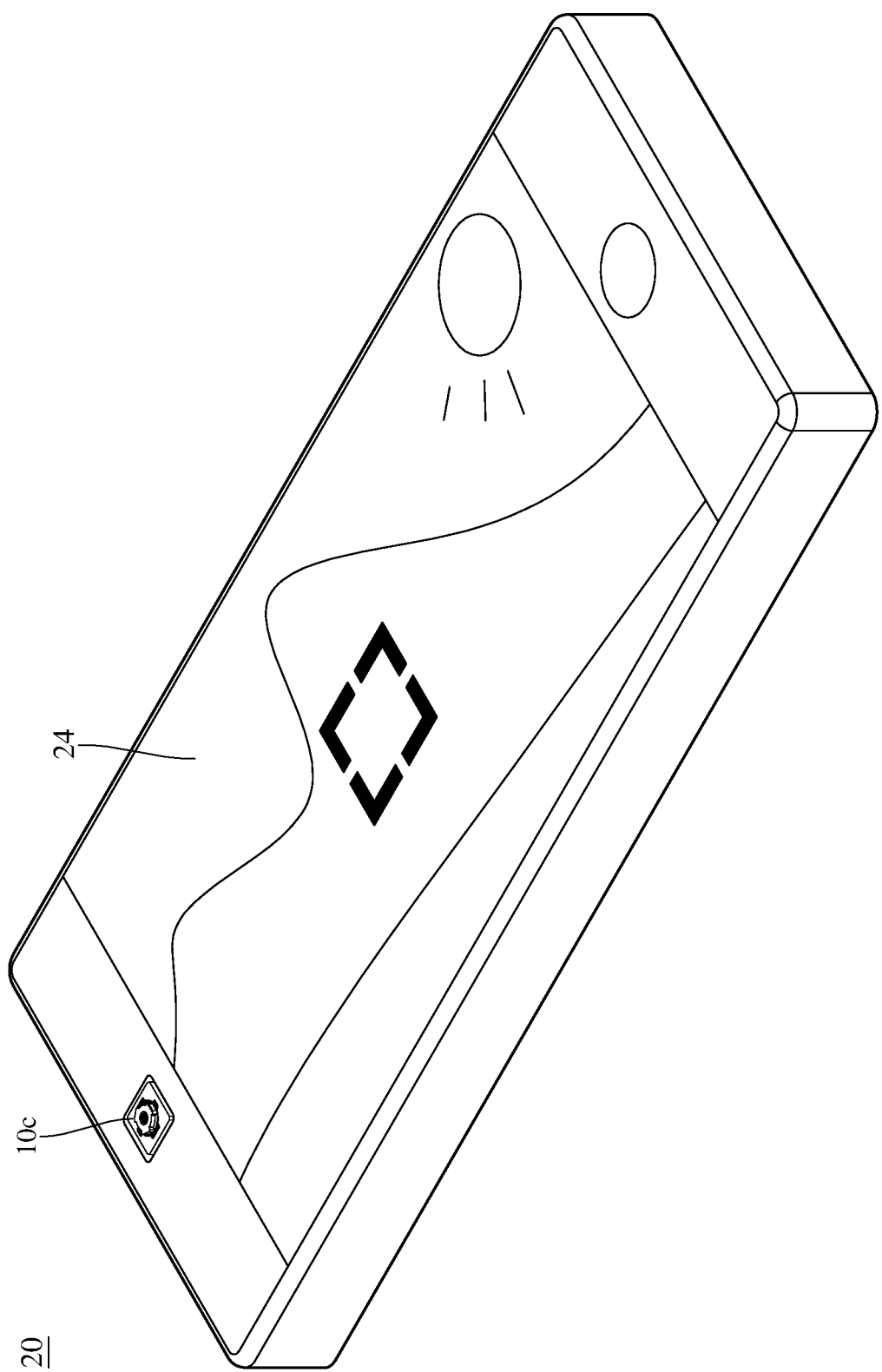
FIG. 29 is another perspective view of the electronic device in FIG. 28.
Figure 30:
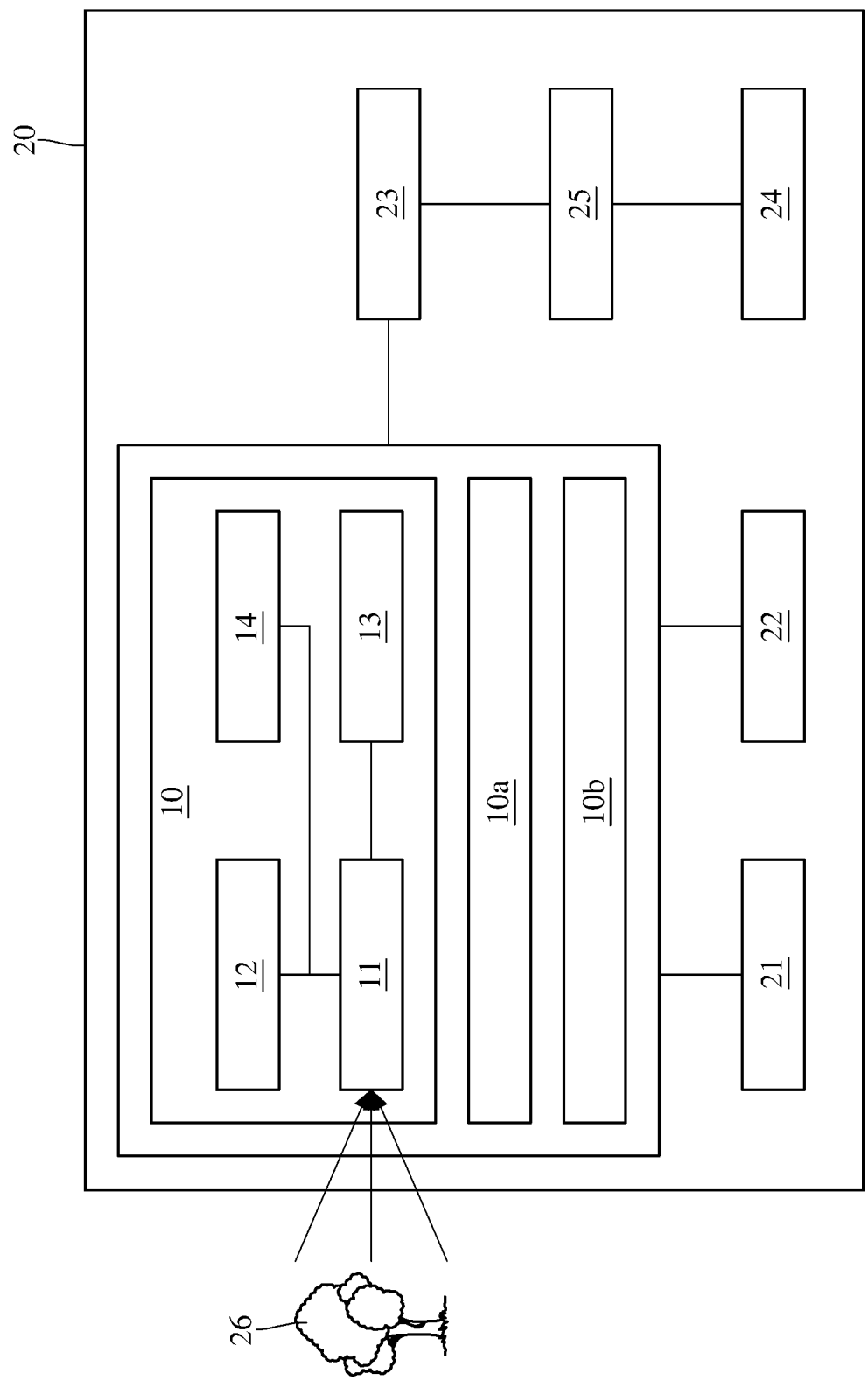
FIG. 30 is a block diagram of the electronic device in FIG. 28.

FIG. 28 is one perspective view of an electronic device according to the 15th embodiment of the present disclosure. FIG. 29 is another perspective view of the electronic device in FIG. 28. FIG. 30 is a block diagram of the electronic device in FIG. 28.

In this embodiment, an electronic device 20 is a smartphone including an image capturing unit 10a, an image capturing unit 10b, an image capturing unit 10c, the image capturing unit 10 disclosed in the 14th embodiment, a flash module 21, a focus assist module 22, an image signal processor 23, a user interface 24 and an image software processor 25. The image capturing unit 10, the image capturing unit 10a and the image capturing unit 10b all face the same direction, and each of the image capturing units 10, 10a and 10b has a single focal point. The image capturing units 10c and the image capturing units 10, 10a and 10b are located on two opposite sides of the electronic device 20, and the image capturing units 10c and the user interface 24 are located on the same side of the electronic device 20. Furthermore, the image capturing unit 10a, the image capturing unit 10b and the image capturing unit 10c all have a configuration similar to that of the image capturing unit 10. In detail, each of the image capturing unit 10a, 10b and 10c includes a lens unit, a driving device, an image sensor and an image stabilizer, and the lens unit of each of the image capturing unit 10a, 10b and 10c includes a lens system, a barrel and a holder member for holding the lens system. The lens system of the lens unit of the image capturing unit 10c can be the aforementioned optical imaging lens assembly of the 1st embodiment, but the present disclosure is not limited thereto.

In this embodiment, the image capturing units 10, 10a, 10b have different fields of view (e.g., the image capturing unit 10 is a telephoto image capturing unit, the image capturing unit 10a is a wide-angle image capturing unit, and the image capturing unit 10b is an ultra-wide-angle image capturing unit), such that the electronic device 20 has various magnification ratios so as to meet the requirement of optical zoom functionality. In addition, the image capturing unit 10c can be a telephoto image capturing unit, but the present disclosure is not limited thereto. The aforementioned electronic device 20 includes the four image capturing units 10, 10a, 10b and 10c, but the present disclosure is not limited thereto. The quantity of the image capturing unit can be adjusted according to actual requirement.

When a user captures images of an object 26, the light rays converge in the image capturing unit 10, the image capturing unit 10a, the image capturing unit 10b or the image capturing unit 10c to generate an image, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing optical lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-26 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising five lens elements, the five lens elements being, in order from an object side to an image side:
    a first lens element with positive refractive power having an object-side surface being convex in a paraxial region thereof;
    a second lens element;
    a third lens element having negative refractive power;
    a fourth lens element; and
    a fifth lens element having negative refractive power;
    wherein an Abbe number of the second lens element is V2, an Abbe number of the third lens element is V3, an Abbe number of the fourth lens element is V4, a focal length of the second lens element is f2, a focal length of the third lens element is f3, an axial distance between the second lens element and the third lens element is T23, an axial distance between the third lens element and the fourth lens element is T34, an axial distance between the object-side surface of the first lens element and an image-side surface of the fifth lens element is TD, an axial distance between the image-side surface of the fifth lens element and an image surface is BL, an axial distance between the object-side surface of the first lens element and the image surface is TL, a focal length of the optical imaging lens assembly is f, an f-number of the optical imaging lens assembly is Fno, and the following conditions are satisfied:

$35 < V2+V3+V4 < 85$;

$|f3/f2| < 2.33$;

$T23/T34 < 2.0$; and $1.25 < TD/BL < 4.80$;

$0.5 < TL/f < 1.0$; and $1.0 < Fno < 2.70$.

2. The optical imaging lens assembly of claim 1, wherein an effective radius of an image-side surface of the second lens element is the smallest among all effective radii of lens surfaces of the five lens elements.

3. The optical imaging lens assembly of claim 1, wherein the focal length of the second lens element is f2, the focal length of the third lens element is f3, and the following condition is satisfied:

$|f3/f2| < 1.50$.

4. The optical imaging lens assembly of claim 1, wherein the axial distance between the second lens element and the third lens element is T23, the axial distance between the third lens element and the fourth lens element is T34, and the following condition is satisfied:

$0.30 < T23/T34 < 1.50$.

5. The optical imaging lens assembly of claim 1, wherein the axial distance between the object-side surface of the first lens element and the image-side surface of the fifth lens element is TD, the axial distance between the image-side surface of the fifth lens element and the image surface is BL, and the following condition is satisfied:

$1.60 < TD/BL < 4.0$.

6. The optical imaging lens assembly of claim 1, wherein the focal length of the third lens element is f3, a focal length of the fourth lens element is f4, and the following condition is satisfied:

$|f3/f4|<1.0.$

7. The optical imaging lens assembly of claim 1, wherein the focal length of the optical imaging lens assembly is f, a curvature radius of the object-side surface of the first lens element is R1, and the following condition is satisfied:

$3.30<f/R1<5.50.$

8. The optical imaging lens assembly of claim 1, wherein at least one of lens surfaces of the five lens elements has at least one inflection point.

9. The optical imaging lens assembly of claim 1, wherein the focal length of the optical imaging lens assembly is f, a curvature radius of the image-side surface of the fifth lens element is R10, and the following condition is satisfied:

$0 \leq f/R10<7.0.$

10. The optical imaging lens assembly of claim 1, wherein the second lens element has negative refractive power, and the fourth lens element has positive refractive power.

11. The optical imaging lens assembly of claim 1, wherein a number of lens elements having an Abbe number smaller than 30 in the optical imaging lens assembly is V30, and the following condition is satisfied:

$3 \leq V30.$

12. The optical imaging lens assembly of claim 1, wherein the focal length of the optical imaging lens assembly is f, a focal length of the first lens element is f1, the focal length of the second lens element is f2, the focal length of the third lens element is f3, a focal length of the fourth lens element is f4, a focal length of the fifth lens element is f5, and the following conditions are satisfied:

$0.50<|f/f1|;$ $0.50<|f/f2|;$ $0.50<|f/f3|;$ $0.50<|f/f4|;$ and $0.50<|f/f5|.$

13. The optical imaging lens assembly of claim 1, wherein a minimum value among Abbe numbers of the five lens elements is Vmin, and the following condition is satisfied:

$Vmin<21.$

14. An image capturing unit, comprising:
the optical imaging lens assembly of claim 1; and
an image sensor disposed on the image surface of the optical imaging lens assembly.

15. An electronic device, comprising:
the image capturing unit of claim 14.

16. An optical imaging lens assembly comprising five lens elements, the five lens elements being, in order from an object side to an image side:
a first lens element having positive refractive power;
a second lens element;
a third lens element having negative refractive power;
a fourth lens element; and
a fifth lens element having negative refractive power;
wherein an Abbe number of the second lens element is V2, an Abbe number of the third lens element is V3, an Abbe number of the fourth lens element is V4, a focal length of the second lens element is f2, a focal length of the third lens element is f3, an axial distance between the second lens element and the third lens element is T23, an axial distance between the third lens element and the fourth lens element is T34, an f-number of the optical imaging lens assembly is Fno, and the following conditions are satisfied:

$35<V2+V3+V4<75;$ $|f3/f2|<2.0;$ $T23/T34<2.0;$ and $1.0<Fno<2.7.$

17. The optical imaging lens assembly of claim 16, wherein a minimum value among Abbe numbers of the five lens elements is Vmin, and the following condition is satisfied:

$Vmin<21.$

18. The optical imaging lens assembly of claim 16, wherein a focal length of the optical imaging lens assembly is f, a focal length of the first lens element is f1, the focal length of the second lens element is f2, the focal length of the third lens element is f3, a focal length of the fourth lens element is f4, a focal length of the fifth lens element is f5, and the following conditions are satisfied:

$0.50<|f/f1|;$ $0.50<|f/f2|;$ $0.50<|f/f3|;$ $0.50<|f/f4|;$ and $0.50<|f/f5|.$

19. The optical imaging lens assembly of claim 16, wherein a sum of central thicknesses of all lens elements of the optical imaging lens assembly is $\Sigma CT$, a sum of axial distances between each of adjacent lens elements of the optical imaging lens assembly is $\Sigma AT$, and the following condition is satisfied:

$\Sigma CT/\Sigma AT<1.50.$

20. The optical imaging lens assembly of claim 16, wherein at least one of lens surfaces of the five lens elements has at least one inflection point.

21. The optical imaging lens assembly of claim 16, wherein a number of lens elements having an Abbe number smaller than 30 in the optical imaging lens assembly is V30, and the following condition is satisfied:

$3 \leq V30.$

22. The optical imaging lens assembly of claim 16, wherein the focal length of the second lens element is f2, the focal length of the third lens element is f3, and the following condition is satisfied:

$|f3/f2|<0.70.$

23. The optical imaging lens assembly of claim 16, wherein a central thickness of the fourth lens element is CT4, a central thickness of the fifth lens element is CT5, and the following condition is satisfied:

$0.75<CT4/CT5.$

24. The optical imaging lens assembly of claim 16, wherein a focal length of the optical imaging lens assembly is f, a curvature radius of an object-side surface of the first lens element is R1, and the following condition is satisfied:

$3.30 < f/R1 < 5.50$.

25. An optical imaging lens assembly comprising five lens elements, the five lens elements being, in order from an object side to an image side:
   a first lens element having positive refractive power;
   a second lens element;
   a third lens element having negative refractive power;
   a fourth lens element with positive refractive power having an object-side surface being convex in a paraxial region thereof; and
   a fifth lens element having negative refractive power;
   wherein an Abbe number of the second lens element is V2, an Abbe number of the third lens element is V3, an Abbe number of the fourth lens element is V4, a focal length of the second lens element is f2, a focal length of the third lens element is f3, an axial distance between the second lens element and the third lens element is T23, an axial distance between the third lens element and the fourth lens element is T34, a curvature radius of the object-side surface of the fourth lens element is R7, a curvature radius of an image-side surface of the fourth lens element is R8, and the following conditions are satisfied:

$35 < V2+V3+V4 < 85$;

$|f3/f2| < 2.75$;

$T23/T34 < 4.25$; and $(R7+R8)/(R7-R8) < 0.50$.

26. The optical imaging lens assembly of claim 25, wherein the curvature radius of the object-side surface of the fourth lens element is R7, the curvature radius of the image-side surface of the fourth lens element is R8, and the following condition is satisfied:

$(R7+R8)/(R7-R8) < -0.55$.

27. The optical imaging lens assembly of claim 25, wherein the fifth lens element has an object-side surface being concave in a paraxial region thereof.

28. The optical imaging lens assembly of claim 25, wherein a focal length of the optical imaging lens assembly is f, a curvature radius of an object-side surface of the first lens element is R1, and the following condition is satisfied:

$3.30 < f/R1 < 5.50$.

29. The optical imaging lens assembly of claim 25, wherein an effective radius of an image-side surface of the second lens element is the smallest among all effective radii of lens surfaces of the five lens elements.

* * * * *